US012298171B2

(12) United States Patent
Jensen et al.

(10) Patent No.: US 12,298,171 B2
(45) Date of Patent: May 13, 2025

(54) METHODS AND APPARATUS FOR QUANTIFYING PNEUMATIC VOLUME USAGE VIA VALVE CONTROLLERS

(71) Applicant: FISHER CONTROLS INTERNATIONAL LLC, Marshalltown, IA (US)

(72) Inventors: Kurtis K. Jensen, Marshalltown, IA (US); Michael R. Fontaine, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 570 days.

(21) Appl. No.: 16/863,157

(22) Filed: Apr. 30, 2020

(65) Prior Publication Data

US 2021/0341327 A1 Nov. 4, 2021

(51) Int. Cl.
*G01F 9/00* (2006.01)
*F15B 5/00* (2006.01)
(Continued)

(52) U.S. Cl.
CPC .............. *G01F 9/001* (2013.01); *F15B 5/006* (2013.01); *F15B 19/005* (2013.01);
(Continued)

(58) Field of Classification Search
CPC ........ G01F 9/001; F15B 5/006; F15B 19/006; F15B 21/087; F15B 2211/328;
(Continued)

(56) References Cited

U.S. PATENT DOCUMENTS

| 4,394,262 A | * | 7/1983 | Bukowski | B01D 37/04 |
| | | | | 210/138 |
| 6,285,913 B1 | * | 9/2001 | Hagglund | F16K 31/122 |
| | | | | 700/44 |

(Continued)

FOREIGN PATENT DOCUMENTS

| CN | 101368642 A | 2/2009 |
| CN | 101368643 A | 2/2009 |

(Continued)

OTHER PUBLICATIONS

International Searching Authority, "International Search Report and Written Opinion," issued in connection with International Patent Application No. PCT/US2021/019214, mailed May 11, 2021, 16 pages.

(Continued)

*Primary Examiner* — Alexander Satanovsky
*Assistant Examiner* — Sharah Zaab
(74) *Attorney, Agent, or Firm* — Hanley, Flight & Zimmerman, LLC

(57) ABSTRACT

Methods and apparatus for quantifying pneumatic volume usage via valve controllers are disclosed. An example apparatus includes a valve controller operatively couplable to a pneumatic actuator, the pneumatic actuator being operatively coupled to a control valve. In response to an input signal indicating that a flow control member of the control valve is to be moved in a specified direction, the valve controller commands a current-to-pressure (I/P) converter of the valve controller to pulse a relay valve of the valve controller between a closed position and an open position. The pulsing of the relay valve causes the pneumatic actuator to move the flow control member in the specified direction. The valve controller calculates a pneumatic volume usage associated with the moving of the flow control member in (Continued)

the specified direction. The pneumatic volume usage is based on the pulsing of the relay valve.

26 Claims, 10 Drawing Sheets

(51) Int. Cl.
*F15B 19/00* (2006.01)
*F15B 21/08* (2006.01)
*F16K 31/40* (2006.01)
*F16K 37/00* (2006.01)

(52) U.S. Cl.
CPC ............ *F15B 21/087* (2013.01); *F16K 31/40* (2013.01); *F16K 37/005* (2013.01); *F16K 37/0091* (2013.01); *F15B 2211/328* (2013.01); *F15B 2211/329* (2013.01); *F15B 2211/355* (2013.01)

(58) Field of Classification Search
CPC .......... F15B 2211/329; F15B 2211/355; F16K 31/40; F16K 37/005; F16K 37/0091
See application file for complete search history.

(56) References Cited

U.S. PATENT DOCUMENTS

| | | | |
|---|---|---|---|
| 7,818,092 | B2 | 10/2010 | Lovell et al. |
| 8,483,998 | B2 | 7/2013 | Lovell et al. |
| 2002/0178825 | A1 | 12/2002 | Hickman |
| 2003/0208305 | A1* | 11/2003 | Junk ..................... F15B 19/005 700/282 |
| 2005/0173003 | A1 | 8/2005 | Laverdiere et al. |
| 2007/0290151 | A1 | 12/2007 | Muller |
| 2008/0163936 | A1* | 7/2008 | Boger ................. F16K 37/0075 137/455 |
| 2010/0051110 | A1* | 3/2010 | Ocondi ............. G05D 16/2095 137/486 |
| 2011/0208362 | A1 | 8/2011 | Alstrin et al. |
| 2013/0327403 | A1 | 12/2013 | Jensen |
| 2015/0045970 | A1 | 2/2015 | Anderson |
| 2017/0175909 | A1 | 6/2017 | Kinser et al. |
| 2018/0272587 | A1 | 9/2018 | Galati et al. |
| 2018/0340554 | A1 | 11/2018 | Hutchison et al. |
| 2019/0032683 | A1 | 1/2019 | Watts |
| 2019/0226937 | A1 | 7/2019 | Glime, III |

FOREIGN PATENT DOCUMENTS

| | | | | |
|---|---|---|---|---|
| CN | 101473284 | A | | 7/2009 |
| CN | 101583818 | A | | 11/2009 |
| CN | 102227565 | | * | 10/2011 ............. F15B 11/04 |
| CN | 102812257 | A | | 12/2012 |
| CN | 103486327 | A | | 1/2014 |
| CN | 104345727 | A | | 2/2015 |
| CN | 204360211 | U | | 5/2015 |
| CN | 105843268 | A | | 8/2016 |
| CN | 107061757 | A | | 8/2017 |
| CN | 207676230 | U | | 7/2018 |
| CN | 108778670 | A | | 11/2018 |
| CN | 108799238 | | * | 11/2018 ............. F15B 13/16 |
| CN | 108799238 | A | | 11/2018 |
| CN | 109240080 | A | | 1/2019 |
| CN | 109307096 | A | | 2/2019 |
| CN | 111344497 | A | | 6/2020 |
| EP | 2644904 | | | 10/2013 |
| WO | WO2014131427 | | * | 9/2014 ................ F15B 5/00 |

OTHER PUBLICATIONS

International Bureau, "International Preliminary Report on Patentability," issued in connection with International Patent Application No. PCT/US2021/019214, mailed Nov. 10, 2022, 9 pages.

The State Intellectual Property Office of People's Republic of China, "Search Report," mailed in connection with Chinese Patent Application No. 202180028462.2, dated Nov. 13, 2024, 4 pages (English Translation included).

The State Intellectual Property Office of People's Republic of China, "Notification to Grant Patent Right for Invention," mailed in connection with Chinese Patent Application No. 202180028462.2, dated Nov. 22, 2024, 3 pages (English Translation included).

The State Intellectual Property Office of People's Republic of China, "First Office Action and First Search," issued in connection with Chinese Patent Application No. 202180028462.2, dated May 13, 2024, 23 pages. [English Translation Included].

* cited by examiner

METHODS AND APPARATUS FOR QUANTIFYING PNEUMATIC VOLUME USAGE VIA VALVE CONTROLLERS

FIELD OF THE DISCLOSURE

This disclosure relates generally to valve controllers and, more particularly, to methods and apparatus for quantifying pneumatic volume usage via valve controllers.

BACKGROUND

In conventional valve controllers that implement pneumatic transducers, a stated amount of pneumatic medium (e.g., air) is constantly being used to maintain an output signal to a pneumatic actuator operatively coupled to a control valve. This persistent usage and/or consumption of pneumatic medium at steady state conditions of the pneumatic actuator and/or the control valve is commonly referred to as bleed. A product specification for the valve controller typically provides a stated pneumatic medium usage rate (e.g., standard cubic feet per hour) for air, which can easily be converted to a usage rate for another pneumatic medium, such as natural gas.

For conventional valve controllers such as those described above, the total volume of pneumatic medium used to operate the pneumatic actuator and/or the control valve has three components. The first component is the volume of pneumatic medium moving from the valve controller into the pneumatic actuator to move the control valve in a first direction (e.g., toward a fully-open position). The second component is the volume of pneumatic medium released (e.g., vented) from the pneumatic actuator (e.g., via the valve controller) to move the control valve in a second direction opposite the first direction (e.g., toward a fully-closed position). The third component is the volume of pneumatic medium used to maintain the output signal to the pneumatic actuator (e.g., used to maintain a distance between a nozzle and flapper mechanism of the valve controller), with such volume constituting the bleed associated with the valve controller and/or the pneumatic actuator. For example, a distance between a nozzle and a flapper of a nozzle and flapper mechanism is typically maintained by the current applied to a current-to-pressure (I/P) converter. The output pressure of the I/P converter is used to maintain a position of the pneumatic actuator, and the amount of bleed from the I/P converter increases as its output pressure increases.

With continued reference to the conventional valve controllers described above, the total volume of pneumatic medium used and/or consumed can be measured, calculated, and/or quantified through the implementation of upstream pressure sensors and flow meters. However, in steady state, when the pneumatic actuator and/or the control valve is/are not moving, the above-described bleed continues, with all of the bled pneumatic medium being vented and/or exhausted to atmosphere. As the bleed persists over time, significant volumes of pneumatic medium become lost and/or wasted, and the efficiency of the pneumatic medium conservation becomes nearly zero. Consumed pneumatic medium quantification methodologies that are based on the implementation of upstream pressure sensors and flow meters are unable to provide efficiency data detailing the amount (e.g., percentage) of the total consumed pneumatic medium that is actually being used to move the control valve, versus the amount (e.g., percentage) of the total consumed pneumatic medium that is lost and/or wasted due to bleed.

SUMMARY

Example methods and apparatus for quantifying pneumatic volume usage via valve controllers are disclosed. In some examples, an apparatus is disclosed. In some disclosed examples, the apparatus comprises a valve controller operatively couplable to a pneumatic actuator, the pneumatic actuator being operatively coupled to a control valve. In some disclosed examples, the valve controller includes one or more processors to, in response to an input signal indicating that the valve controller is to operate the pneumatic actuator to move a flow control member of the control valve in a specified direction, command a current-to-pressure (I/P) converter of the valve controller to pulse a relay valve of the valve controller between a closed position and an open position. In some disclosed examples, the pulsing of the relay valve is to cause the pneumatic actuator to move the flow control member in the specified direction. In some disclosed examples, the one or more processors are further to calculate a pneumatic volume usage associated with the moving of the flow control member in the specified direction. In some disclosed examples, the pneumatic volume usage is based on the pulsing of the relay valve.

In some examples, a method is disclosed. In some disclosed examples, the method comprises receiving an input signal at a valve controller operatively coupled to a pneumatic actuator, the pneumatic actuator being operatively coupled to a control valve, the input signal indicating that the valve controller is to operate the pneumatic actuator to move a flow control member of the control valve in a specified direction. In some disclosed examples, the method further comprises, in response to receiving the input signal, commanding, via one or more processors of the valve controller, a current-to-pressure (I/P) converter of the valve controller to pulse a relay valve of the valve controller between a closed position and an open position. In some disclosed examples, the pulsing of the relay valve causes the pneumatic actuator to move the flow control member in the specified direction. In some disclosed examples, the method further comprises calculating, via the one or more processors, a pneumatic volume usage associated with the moving of the flow control member in the specified direction. In some disclosed examples, the pneumatic volume usage is based on the pulsing of the relay valve.

In some examples, a non-transitory computer-readable medium is disclosed. In some disclosed examples, the non-transitory computer-readable medium comprises instructions that, when executed, cause one or more processors of a valve controller to obtain an input signal, the input signal indicating that the valve controller is to operate a pneumatic actuator operatively coupled to the valve controller to move a flow control member of a control valve in a specified direction, the control valve being operatively coupled to the pneumatic actuator. In some disclosed examples, the instructions, when executed, further cause the one or more processors to, in response to the input signal, command a current-to-pressure (I/P) converter of the valve controller to pulse a relay valve of the valve controller between a closed position and an open position. In some disclosed examples, the pulsing of the relay valve causes the pneumatic actuator to move the flow control member in the specified direction. In some disclosed examples, the instructions, when executed, further cause the one or more processors to calculate a pneumatic volume usage associated with the moving of the flow control member in the specified direction. In some disclosed examples, the pneumatic volume usage is based on the pulsing of the rely valve.

Figure 1:
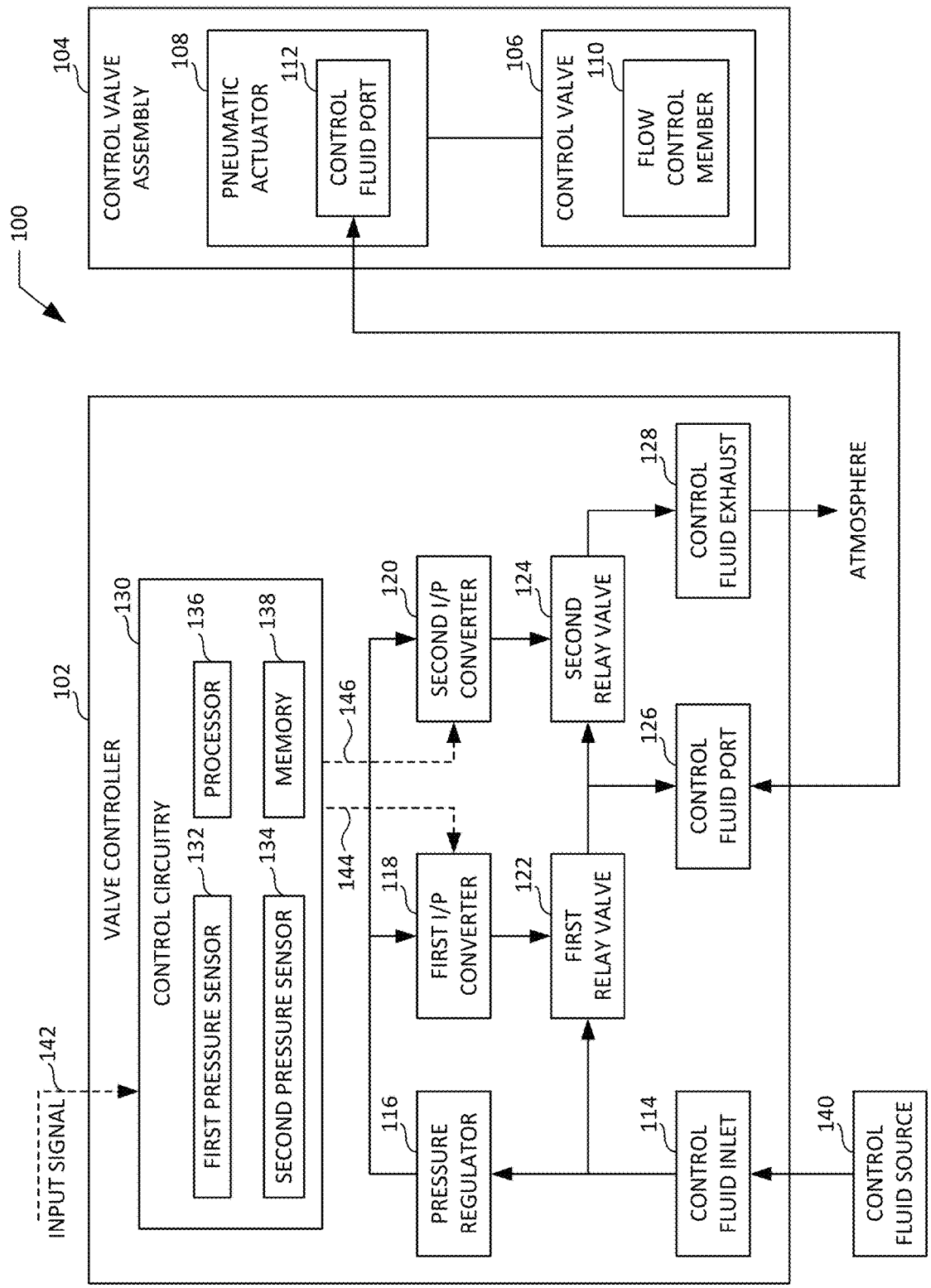
FIG. 1 is a block diagram of an example process control system including an example valve controller constructed in accordance with the teachings of this disclosure for quantifying pneumatic volume usage.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Conventional valve controllers that implement pneumatic transducers provide an output signal to a pneumatic actuator operatively coupled to a control valve. The total volume of pneumatic medium used by the valve controller to operate the pneumatic actuator and/or the control valve typically has three components. The first component is the volume of pneumatic medium moving from the valve controller into the pneumatic actuator to move the control valve in a first direction (e.g., toward a fully-open position). The second component is the volume of pneumatic medium released (e.g., vented) from the pneumatic actuator (e.g., via the valve controller) to move the control valve in a second direction opposite the first direction (e.g., toward a fully-closed position). The third component is the volume of pneumatic medium used to maintain the output signal to the pneumatic actuator (e.g., used to maintain a distance between a nozzle and flapper mechanism of the valve controller), with such volume constituting bleed associated with the valve controller and/or the pneumatic actuator. For example, a distance between a nozzle and a flapper of a nozzle and flapper mechanism is typically maintained by the current applied to an I/P converter. The output pressure of the I/P converter is used to maintain a position of the pneumatic actuator, and the amount of bleed from the I/P converter increases as its output pressure increases.

For such conventional valve controllers, the total volume of pneumatic medium used and/or consumed can be measured, calculated, and/or quantified through the implementation of upstream pressure sensors and flow meters. However, in steady state, when the pneumatic actuator and/or the control valve is/are not moving, the above-described bleed continues, with all of the bled pneumatic medium being vented and/or exhausted to atmosphere. As the bleed persists over time, significant volumes of pneumatic medium become lost and/or wasted, and the efficiency of the pneumatic medium conservation becomes nearly zero. Consumed pneumatic medium quantification methodologies that are based on the implementation of upstream pressure sensors and flow meters are unable to provide efficiency data detailing the amount (e.g., percentage) of the total consumed pneumatic medium that is actually being used to move the control valve, versus the amount (e.g., percentage) of the total consumed pneumatic medium that is lost and/or wasted due to bleed.

Persistent bleed of pneumatic medium as a consequence of using a valve controller to operate a pneumatic actuator and/or a control valve can be detrimental in many ways. For example, from an economic standpoint, persistent bleed of the pneumatic medium increases operating costs associated with the production and delivery of the pneumatic medium. As another example, from an environmental standpoint, persistent bleed of certain types of pneumatic medium (e.g., natural gas) results in undesirable emissions of the pneumatic medium into the atmosphere.

Unlike the conventional valve controllers described above, example valve controllers disclosed herein include a pneumatic transducer implemented as a two-stage relay, with first and second relay valves of the two-stage relay being operatively coupled to and/or controlled by corresponding ones of first and second I/P converters of the valve controller. The two-stage relay advantageously reduces (e.g., eliminates) the persistent bleed that is traditionally associated with steady state operation of pneumatic actuators and/or control valves via the conventional valve controllers described above. Example valve controllers disclosed herein accordingly provide economic and environmental benefits relative to such conventional valve controllers.

Example valve controllers disclosed herein also provide improved techniques for quantifying pneumatic volume usage and/or consumption, particularly with regard to quantifying the volume of pneumatic medium used and/or consumed in association with the valve controller operating a pneumatic actuator to move a control valve (e.g., usage and/or consumption during non-steady state operations). In this regard, example methods and apparatus disclosed herein for quantifying pneumatic volume usage can be implemented via a valve controller having a two-stage relay operatively coupled to a pneumatic actuator, with the pneumatic actuator in turn being operatively coupled to a control valve. In some disclosed examples, a processor of the valve controller commands the first I/P converter to pulse the first relay valve (e.g., between a closed position and an open position) when the valve controller is to operate the pneumatic actuator to move the control valve in a first direction (e.g., toward a fully-open position). The pulsing of the first relay valve causes a pressurized pneumatic medium (e.g., pressurized air) to be delivered from the valve controller to the pneumatic actuator in a pulsed manner. Conversely, the processor of the valve controller commands the second I/P converter to pulse the second relay valve (e.g., between a closed position and an open position) when the valve controller is to operate the pneumatic actuator to move the control valve in a second direction opposite the first direction (e.g., toward a fully-closed position). The pulsing of the second relay valve causes the pressurized pneumatic medium to be returned from the pneumatic actuator back to the valve controller, and to subsequently be exhausted (e.g., vented) from the valve controller to atmosphere in a pulsed manner.

In the above-described example, each pulse of pneumatic medium delivered by the first I/P converter to the first relay valve, and/or delivered by the second I/P converter to the second relay valve has a known volume. Based on such known volumes of the pulses of pneumatic medium, along with measured pneumatic medium supply and exhaust pressures associated with the valve controller, example valve controllers disclosed herein advantageously calculate and/or quantify the volume of pneumatic medium used and/or consumed in association with the valve controller operating the pneumatic actuator to move the control valve. Pneumatic volume usage and/or consumption data calculated by the valve controller can be monitored over time to detect unexpected and/or undesirable increases in the volume of pneumatic medium being used and/or consumed by the valve controller. In some examples, detection of such unexpected and/or undesirable increases in the volume of pneumatic medium being used and/or consumed by the valve controller can indicate deterioration of one or more component(s) of the pneumatic actuator and/or the control valve, including any tubing and/or fittings associated therewith. Such information can advantageously enable maintenance personnel to identify and/or resolve operational issues more quickly, thereby increasing the reliability of field operations that make use of the valve controller, the pneumatic actuator, and/or the control valve.

As used herein, the phrase "operatively coupled," including variations thereof (e.g., electrically coupled, mechanically coupled, fluidically coupled, etc.), encompasses direct operative couplings and/or indirect operative couplings through one or more intermediary component(s). As used herein, the phrase "in communication," including variations thereof (e.g., in electrical communication, in mechanical communication, in fluid communication, etc.), encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

FIG. 1 is a block diagram of an example process control system 100 including an example valve controller 102 constructed in accordance with the teachings of this disclosure for quantifying pneumatic volume usage. The process control system 100 of FIG. 1 further includes an example control valve assembly 104 operatively coupled to the valve controller 102. The control valve assembly 104 of FIG. 1 includes an example control valve 106 and an example pneumatic actuator 108.

The control valve 106 of FIG. 1 includes an example flow control member 110 (e.g., a plug, a disk, a ball, a gate, etc.) and a valve shaft (not shown). The flow control member 110 is operatively coupled to the valve shaft. Upon the application of a force and/or load to the valve shaft, the flow control member 110 moves in either a first direction toward a first position, or in a second direction opposite the first direction toward a second position. In some examples, the first position of the flow control member 110 corresponds to an open position (e.g., a fully-open position) of the control valve 106, and the second position of the flow control member 110 corresponds to a closed position (e.g., a fully-closed position) of the control valve 106. In other examples, the first position of the flow control member 110 corresponds to a closed position (e.g., a fully-closed position) of the control valve 106, and the second position of the flow control member 110 corresponds to an open position (e.g., a fully-open position) of the control valve 106.

The pneumatic actuator 108 of FIG. 1 is a single-acting pneumatic actuator, which may be implemented by and/or as any linear or rotary actuator (e.g., a diaphragm actuator, a piston actuator, a rotary vane actuator, a rotary rack-and-pinion actuator, a rotary scotch-yoke actuator, etc.). In the illustrated example of FIG. 1, the pneumatic actuator 108 is operatively coupled to the control valve 106 and, more specifically, to the valve shaft of the control valve 106. The pneumatic actuator 108 includes an example control fluid port 112 in fluid communication with a fluid chamber of the pneumatic actuator 108. The pneumatic actuator 108 further includes an internal stem and/or piston. The control fluid port 112 of the pneumatic actuator 108 receives a pressurized control fluid (e.g., a pressurized pneumatic medium, such as pressurized air) from the valve controller 102 that causes the stem and/or piston of the pneumatic actuator 108 to move in a first direction, and/or that causes the pressure within the fluid chamber of the pneumatic actuator 108 to increase. A force and/or load generated by the moving stem and/or piston of the pneumatic actuator 108 is transformed into a force and/or load on the valve shaft of the control valve 106, which causes the flow control member 110 of the control valve 106 to move between the first position and the second position, as described above.

The operative coupling of the stem and/or piston of the pneumatic actuator 108 to the valve shaft and/or the flow control member 110 of the control valve 106 results in a correlation between the position of the stem and/or piston of the pneumatic actuator 108 and the position of the flow control member 110 of the control valve 106. Accordingly, a position of the flow control member 110 of the control valve 106 may be determined based on a known and/or measured position of the stem and/or piston of the pneumatic actuator 108, and vice-versa. In some examples, a position indicator may be operatively coupled to the stem and/or piston of the pneumatic actuator 108 such that movement of the stem and/or piston results in corresponding movement of the position indicator. Based on the above-described correlation between the position of the stem and/or piston of the pneumatic actuator 108 and the position of the flow control member 110 of the control valve 106, the position indicator can provide an indication of the position of the stem and/or piston of the pneumatic actuator 108, and/or an indication of the position of the flow control member 110 of the control valve 106. Position data generated by the position indicator of the pneumatic actuator 108 can be transmitted to a position sensor of the valve controller 102 via a wired or wireless connection.

The valve controller 102 of FIG. 1 is a digital valve controller. The valve controller 102 controls the supply of pressurized control fluid (e.g., a pressurized pneumatic medium, such as pressurized air) to the control fluid port 112 of the pneumatic actuator 108, which in turn controls the position of the flow control member 110 of the control valve 106. In the illustrated example of FIG. 1, the valve controller 102 includes an example control fluid inlet 114, an example pressure regulator 116, an example first I/P converter 118, an example second I/P converter 120, an example first relay valve 122, an example second relay valve 124, an example control fluid port 126, an example control fluid exhaust 128, and example control circuitry 130. The control circuitry 130 of FIG. 1 includes an example first pressure sensor 132, an example second pressure sensor 134, an example processor 136, and an example memory 138.

The control fluid inlet 114 of FIG. 1 is in fluid communication with an example control fluid source 140 located externally and/or remotely relative to the valve controller 102. The control fluid inlet 114 is also in fluid communication with the pressure regulator 116 and the first relay valve 122 of the valve controller 102. As shown in FIG. 1, the control fluid inlet 114 is operatively positioned between the control fluid source 140 on the one hand, and both the pressure regulator 116 and the first relay valve 122 on the other hand. Fluid communications to and/or from the control fluid inlet 114 can be implemented via one or more fluid passageway(s) formed by one or more conduit(s), channel(s), and/or tube(s). The control fluid inlet 114 receives a pressurized control fluid (e.g., a pressurized pneumatic medium, such as pressurized air) from the control fluid source 140. The pressurized control fluid received at the control fluid inlet 114 is passed and/or delivered to the pressure regulator 116 and the first relay valve 122 of the valve controller 102.

The pressure regulator 116 of FIG. 1 is in fluid communication with the control fluid inlet 114, the first I/P converter 118, and the second I/P converter 120 of the valve controller 102. As shown in FIG. 1, the pressure regulator 116 is operatively positioned between the control fluid inlet 114 on the one hand, and both the first I/P converter 118 and the second I/P converter 120 on the other hand. Fluid communications to and/or from the pressure regulator 116 can be implemented via one or more fluid passageway(s) formed by one or more conduit(s), channel(s), and/or tube(s). The pressure regulator 116 modifies (e.g., reduces) the pressure of the pressurized control fluid as received at the control fluid inlet 114 (e.g., from the control fluid source 140) to a desired output pressure for delivery to the first I/P converter 118 and the second I/P converter 120. The pressurized control fluid exiting the pressure regulator 116 and/or being delivered to the first I/P converter 118 and the second I/P converter 120 accordingly has a modified (e.g., reduced) pressure relative to that of the pressurized control fluid as received at the control fluid inlet 114.

The first I/P converter 118 of FIG. 1 is in fluid communication with the pressure regulator 116 and the first relay valve 122 of the valve controller 102. As shown in FIG. 1, the first I/P converter 118 is operatively positioned between the pressure regulator 116 and the first relay valve 122. Fluid communications to and/or from the first I/P converter 118 can be implemented via one or more fluid passageway(s) formed by one or more conduit(s), channel(s), and/or tube (s). In some examples, in response to receiving a pulsed drive signal (e.g., the example first pulsed drive signal 144 described below) from the control circuitry 130, the first I/P converter 118 converts and/or transforms the pressurized control fluid received at the first I/P converter 118 (e.g., from the pressure regulator 116) into a pulsed pressurized control fluid (e.g., a pulsed pressurized pneumatic medium, such as pulses of pressurized air) generated and/or output by the first I/P converter 118. The pulsed pressurized control fluid generated and/or output by the first I/P converter 118 is passed and/or delivered to the first relay valve 122 of the valve controller 102.

The second I/P converter 120 of FIG. 1 is in fluid communication with the pressure regulator 116 and the second relay valve 124 of the valve controller 102. As shown in FIG. 1, the second I/P converter 120 is operatively positioned between the pressure regulator 116 and the second relay valve 124. Fluid communications to and/or from the second I/P converter 120 can be implemented via one or more fluid passageway(s) formed by one or more conduit(s), channel(s), and/or tube(s). In some examples, in response to receiving a pulsed drive signal (e.g., the example second pulsed drive signal 146 described below) from the control circuitry 130, the second I/P converter 120 converts and/or transforms the pressurized control fluid received at the second I/P converter 120 (e.g., from the pressure regulator 116) into a pulsed pressurized control fluid (e.g., a pulsed pressurized pneumatic medium, such as pulses of pressurized air) generated and/or output by the second I/P converter 120. The pulsed pressurized control fluid generated and/or output by the second I/P converter 120 is passed and/or delivered to the second relay valve 124 of the valve controller 102.

The first relay valve 122 of FIG. 1 is in fluid communication with the control fluid inlet 114, the first I/P converter 118, the second relay valve 124, and the control fluid port 126 of the valve controller 102. As shown in FIG. 1, the first relay valve 122 is operatively positioned between the control fluid inlet 114 on the one hand, and both the second relay valve 124 and the control fluid port 126 on the other hand, with the first relay valve 122 being fluidically controlled by the output of pressurized control fluid from the first I/P converter 118. Fluid communications to and/or from the first relay valve 122 can be implemented via one or more fluid passageway(s) formed by one or more conduit(s), channel (s), and/or tube(s).

Actuation of the first relay valve 122 (e.g., between a closed position and an open position) is controlled based on the pressurized control fluid (e.g., the pulsed pressurized control fluid) output by the first I/P converter 118 to the first relay valve 122. In some examples, the first relay valve 122 is actuated to and/or maintained in a closed position when the pressurized control fluid output by the first I/P converter 118 is relatively high (e.g., above a threshold pressure), and is actuated to and/or maintained in an open position when the pressurized control fluid output by the first I/P converter 118 is relatively lower (e.g., below a threshold pressure). In other examples, the first relay valve 122 is actuated to and/or maintained in a closed position when the pressurized control fluid output by the first I/P converter 118 is relatively low (e.g., below a threshold pressure), and is actuated to and/or maintained in an open position when the pressurized control fluid output by the first I/P converter 118 is relatively high (e.g., above a threshold pressure).

When the first relay valve 122 is in a closed position, pressurized control fluid received at the first relay valve 122 from the control fluid inlet 114 of the valve controller 102 is prevented from passing and/or traveling through the first relay valve 122. When the first relay valve 122 is actuated to an open position (e.g., from the closed position), pressurized control fluid received at the first relay valve 122 from the control fluid inlet 114 of the valve controller 102 passes and/or travels through the first relay valve 122 to the second relay valve 124 and/or the control fluid port 126 of the valve controller 102. When the first relay valve 122 is in an open position and the second relay valve 124 is in a closed position, pressurized control fluid passing and/or traveling through the first relay valve 122 is forced toward, into, and/or through the control fluid port 126 of the valve controller 102. Pressurized control fluid passing from the first relay valve 122 into and/or through the control fluid port 126 of the valve controller 102 is forced toward, into, and/or through the control fluid port 112 of the pneumatic actuator 108, which causes movement of the flow control member 110 of the control valve 106 in a first direction, and/or which causes the pressure within the fluid chamber of the pneumatic actuator 108 to increase.

The second relay valve 124 of FIG. 1 is in fluid communication with the second I/P converter 120, the first relay valve 122, the control fluid port 126, and the control fluid exhaust 128 of the valve controller 102. As shown in FIG. 1, the second relay valve 124 is operatively positioned between both the first relay valve 122 and the control fluid port 126 on the one hand, and the control fluid exhaust 128 on the other hand, with the second relay valve 124 being fluidically controlled by the output of pressurized control fluid from the second I/P converter 120. Fluid communications to and/or from the second relay valve 124 can be implemented via one or more fluid passageway(s) formed by one or more conduit(s), channel(s), and/or tube(s).

Actuation of the second relay valve 124 (e.g., between a closed position and an open position) is controlled based on the pressurized control fluid (e.g., the pulsed pressurized control fluid) output by the second I/P converter 120 to the second relay valve 124. In some examples, the second relay valve 124 is actuated to and/or maintained in a closed position when the pressurized control fluid output by the second I/P converter 120 is relatively high (e.g., above a threshold pressure), and is actuated to and/or maintained in an open position when the pressurized control fluid output by the second I/P converter 120 is relatively lower (e.g., below a threshold pressure). In other examples, the second relay valve 124 is actuated to and/or maintained in a closed position when the pressurized control fluid output by the second I/P converter 120 is relatively low (e.g., below a threshold pressure), and is actuated to and/or maintained in an open position when the pressurized control fluid output by the second I/P converter 120 is relatively high (e.g., above a threshold pressure).

When the second relay valve 124 is in a closed position, pressurized control fluid received at the second relay valve 124 from the first relay valve 122 and/or the control fluid port 126 of the valve controller 102 is prevented from passing and/or traveling through the second relay valve 124. When the second relay valve 124 is actuated to an open position (e.g., from the closed position), pressurized control fluid received at the second relay valve 124 from the first relay valve 122 and/or the control fluid port 126 of the valve controller 102 passes and/or travels through the second relay valve 124 to the control fluid exhaust 128 of the valve controller 102. When the second relay valve 124 is in an open position and the first relay valve 122 is in a closed position, pressurized control fluid travels, passes, and/or returns from the control fluid port 112 of the pneumatic actuator 108, through the control fluid port 126 of the valve controller 102, then through the second relay valve 124 of the valve controller 102, and then toward, into, and/or through the control fluid exhaust 128 of the valve controller 102. Pressurized control fluid passing from the second relay valve 124 into and/or through the control fluid exhaust 128 is vented into the atmosphere. The return of the pressurized control fluid from the control fluid port 112 of the pneumatic actuator 108 to the control fluid port 126 of the valve controller 102, combined with the subsequent venting of the returned pressurized control fluid via the control fluid exhaust 128 of the valve controller 102, causes movement of the flow control member 110 of the control valve 106 in a second direction opposite the first direction, and/or causes the pressure within the fluid chamber of the pneumatic actuator 108 to decrease.

The control fluid port 126 of FIG. 1 is in fluid communication with the first relay valve 122 and the second relay valve 124 of the valve controller 102. The control fluid port 126 of the valve controller 102 is also in fluid communication with the control fluid port 112 of the pneumatic actuator 108. As shown in FIG. 1, the control fluid port 126 is operatively positioned between both the first relay valve 122 and the second relay valve 124 of the valve controller 102 on the one hand, and the control fluid port 112 of the pneumatic actuator 108 on the other hand. Fluid communications to and/or from the control fluid port 126 can be implemented via one or more fluid passageway(s) formed by one or more conduit(s), channel(s), and/or tube(s). The control fluid port 126 of the valve controller 102 facilitates the supply of pressurized control fluid from the first relay valve 122, and/or, more generally, from the valve controller 102 to the control fluid port 112 of the pneumatic actuator 108. The control fluid port 126 of the valve controller 102 also facilitates the return of pressurized control fluid from the control fluid port 112 of the pneumatic actuator 108 to the second relay valve 124, and/or, more generally, to the valve controller 102.

The control fluid exhaust 128 of FIG. 1 is in fluid communication with the second relay valve 124 of the valve controller 102. As shown in FIG. 1, the control fluid exhaust 128 is operatively positioned between the second relay valve 124 and the atmosphere located externally from the valve controller 102. Fluid communications to and/or from the control fluid exhaust 128 can be implemented via one or more fluid passageway(s) formed by one or more conduit(s), channel(s), and/or tube(s). The control fluid exhaust 128 facilitates the venting of pressurized control fluid from the second relay valve 124, and/or, more generally, from the valve controller 102 to the atmosphere.

In the illustrated example of FIG. 1, the control circuitry 130 includes the first pressure sensor 132, the second pressure sensor 134, the processor 136, and the memory 138. In other examples, the control circuitry 130 may include different and/or additional component(s) in relation to those illustrated in FIG. 1. For example, the control circuitry 130 may include a position sensor configured to receive position data from a position indicator of the pneumatic actuator 108. As another example, the control circuitry 130 may include a user interface having one or more input device(s) (e.g., a button, a switch, a keypad, an audio sensor, and/or a liquid crystal display having a touchscreen) that permit(s) a user to enter data and commands into the processor 136, and/or one or more output device(s) (e.g., a light emitting diode, a speaker, and/or a liquid crystal display) for presenting visual, audible, textual, and/or graphical information. As another example, the control circuitry 130 may include a network communication interface having one or more transmitter(s), receiver(s), and/or transceiver(s) that facilitate(s) the exchange of signals, commands, data, and/or information between the valve controller 102 and one or more external device(s) (e.g., a process control field device, a server, a desktop computer, a laptop computer, a tablet, a smartphone, etc.) over a network.

The first pressure sensor 132 of FIG. 1 senses and/or measures the pressure of the pressurized control fluid being supplied from the control fluid inlet 114 of the valve controller 102 (e.g., the pressure of the pressurized control fluid between the control fluid inlet 114 and the first relay valve 122). Supply pressure data obtained from and/or provided by the first pressure sensor 132 may be stored in the memory 138 of FIG. 1. In some examples, the processor 136 accesses and/or obtains the supply pressure data from the memory 138. In other examples, the processor 136 instead accesses, obtains, and/or receives the supply pressure data directly from the first pressure sensor 132. In some examples, the processor 136 accesses, obtains, and/or receives the supply pressure data in connection with calculating one or more pneumatic volume(s) used when pulsing the first relay valve 122 of the valve controller 102, used to move the flow control member 110 of the control valve 106 in a first direction, and/or used to increase the pressure within the fluid chamber of the pneumatic actuator 108, as further described below.

The second pressure sensor 134 of FIG. 1 senses and/or measures the pressure of the pressurized control fluid at the control fluid port 126 of the valve controller 102 (e.g., the pressure of the pressurized control fluid between the first relay valve 122 and the second relay valve 124). Port pressure data obtained from and/or provided by the second pressure sensor 134 may be stored in the memory 138 of FIG. 1. In some examples, the processor 136 accesses and/or obtains the port pressure data from the memory 138. In other examples, the processor 136 instead accesses, obtains, and/or receives the port pressure data directly from the second pressure sensor 134. In some examples, the processor 136 accesses, obtains, and/or receives the port pressure data in connection with calculating one or more pneumatic volume(s) used when pulsing the second relay valve 124 of the valve controller 102, used to move the flow control member 110 of the control valve 106 in a second direction opposite the first direction, and/or used to decrease the pressure within the fluid chamber of the pneumatic actuator 108, as further described below.

The processor 136 of FIG. 1 can be implemented by any type(s) and/or any number(s) of processor(s), microprocessor(s), controller(s), microcontroller(s), circuit(s) and/or other electrical component(s). The processor 136 controls and/or manages one or more operation(s) of the first I/P converter 118 and/or the second I/P converter 120 based on an example input signal 142 received, accessed, and/or obtained by the control circuitry 130 of the valve controller 102. The input signal 142 identifies a positional setpoint (e.g., a desired position) for the flow control member 110 of the control valve 106, with the positional setpoint being achievable based on one or more operation(s) of the valve controller 102, the pneumatic actuator 108, and/or the control valve 106. In some examples, the input signal 142 may indicate to the processor 136 that the valve controller 102 is to operate the pneumatic actuator 108 in a manner that causes the flow control member 110 of the control valve 106 to move in a first direction. In other examples, the input signal 142 may indicate to the processor 136 that the valve controller 102 is to operate the pneumatic actuator 108 in a manner that causes the flow control member 110 of the control valve 106 to move in a second direction opposite the first direction. In still other examples, the input signal 142 may indicate to the processor 136 that the valve controller 102 is to operate the pneumatic actuator 108 in a manner that causes the flow control member 110 of the control valve 106 to maintain its current position. In still other examples, the input signal 142 may indicate to the processor 136 that the valve controller 102 is to increase the pressure within the fluid chamber of the pneumatic actuator 108. In still other examples, the input signal 142 may indicate to the processor 136 that the valve controller 102 is to decrease the pressure within the fluid chamber of the pneumatic actuator 108.

In response to the input signal 142 indicating that the valve controller 102 is to operate the pneumatic actuator 108 in a manner that causes the flow control member 110 of the control valve 106 to move in a first direction, the processor 136 generates an example first pulsed drive signal 144 that commands and/or instructs the first I/P converter 118 of the valve controller 102 to generate and/or output a pulsed pressurized control fluid (e.g., a pulsed pressurized pneumatic medium, such as pulses of pressurized air). The pulsed pressurized control fluid generated and/or output by the first I/P converter 118 is passed and/or delivered to the first relay valve 122 of the valve controller 102, which in turn causes the first relay valve 122 to be pulsed between a closed position and an open position. When the first relay valve 122 is in the open position during the pulsing of the first relay valve 122, pressurized control fluid received at the first relay valve 122 from the control fluid inlet 114 of the valve controller 102 passes and/or travels through the first relay valve 122, toward, into, and/or through the control fluid port 126 of the valve controller 102. Pressurized control fluid passing from the first relay valve 122 into and/or through the control fluid port 126 of the valve controller 102 passes and/or travels toward, into, and/or through the control fluid port 112 of the pneumatic actuator 108, which causes the flow control member 110 of the control valve 106 to move in the first direction, and/or which causes the pressure within the fluid chamber of the pneumatic actuator 108 to increase.

Figure 2:
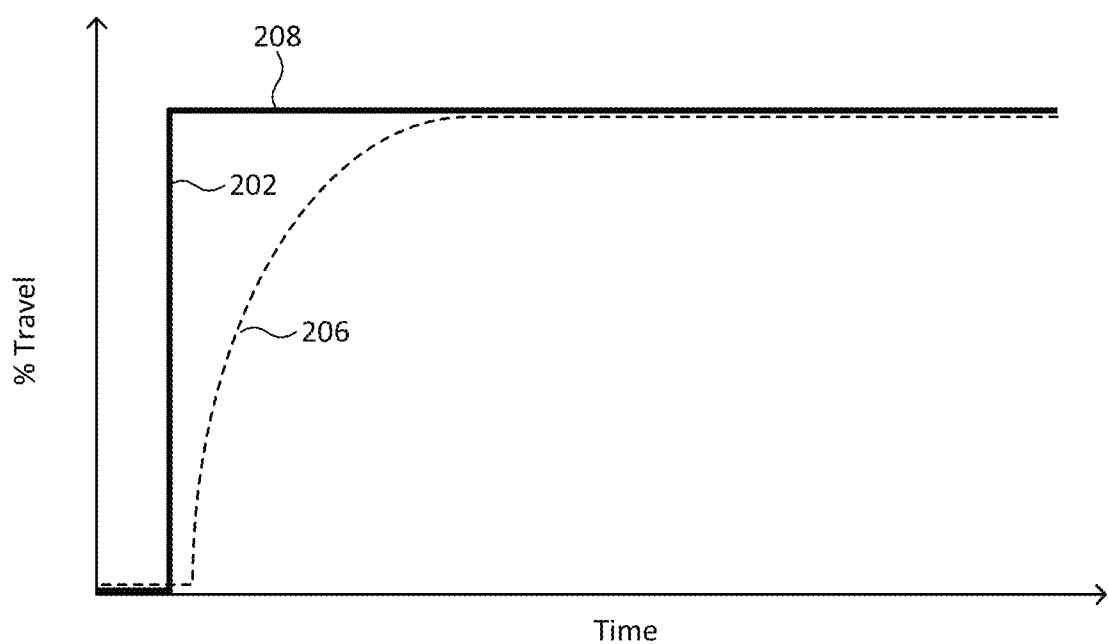
FIG. 2 illustrates a graphical representation of an example input signal received at the processor of the valve controller of FIG. 1, an example pulsed drive signal generated by the processor of the valve controller of FIG. 1 in response to the input signal, and an example plot of position of the flow control member of the control valve of FIG. 1 in response to the pulsed drive signal.
Figure 2:
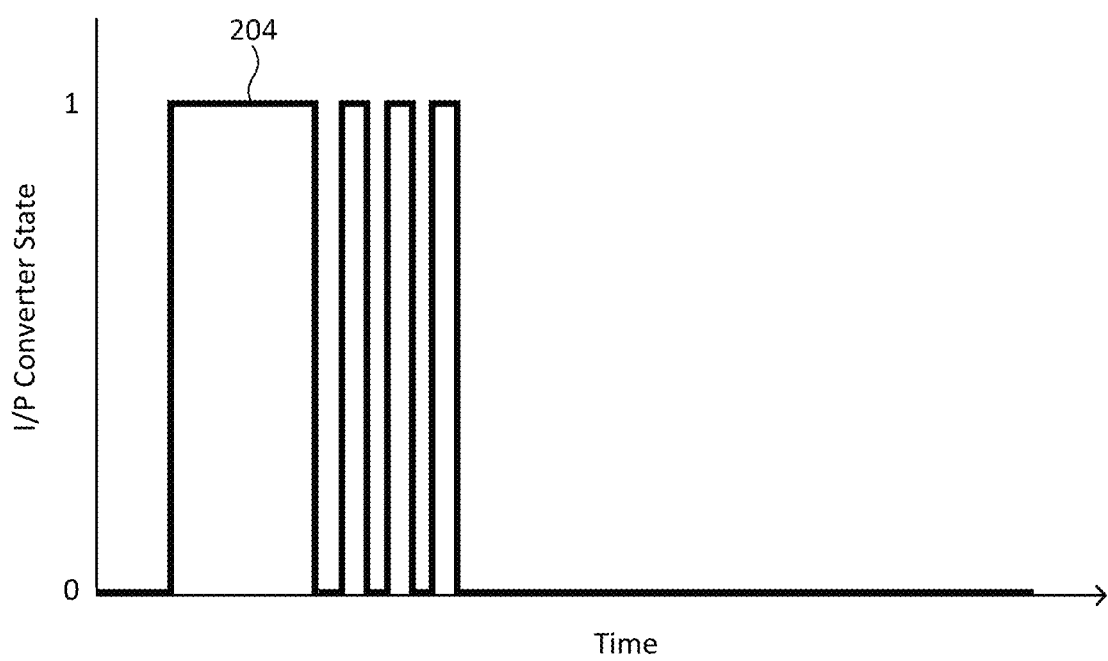

FIG. 2 illustrates a graphical representation of an example input signal 202 received at the processor 136 of the valve controller 102 of FIG. 1, an example pulsed drive signal 204 generated by the processor 136 of the valve controller 102 of FIG. 1 in response to the input signal 202, and an example plot 206 of position of the flow control member 110 of the control valve 106 of FIG. 1 in response to the pulsed drive signal 204. The input signal 202 of FIG. 2 is an example of the above-described input signal 142 in an instance where the input signal 142 indicates that the valve controller 102 is to operate the pneumatic actuator 108 in a manner that causes the flow control member 110 of the control valve 106 to move in a first direction. As shown in FIG. 2, the input signal 202 identifies an example positional setpoint 208 for the flow control member 110 of the control valve 106, with the positional setpoint 208 being expressed as a percentage of travel of the flow control member 110.

The pulsed drive signal 204 of FIG. 2 is an example of the first pulsed drive signal 144 described above. In the illustrated example of FIG. 2, the pulsed drive signal 204 includes pulses of different durations. In other examples, the pulses of the pulsed drive signal can be of a uniform duration. As shown in the plot 206 of FIG. 2, the flow control member 110 of the control valve 106 begins moving (e.g., in the first direction) toward the positional setpoint 208 identified by the input signal 202 in response to the initiation of the first pulse of the pulsed drive signal 204. As further shown in the plot 206 of FIG. 2, the flow control member 110 of the control valve 106 reaches the positional setpoint 208 identified by the input signal 202 in response to the completion of the last pulse of the pulsed drive signal 204.

Figure 3:
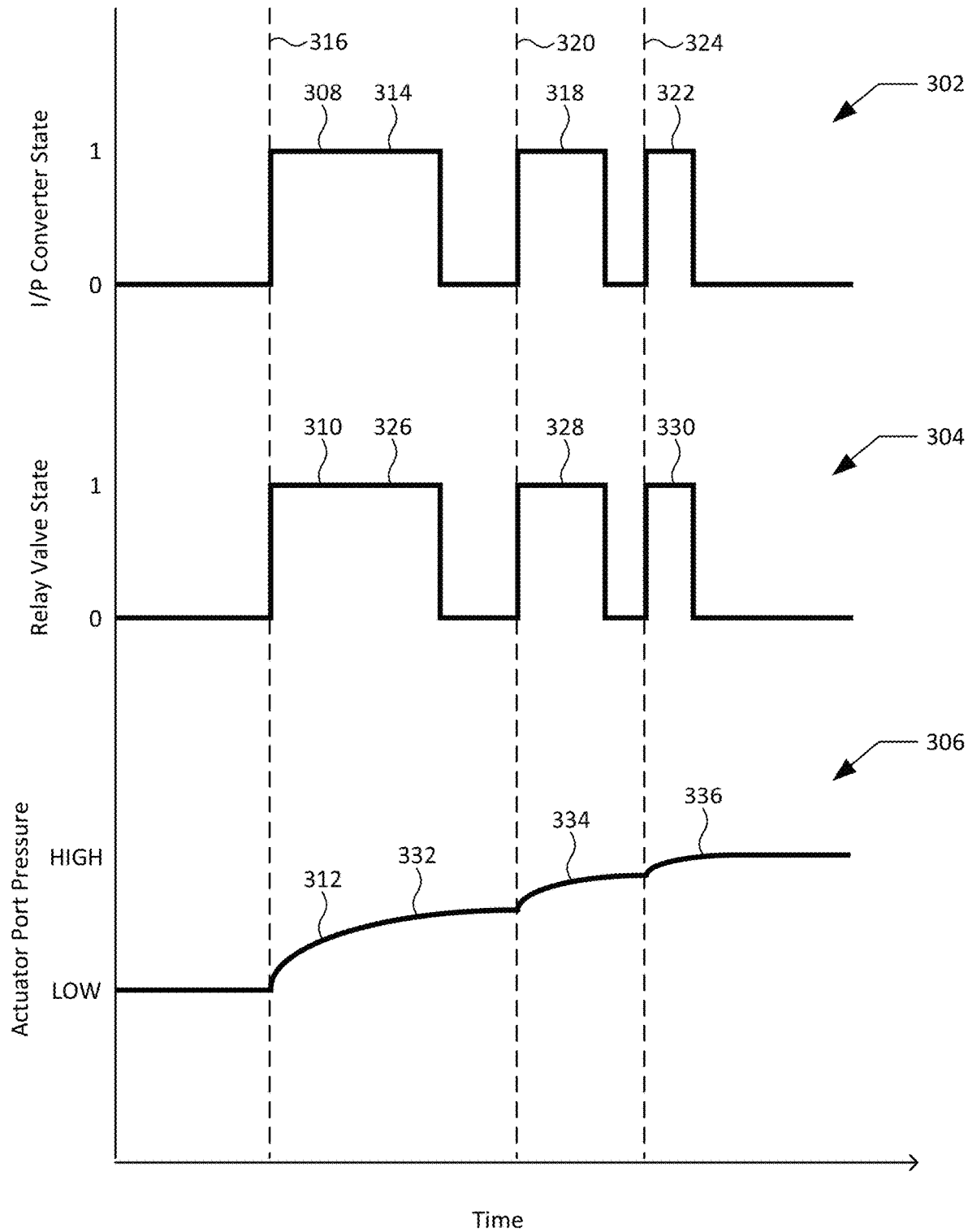
FIG. 3 illustrates a graphical representation of an example I/P converter state diagram, an example relay valve state diagram, and an example plot of actuator port pressure.

FIG. 3 illustrates a graphical representation of an example I/P converter state diagram 302, an example relay valve state diagram 304, and an example plot 306 of actuator port pressure. The I/P converter state diagram 302 of FIG. 3 represents an example pulsed operation 308 of the first I/P converter 118 of FIG. 1 in response to the first pulsed drive signal 144 of FIG. 1 received at the first I/P converter 118 from the processor 136 of FIG. 1. The relay valve state diagram 304 of FIG. 3 represents an example pulsed operation 310 of the first relay valve 122 of FIG. 1 in response to the pulsed operation 308 of the first I/P converter 118 of FIG. 1. The plot 306 of FIG. 3 represents an example increasing pressure 312 in the control fluid port 112 of the pneumatic actuator 108 of FIG. 1 in response to the pulsed operation 310 of the first relay valve 122 of FIG. 1.

In the illustrated example of FIG. 3, the pulsed operation 308 of the first I/P converter 118 includes an example first pulse 314 initiated at an example first time 316, an example second pulse 318 initiated as an example second time 320, and an example third pulse 322 initiated at an example third time 324. As shown in FIG. 3, the pulsed operation 308 of the first I/P converter 118 includes a total of three pulses (e.g., the first pulse 314, the second pulse 318, and the third pulse 322). In other examples, the pulsed operation 308 of the first I/P converter 118 can include a different total number (e.g., 2, 4, 5, 10, 20, etc.) of pulses. As further shown in FIG. 3, each pulse of the pulsed operation 308 of the first I/P converter 118 has a different duration. In other examples, two or more of the pulses of the pulsed operation 308 of the first I/P converter 118 can have a uniform (e.g., same) duration.

In the illustrated example of FIG. 3, the pulsed operation 310 of the first relay valve 122 includes an example first pulse 326 corresponding to the first pulse 314 of the pulsed operation 308 of the first I/P converter 118, an example second pulse 328 corresponding to the second pulse 318 of the pulsed operation 308 of the first I/P converter 118, and an example third pulse 330 corresponding to the third pulse 322 of the pulsed operation 308 of the first I/P converter 118. Furthermore, the increasing pressure 312 of the control fluid port 112 of the pneumatic actuator 108 includes an example first pressure increase 332 corresponding to the first pulse 326 of the pulsed operation 310 of the first relay valve 122, an example second pressure increase 334 corresponding to the second pulse 328 of the pulsed operation 310 of the first relay valve 122, and an example third pressure increase 336 corresponding to the third pulse 330 of the pulsed operation 310 of the first relay valve 122.

Returning to the illustrated example of FIG. 1, in response to the input signal 142 indicating that the valve controller 102 is to operate the pneumatic actuator 108 in a manner that causes the flow control member 110 of the control valve 106 to move in a second direction opposite the first direction, the processor 136 generates an example second pulsed drive signal 146 that commands and/or instructs the second I/P converter 120 of the valve controller 102 to generate and/or output a pulsed pressurized control fluid (e.g., a pulsed pressurized pneumatic medium, such as pulses of pressurized air). The pulsed pressurized control fluid generated and/or output by the second I/P converter 120 is passed and/or delivered to the second relay valve 124 of the valve controller 102, which in turn causes the second relay valve 124 to be pulsed between a closed position and an open position. When the second relay valve 124 is in the open position during the pulsing of the second relay valve 124, pressurized control fluid travels, passes, and/or returns from the control fluid port 112 of the pneumatic actuator 108, through the control fluid port 126 of the valve controller 102, then through the second relay valve 124 of the valve controller 102, and then toward, into, and/or through the control fluid exhaust 128 of the valve controller 102. Pressurized control fluid passing from the second relay valve 124 into and/or through the control fluid exhaust 128 is vented into the atmosphere. The return of the pressurized control fluid from the control fluid port 112 of the pneumatic actuator 108 to the control fluid port 126 of the valve controller 102, combined with the subsequent venting of the returned pressurized control fluid via the control fluid exhaust 128 of the valve controller 102, causes the flow control member 110 of the control valve 106 to move in the second direction opposite the first direction, and/or causes the pressure within the fluid chamber of the pneumatic actuator 108 to decrease.

Figure 4:
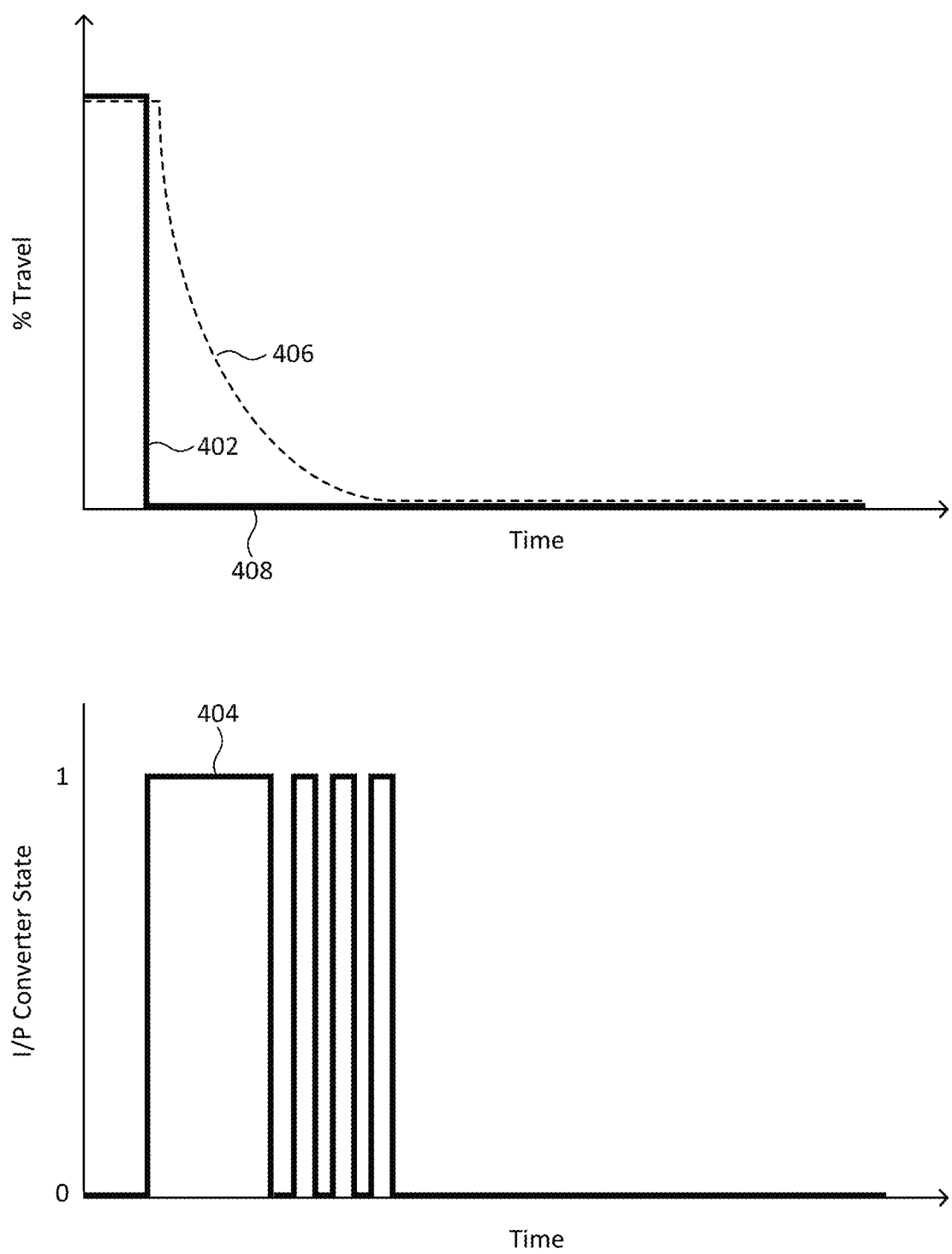
FIG. 4 illustrates another graphical representation of an example input signal received at the processor of the valve controller of FIG. 1, an example pulsed drive signal generated by the processor of the valve controller of FIG. 1 in response to the input signal, and an example plot of position of the flow control member of the control valve of FIG. 1 in response to the pulsed drive signal.

FIG. 4 illustrates another graphical representation of an example input signal 402 received at the processor 136 of the valve controller 102 of FIG. 1, an example pulsed drive signal 404 generated by the processor 136 of the valve controller 102 of FIG. 1 in response to the input signal 402, and an example plot 406 of position of the flow control member 110 of the control valve 106 of FIG. 1 in response to the pulsed drive signal 404. The input signal 402 of FIG. 4 is an example of the above-described input signal 142 in an instance where the input signal 142 indicates that the valve controller 102 is to operate the pneumatic actuator 108 in a manner that causes the flow control member 110 of the control valve 106 to move in a second direction opposite the first direction. As shown in FIG. 4, the input signal 402 identifies an example positional setpoint 408 for the flow control member 110 of the control valve 106, with the positional setpoint 408 being expressed as a percentage of travel of the flow control member 110.

The pulsed drive signal 404 of FIG. 4 is an example of the second pulsed drive signal 146 described above. In the illustrated example of FIG. 4, the pulsed drive signal 404 includes pulses of different durations. In other examples, the pulses of the pulsed drive signal can be of a uniform duration. As shown in the plot 406 of FIG. 4, the flow control member 110 of the control valve 106 begins moving (e.g., in the second direction) toward the positional setpoint 408 identified by the input signal 402 in response to the initiation of the first pulse of the pulsed drive signal 404. As further shown in the plot 406 of FIG. 4, the flow control member 110 of the control valve 106 reaches the positional setpoint 408 identified by the input signal 402 in response to the completion of the last pulse of the pulsed drive signal 404.

Figure 5:
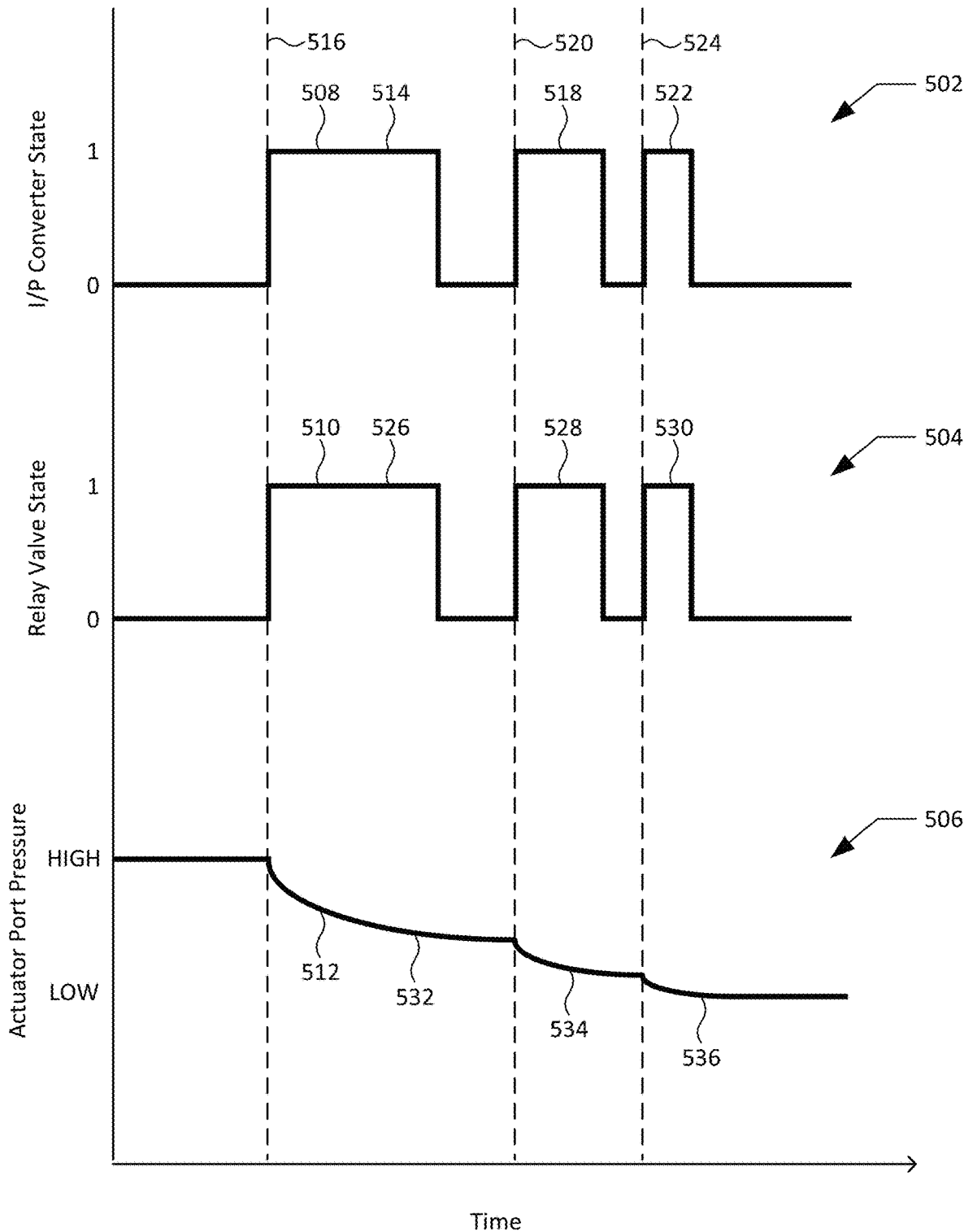
FIG. 5 illustrates another graphical representation of an example I/P converter state diagram, an example relay valve state diagram, and an example plot of actuator port pressure.

FIG. 5 illustrates another graphical representation of an example I/P converter state diagram 502, an example relay valve state diagram 504, and an example plot 506 of actuator port pressure. The I/P converter state diagram 502 of FIG. 5 represents an example pulsed operation 508 of the second I/P converter 120 of FIG. 1 in response to the second pulsed drive signal 146 of FIG. 1 received at the second I/P converter 120 from the processor 136 of FIG. 1. The relay valve state diagram 504 of FIG. 5 represents an example pulsed operation 510 of the second relay valve 124 of FIG. 1 in response to the pulsed operation 508 of the second I/P converter 120 of FIG. 1. The plot 506 of FIG. 5 represents an example decreasing pressure 512 in the control fluid port 112 of the pneumatic actuator 108 of FIG. 1 in response to the pulsed operation 510 of the second relay valve 124 of FIG. 1.

In the illustrated example of FIG. 5, the pulsed operation 508 of the second I/P converter 120 includes an example first pulse 514 initiated at an example first time 516, an example second pulse 518 initiated as an example second time 520, and an example third pulse 522 initiated at an example third time 524. As shown in FIG. 5, the pulsed operation 508 of the second I/P converter 120 includes a total of three pulses (e.g., the first pulse 514, the second pulse 518, and the third pulse 522). In other examples, the pulsed operation 508 of the second I/P converter 120 can include a different total number (e.g., 2, 4, 5, 10, 20, etc.) of pulses. As further shown in FIG. 5, each pulse of the pulsed operation 508 of the second I/P converter 120 has a different duration. In other examples, two or more of the pulses of the pulsed operation 508 of the second I/P converter 120 can have a uniform (e.g., same) duration.

In the illustrated example of FIG. 5, the pulsed operation 510 of the second relay valve 124 includes an example first pulse 526 corresponding to the first pulse 514 of the pulsed operation 508 of the second I/P converter 120, an example second pulse 528 corresponding to the second pulse 518 of the pulsed operation 508 of the second I/P converter 120, and an example third pulse 530 corresponding to the third pulse 522 of the pulsed operation 508 of the second I/P converter 120. Furthermore, the decreasing pressure 512 of the control fluid port 112 of the pneumatic actuator 108 includes an example first pressure decrease 532 corresponding to the first pulse 526 of the pulsed operation 510 of the second relay valve 124, an example second pressure decrease 534 corresponding to the second pulse 528 of the pulsed operation 510 of the second relay valve 124, and an example third pressure decrease 536 corresponding to the third pulse 530 of the pulsed operation 510 of the second relay valve 124.

Returning to the illustrated example of FIG. 1, the processor 136 calculates pneumatic volume usage associated with, based on, and/or corresponding to the pulsing of the first relay valve 122 (e.g., "pneumatic supply volume usage"). The pneumatic supply volume usage calculated by the processor 136 represents and/or corresponds to a pneumatic volume supplied during movement of the flow control member 110 of the control valve 106 in the first direction. In some examples, the processor 136 calculates the pneumatic supply volume usage on a pulse-by-pulse basis for a given movement of the flow control member 110 of the control valve 106 in the first direction. For example, the processor 136 can calculate the pneumatic supply volume usage for an individual pneumatic pulse of a pneumatic medium by: (1) calculating (e.g., based on the ideal gas law) a change in mass for the pneumatic medium during the pneumatic pulse; and (2) converting the calculated change in mass to a calculated change in volume (e.g., based on the density of the pneumatic medium), as generally shown via Equations 1-4 below.

$$PV = mRT \qquad \text{Equation 1:}$$

Equation 1 is the ideal gas law. In equation 1, the variable P represents pressure, the variable V represents volume, the variable m represents mass, the variable R represents the ideal gas constant, and the variable T represents temperature.

$$\left(\frac{\Delta P}{\Delta t}\right)(V) = \left(\frac{\Delta m}{\Delta t}\right)(RT) \qquad \text{Equation 2}$$

In equation 2, the variable t represents time. Equation 2 is derived from Equation 1 in a scenario (e.g., applicable to the pneumatic volume usage calculations performed by the processor 136 of FIG. 1) where V, R, and T are known and constant (e.g., non-varying). In this regard, V represents a predetermined volume of the pneumatic pulse (e.g., determined based on a known valve size and a known flow capacity) that is known to and/or otherwise accessible to the processor 136 (e.g., from the memory 138 of the valve controller 102) in connection with the processor 136 calculating the pneumatic volume usage for the pneumatic pulse. Predetermined values for R and T are likewise known to and/or otherwise accessible to the processor 136 (e.g., from the memory 138 of the valve controller 102) in connection with the processor 136 calculating the pneumatic volume usage for the pneumatic pulse.

$$(m_2 - m_1) = (P_2 - P_1)\left(\frac{V}{RT}\right) \qquad \text{Equation 3}$$

Equation 3 is derived from Equation 2 by solving Equation 2 for ($\Delta m/\Delta t$). In equation 3, ($m_2-m_1$) corresponds to the change in mass of the pneumatic medium during the duration of the pneumatic pulse, where $m_1$ is the mass of the pneumatic medium at the initiation of the duration of the pneumatic pulse, and $m_2$ is the mass of the pneumatic medium at the completion of the duration of the pneumatic pulse. In equation 3, ($P_2-P_1$) corresponds to the change in pressure of the pneumatic medium during the duration of the pneumatic pulse, where $P_1$ is the supply pressure of the pneumatic medium (e.g., as sensed and/or measured by the first pressure sensor 132 of FIG. 1) at the initiation of the duration of the pneumatic pulse, and $P_2$ is the supply pressure of the pneumatic medium (e.g., as sensed and/or measured by the first pressure sensor 132 of FIG. 1) at the completion of the duration of the pneumatic pulse.

$$(V_2-V_1)=(m_2-m_1)/D \qquad \text{Equation 4:}$$

Equation 4 converts the change in mass ($m_2-m_1$) of the pneumatic medium during the duration of the pneumatic pulse (e.g., ($m_2-m_1$), as calculated via Equation 3 above) into a change in volume ($V_2-V_1$) of the pneumatic medium during the duration of the pulse. In Equation 4, D represents a predetermined density of the pneumatic medium that is known to and/or otherwise accessible to the processor 136 (e.g., from the memory 138 of the valve controller 102) in connection with the processor 136 calculating the pneumatic volume usage for the pneumatic pulse. The change in volume ($V_2-V_1$) calculated via Equation 4 represents the pneumatic volume usage (e.g., the pneumatic supply volume usage) for the individual pneumatic pulse.

In some examples, the processor 136 calculates the pneumatic supply volume usage for a given movement of the flow control member 110 of the control valve 106 by summing together the pneumatic supply volume usages calculated by the processor 136 for individual ones of the pulses occurring during the given movement. In some examples, the processor 136 calculates the cumulative pneumatic supply volume usage for a series of given movements (e.g., individual movements occurring and/or repeated over a span of time) of the flow control member 110 of the control valve 106 in the first direction by summing together the pneumatic supply volume usages calculated by the processor 136 for individual ones of the given movements.

The processor 136 of the valve controller 102 additionally or alternatively calculates pneumatic volume usage associated with, based on, and/or corresponding to the pulsing of the second relay valve 124 (e.g., "pneumatic exhaust volume usage"). The pneumatic exhaust volume usage calculated by the processor 136 represents and/or corresponds to a pneumatic volume exhausted during movement of the flow control member 110 of the control valve 106 in the second direction. In some examples, the processor 136 calculates the pneumatic exhaust volume usage on a pulse-by-pulse basis for a given movement of the flow control member 110 of the control valve 106 in the second direction. Pulse-by-pulse pneumatic exhaust volume usage can be calculated by the processor 136 of FIG. 1 using Equations 1-4 described above, modified such that the pressure differential ($P_2-P_1$) for a given pulse is based on port pressure data sensed and/or measured by the second pressure sensor 134 of FIG. 1 instead of being based on supply pressure data sensed and/or measured by the first pressure sensor 132 of FIG. 1.

In some examples, the processor 136 calculates the pneumatic exhaust volume usage for a given movement of the flow control member 110 of the control valve 106 by summing together the pneumatic exhaust volume usages calculated by the processor 136 for individual ones of the pulses occurring during the given movement. In some examples, the processor 136 calculates the cumulative pneumatic exhaust volume usage for a series of given movements (e.g., individual movements occurring and/or repeated over a span of time) of the flow control member 110 of the control valve 106 in the second direction by summing together the pneumatic exhaust volume usages calculated by the processor 136 for individual ones of the given movements.

The memory 138 of FIG. 1 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 138 of FIG. 1 may be stored in any file and/or data structure format, organization scheme, and/or arrangement. The memory 138 of FIG. 1 is accessible to the processor 136 and/or, more generally, to the control circuitry 130 of the valve controller 102 of FIG. 1.

In some examples, the memory 138 of FIG. 1 stores supply pressure data sensed and/or measured by the first pressure sensor 132 of FIG. 1. In some examples, the memory 138 of FIG. 1 stores port pressure data sensed and/or measured by the second pressure sensor 134 of FIG. 1. In some examples, the memory 138 of FIG. 1 stores one or more input signal(s) (e.g., the input signal 142 of FIG. 1) received at the processor 136, and/or, more generally, at the control circuitry 130 of the valve controller 102. In some examples, the memory 138 of FIG. 1 stores one or more pulsed drive signal(s) (e.g., the first pulsed drive signal 144 and/or the second pulsed drive signal 146 of FIG. 1) generated by the processor 136, and/or, more generally, by the control circuitry 130 of the valve controller 102. In some examples, the memory 138 of FIG. 1 stores pulse volume data corresponding to one or more predetermined volume(s) of one or more pulse(s) of pressurized control fluid to be output from the first I/P converter 118 and/or the second I/P converter 120 of the valve controller 102.

In some examples, the memory 138 of FIG. 1 stores one or more algorithm(s) and/or equation(s) to be used by the processor 136, and/or, more generally, by the control circuitry 130 of the valve controller 102 to calculate pneumatic volume usage and/or consumption associated with pulsing the first relay valve 122 of the valve controller 102, associated with moving the control valve 106 in a first direction, and/or associated with increasing the pressure within the fluid chamber of the pneumatic actuator 108. In some examples, the memory 138 of FIG. 1 stores one or more algorithm(s) and/or equation(s) to be used by the processor 136, and/or, more generally, by the control circuitry 130 of the valve controller 102 to calculate pneumatic volume usage and/or consumption associated with pulsing the second relay valve 124 of the valve controller 102, associated with moving the control valve 106 in a second direction opposite the first direction, and/or associated with decreasing the pressure within the fluid chamber of the pneumatic actuator 108. In some examples, the memory 138 of FIG. 1 stores one or more algorithm(s) and/or equation(s) to be used by the processor 136, and/or, more generally, by the control circuitry 130 of the valve controller 102 to calculate total and/or aggregate pneumatic volume usage and/or consumption over time.

In some examples, the memory 138 of FIG. 1 stores pneumatic volume usage and/or consumption data calculated by the processor 136, and/or, more generally, by the control circuitry 130 of the valve controller 102 in association with pulsing the first relay valve 122 of the valve controller 102, in association with moving the control valve 106 in a first direction, and/or in association with increasing the pressure within the fluid chamber of the pneumatic actuator 108. In some examples, the memory 138 of FIG. 1 stores pneumatic volume usage and/or consumption data calculated by the processor 136, and/or, more generally, by the control circuitry 130 of the valve controller 102 in association with pulsing the second relay valve 124 of the valve controller 102, in association with moving the control valve 106 in a second direction opposite the first direction, and/or in association with decreasing the pressure within the fluid chamber of the pneumatic actuator 108. In some examples, the memory 138 of FIG. 1 stores total and/or aggregate pneumatic volume usage and/or consumption data calculated over time by the processor 136, and/or, more generally, by the control circuitry 130 of the valve controller 102.

While an example manner of implementing the example valve controller 102 is illustrated in FIG. 1, one or more of the elements, processes and/or devices illustrated in FIG. 1 may be combined, divided, re-arranged, omitted, eliminated and/or implemented in any other way. Further, the example pressure regulator 116, the example first I/P converter 118, the example second I/P converter 120, the example first relay valve 122, the example second relay valve 124, the example first pressure sensor 132, the example second pressure sensor 134, the example processor 136, the example memory 138, and/or, more generally, the example valve controller 102 of FIG. 1 may be implemented by hardware, software, firmware and/or any combination of hardware, software and/or firmware. Thus, for example, any of the example pressure regulator 116, the example first I/P converter 118, the example second I/P converter 120, the example first relay valve 122, the example second relay valve 124, the example first pressure sensor 132, the example second pressure sensor 134, the example processor 136, the example memory 138, and/or, more generally, the example valve controller 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pressure regulator 116, the example first I/P converter 118, the example second I/P converter 120, the example first relay valve 122, the example second relay valve 124, the example first pressure sensor 132, the example second pressure sensor 134, the example processor 136, and/or the example memory 138 of the valve controller 102 of FIG. 1 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example valve controller 102 of FIG. 1 may include one or more element(s), process(es) and/or device(s) in addition to, or instead of, those illustrated in FIG. 1, and/or may include more than one of any or all of the illustrated elements, processes and devices.

Figure 6:
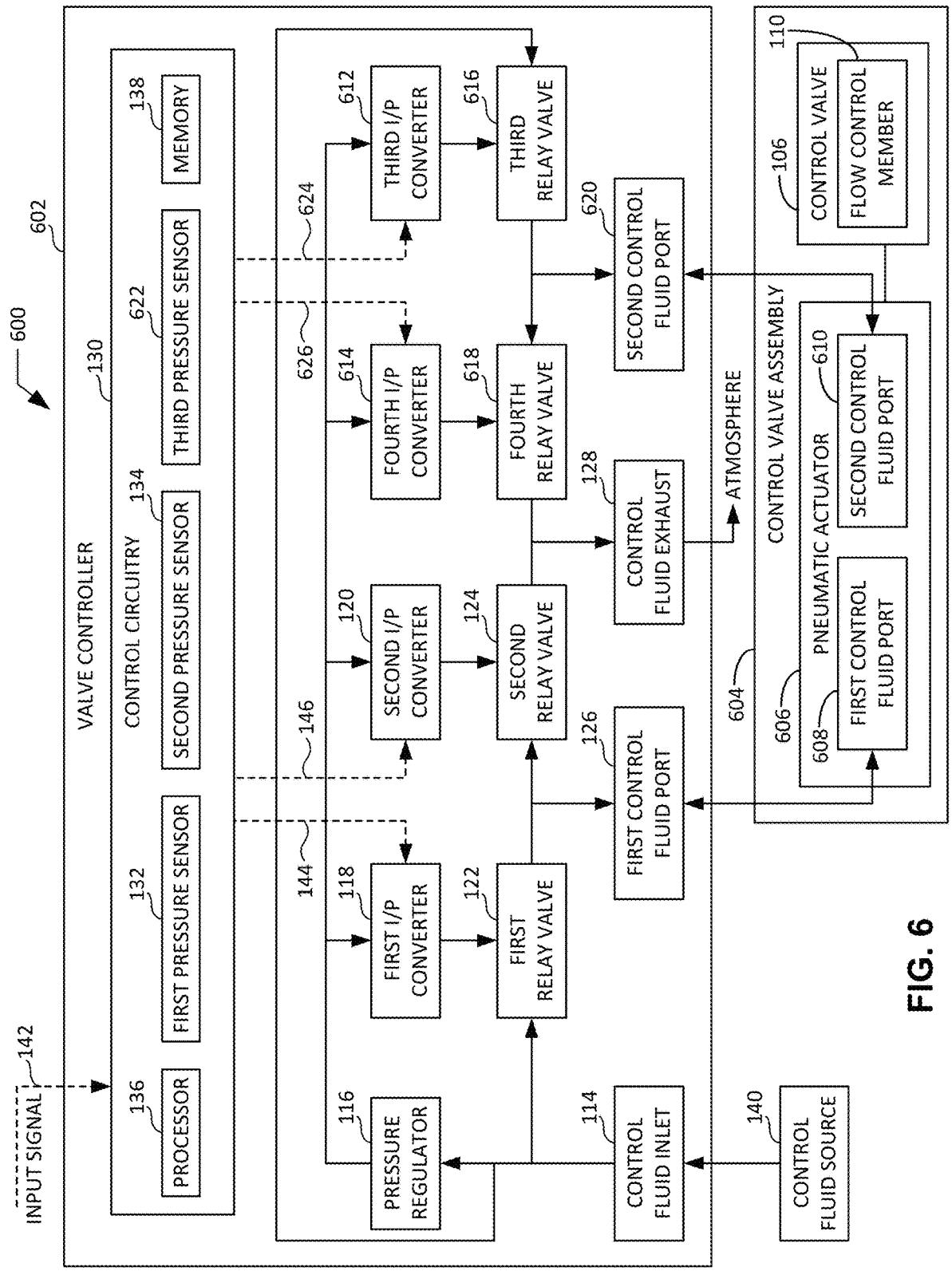
FIG. 6 is a block diagram of an example process control system including an example valve controller constructed in accordance with the teachings of this disclosure for quantifying pneumatic volume usage.

FIG. 6 is a block diagram of an example process control system 600 including an example valve controller 602 constructed in accordance with the teachings of this disclosure for quantifying pneumatic volume usage. The valve controller 602 of FIG. 6 is a modified implementation of the valve controller 102 of FIG. 1 described above. In the illustrated example of FIG. 6, the process control system 600 further includes an example control valve assembly 604 operatively coupled to the valve controller 602. The control valve assembly 604 of FIG. 6 includes the control valve 106 of FIG. 1 described above, and further includes an example pneumatic actuator 606 that is a modified implementation of the pneumatic actuator 108 of FIG. 1 described above.

The pneumatic actuator 606 of FIG. 6 is a double-acting pneumatic actuator, which may be implemented by and/or as any linear or rotary actuator (e.g., a piston actuator, a rotary vane actuator, a rotary rack-and-pinion actuator, a rotary scotch-yoke actuator, etc.). In the illustrated example of FIG. 6, the pneumatic actuator 606 is operatively coupled to the control valve 106 and, more specifically, to the valve shaft of the control valve 106. The pneumatic actuator 606 includes an example first control fluid port 608 in fluid communication with a first fluid chamber of the pneumatic actuator 606, and an example second control fluid port 610 in fluid communication with a second fluid chamber of the pneumatic actuator 606. The pneumatic actuator 606 further includes an internal stem and/or piston. The first control fluid port 608 of the pneumatic actuator 606 receives a pressurized control fluid (e.g., a pressurized pneumatic medium, such as pressurized air) from the valve controller 602 that causes the stem and/or piston of the pneumatic actuator 606 to move in a first direction, and/or that causes the pressure within the first fluid chamber of the pneumatic actuator 606 to increase. The second control fluid port 610 of the pneumatic actuator 606 receives a pressurized control fluid (e.g., a pressurized pneumatic medium, such as pressurized air) from the valve controller 602 that causes the stem and/or piston of the pneumatic actuator 606 to move in a second direction opposite the first direction, and/or that causes the pressure within the second fluid chamber of the pneumatic actuator 606 to increase. A force and/or load generated by the moving stem and/or piston of the pneumatic actuator 606 is transformed into a force and/or load on the valve shaft of the control valve 106, which causes the flow control member 110 of the control valve 106 to move between the first position and the second position (e.g., in either the first direction or the second direction), as described above.

The operative coupling of the stem and/or piston of the pneumatic actuator 606 to the valve shaft and/or the flow control member 110 of the control valve 106 results in a correlation between the position of the stem and/or piston of the pneumatic actuator 606 and the position of the flow control member 110 of the control valve 106. Accordingly, a position of the flow control member 110 of the control valve 106 may be determined based on a known and/or measured position of the stem and/or piston of the pneumatic actuator 606, and vice-versa. In some examples, a position indicator may be operatively coupled to the stem and/or piston of the pneumatic actuator 606 such that movement of the stem and/or piston results in corresponding movement of the position indicator. Based on the above-described correlation between the position of the stem and/or piston of the pneumatic actuator 606 and the position of the flow control member 110 of the control valve 106, the position indicator can provide an indication of the position of the stem and/or piston of the pneumatic actuator 606, and/or an indication of the position of the flow control member 110 of the control valve 106. Position data generated by the position indicator of the pneumatic actuator 606 can be transmitted to a position sensor of the valve controller 602 via a wired or wireless connection.

The valve controller 602 of FIG. 6 is a digital valve controller. The valve controller 602 controls the supply of pressurized control fluid (e.g., a pressurized pneumatic medium, such as pressurized air) to the first control fluid port 608 and the second control fluid port 610 of the pneumatic actuator 606, which in turn controls the position of the flow control member 110 of the control valve 106. In the illustrated example of FIG. 6, the valve controller 602 includes the control fluid inlet 114, the pressure regulator 116, the first I/P converter 118, the second I/P converter 120, the first relay valve 122, the second relay valve 124, the control fluid port 126 (e.g., now a first control fluid port 126), the control fluid exhaust 128, and the control circuitry 130 (e.g., including the first pressure sensor 132, the second pressure sensor 134, the processor 136, and the memory 138) of the valve controller 102 of FIG. 1 described above, with certain of the aforementioned components being modified as further described below. The valve controller 602 of FIG. 6 further includes an example third I/P converter 612, an example fourth I/P converter 614, an example third relay valve 616, an example fourth relay valve 618, an example second control fluid port 620, and an example third pressure sensor.

The control fluid inlet 114 of FIG. 6 is in fluid communication with the control fluid source 140. The control fluid inlet 114 is also in fluid communication with the pressure regulator 116, the first relay valve 122, and the third relay valve 616 of the valve controller 602. As shown in FIG. 6, the control fluid inlet 114 is operatively positioned between the control fluid source 140 on the one hand, and each of the pressure regulator 116, the first relay valve 122, and the third relay valve 616 on the other hand. Fluid communications to and/or from the control fluid inlet 114 can be implemented via one or more fluid passageway(s) formed by one or more conduit(s), channel(s), and/or tube(s). The control fluid inlet 114 receives a pressurized control fluid (e.g., a pressurized pneumatic medium, such as pressurized air) from the control fluid source 140. The pressurized control fluid received at the control fluid inlet 114 is passed and/or delivered to the pressure regulator 116, the first relay valve 122, and the third relay valve 616 of the valve controller 602.

The pressure regulator 116 of FIG. 6 is in fluid communication with the control fluid inlet 114, the first I/P converter 118, the second I/P converter 120, the third I/P converter 612, and the fourth I/P converter 614 of the valve controller 602. As shown in FIG. 6, the pressure regulator 116 is operatively positioned between the control fluid inlet 114 on the one hand, and each of the first I/P converter 118, the second I/P converter 120, the third I/P converter 612, and the fourth I/P converter 614 on the other hand. Fluid communications to and/or from the pressure regulator 116 can be implemented via one or more fluid passageway(s) formed by one or more conduit(s), channel(s), and/or tube(s). The pressure regulator 116 modifies (e.g., reduces) the pressure of the pressurized control fluid as received at the control fluid inlet 114 (e.g., from the control fluid source 140) to a desired output pressure for delivery to the first I/P converter 118, the second I/P converter 120, the third I/P converter 612, and the fourth I/P converter 614. The pressurized control fluid exiting the pressure regulator 116 and/or being delivered to the first I/P converter 118, the second I/P converter 120, the third I/P converter 612, and the fourth I/P converter 614 accordingly has a modified (e.g., reduced) pressure relative to that of the pressurized control fluid as received at the control fluid inlet 114.

The first I/P converter 118 and the second I/P converter 120 of the valve controller 602 of FIG. 6 are respectively structured and/or configured in a manner substantially identical to that described above in connection with the first I/P converter 118 and the second I/P converter 120 of the valve controller 102 of FIG. 1, and accordingly operate and/or function in a manner substantially identical to that described above in connection with the first I/P converter 118 and the second I/P converter 120 of the valve controller 102 of FIG. 1.

The third I/P converter 612 of FIG. 6 is in fluid communication with the pressure regulator 116 and the third relay valve 616 of the valve controller 602. As shown in FIG. 6, the third I/P converter 612 is operatively positioned between the pressure regulator 116 and the third relay valve 616. Fluid communications to and/or from the third I/P converter 612 can be implemented via one or more fluid passageway(s) formed by one or more conduit(s), channel(s), and/or tube(s). In some examples, in response to receiving a pulsed drive signal (e.g., the example third pulsed drive signal 624 described below) from the control circuitry 130, the third I/P converter 612 converts and/or transforms the pressurized control fluid received at the third I/P converter 612 (e.g., from the pressure regulator 116) into a pulsed pressurized control fluid (e.g., a pulsed pressurized pneumatic medium, such as pulses of pressurized air) generated and/or output by the third I/P converter 612. The pulsed pressurized control fluid generated and/or output by the third I/P converter 612 is passed and/or delivered to the third relay valve 616 of the valve controller 602.

The fourth I/P converter 614 of FIG. 6 is in fluid communication with the pressure regulator 116 and the fourth relay valve 618 of the valve controller 602. As shown in FIG. 6, the fourth I/P converter 614 is operatively positioned between the pressure regulator 116 and the fourth relay valve 618. Fluid communications to and/or from the fourth I/P converter 614 can be implemented via one or more fluid passageway(s) formed by one or more conduit(s), channel(s), and/or tube(s). In some examples, in response to receiving a pulsed drive signal (e.g., the example fourth pulsed drive signal 626 described below) from the control circuitry 130, the fourth I/P converter 614 converts and/or transforms the pressurized control fluid received at the fourth I/P converter 614 (e.g., from the pressure regulator 116) into a pulsed pressurized control fluid (e.g., a pulsed pressurized pneumatic medium, such as pulses of pressurized air) generated and/or output by the fourth I/P converter 614. The pulsed pressurized control fluid generated and/or output by the fourth I/P converter 614 is passed and/or delivered to the fourth relay valve 618 of the valve controller 602.

The first relay valve 122 and the second relay valve 124 of the valve controller 602 of FIG. 6 are respectively structured and/or configured in a manner substantially identical to that described above in connection with first relay valve 122 and the second relay valve 124 of the valve controller 102 of FIG. 1, and accordingly operate and/or function in a manner substantially identical to that described above in connection with the first relay valve 122 and the second relay valve 124 of the valve controller 102 of FIG. 1.

The third relay valve 616 of FIG. 6 is in fluid communication with the control fluid inlet 114, the third I/P converter 612, the fourth relay valve 618, and the second control fluid port 620 of the valve controller 602. As shown in FIG. 6, the third relay valve 616 is operatively positioned between the control fluid inlet 114 on the one hand, and both the fourth relay valve 618 and the second control fluid port 620 on the other hand, with the third relay valve 616 being fluidically controlled by the output of pressurized control fluid from the third I/P converter 612. Fluid communications to and/or from the third relay valve 616 can be implemented via one or more fluid passageway(s) formed by one or more conduit(s), channel(s), and/or tube(s).

Actuation of the third relay valve 616 (e.g., between a closed position and an open position) is controlled based on the pressurized control fluid (e.g., the pulsed pressurized control fluid) output by the third I/P converter 612 to the third relay valve 616. In some examples, the third relay valve 616 is actuated to and/or maintained in a closed position when the pressurized control fluid output by the third I/P converter 612 is relatively high (e.g., above a threshold pressure), and is actuated to and/or maintained in an open position when the pressurized control fluid output by the third I/P converter 612 is relatively lower (e.g., below a threshold pressure). In other examples, the third relay valve 616 is actuated to and/or maintained in a closed position when the pressurized control fluid output by the third I/P converter 612 is relatively low (e.g., below a threshold pressure), and is actuated to and/or maintained in an open position when the pressurized control fluid output by the third I/P converter 612 is relatively high (e.g., above a threshold pressure).

When the third relay valve 616 is in a closed position, pressurized control fluid received at the third relay valve 616 from the control fluid inlet 114 of the valve controller 602 is prevented from passing and/or traveling through the third relay valve 616. When the third relay valve 616 is actuated to an open position (e.g., from the closed position), pressurized control fluid received at the third relay valve 616 from the control fluid inlet 114 of the valve controller 602 passes and/or travels through the third relay valve 616 to the fourth relay valve 618 and/or the second control fluid port

620 of the valve controller 602. When the third relay valve 616 is in an open position and the fourth relay valve 618 is in a closed position, pressurized control fluid passing and/or traveling through the third relay valve 616 is forced toward, into, and/or through the second control fluid port 620 of the valve controller 602. Pressurized control fluid passing from the third relay valve 616 into and/or through the second control fluid port 620 of the valve controller 602 is forced toward, into, and/or through the second control fluid port 610 of the pneumatic actuator 606, which causes movement of the flow control member 110 of the control valve 106 in the second direction, and/or which causes the pressure within the second fluid chamber of the pneumatic actuator 606 to increase.

The fourth relay valve 618 of FIG. 6 is in fluid communication with the fourth I/P converter 614, the third relay valve 616, the second control fluid port 620, and the control fluid exhaust 128 of the valve controller 602. As shown in FIG. 6, the fourth relay valve 618 is operatively positioned between both the third relay valve 616 and the second control fluid port 620 on the one hand, and the control fluid exhaust 128 on the other hand, with the fourth relay valve 618 being fluidically controlled by the output of pressurized control fluid from the fourth I/P converter 614. Fluid communications to and/or from the fourth relay valve 618 can be implemented via one or more fluid passageway(s) formed by one or more conduit(s), channel(s), and/or tube(s).

Actuation of the fourth relay valve 618 (e.g., between a closed position and an open position) is controlled based on the pressurized control fluid (e.g., the pulsed pressurized control fluid) output by the fourth I/P converter 614 to the fourth relay valve 618. In some examples, the fourth relay valve 618 is actuated to and/or maintained in a closed position when the pressurized control fluid output by the fourth I/P converter 614 is relatively high (e.g., above a threshold pressure), and is actuated to and/or maintained in an open position when the pressurized control fluid output by the fourth I/P converter 614 is relatively lower (e.g., below a threshold pressure). In other examples, the fourth relay valve 618 is actuated to and/or maintained in a closed position when the pressurized control fluid output by the fourth I/P converter 614 is relatively low (e.g., below a threshold pressure), and is actuated to and/or maintained in an open position when the pressurized control fluid output by the fourth I/P converter 614 is relatively high (e.g., above a threshold pressure).

When the fourth relay valve 618 is in a closed position, pressurized control fluid received at the fourth relay valve 618 from the third relay valve 616 and/or the second control fluid port 620 of the valve controller 602 is prevented from passing and/or traveling through the fourth relay valve 618. When the fourth relay valve 618 is actuated to an open position (e.g., from the closed position), pressurized control fluid received at the fourth relay valve 618 from the third relay valve 616 and/or the second control fluid port 620 of the valve controller 602 passes and/or travels through the fourth relay valve 618 to the control fluid exhaust 128 of the valve controller 602. When the fourth relay valve 618 is in an open position and the third relay valve 616 is in a closed position, pressurized control fluid travels, passes, and/or returns from the second control fluid port 610 of the pneumatic actuator 606, through the second control fluid port 620 of the valve controller 602, then through the fourth relay valve 618 of the valve controller 602, and then toward, into, and/or through the control fluid exhaust 128 of the valve controller 602. Pressurized control fluid passing from the fourth relay valve 618 into and/or through the control fluid exhaust 128 is vented into the atmosphere. The return of the pressurized control fluid from the second control fluid port 610 of the pneumatic actuator 606 to the second control fluid port 620 of the valve controller 602, combined with the subsequent venting of the returned pressurized control fluid via the control fluid exhaust 128 of the valve controller 602, causes movement of the flow control member 110 of the control valve 106 in the first direction, and/or causes the pressure within the second fluid chamber of the pneumatic actuator 606 to decrease.

The first control fluid port 126 of FIG. 6 is in fluid communication with the first relay valve 122 and the second relay valve 124 of the valve controller 602. The first control fluid port 126 of the valve controller 602 is also in fluid communication with the first control fluid port 608 of the pneumatic actuator 606. As shown in FIG. 6, the first control fluid port 126 is operatively positioned between both the first relay valve 122 and the second relay valve 124 of the valve controller 602 on the one hand, and the first control fluid port 608 of the pneumatic actuator 606 on the other hand. Fluid communications to and/or from the first control fluid port 126 can be implemented via one or more fluid passageway(s) formed by one or more conduit(s), channel(s), and/or tube(s). The first control fluid port 126 of the valve controller 602 facilitates the supply of pressurized control fluid from the first relay valve 122, and/or, more generally, from the valve controller 602 to the first control fluid port 608 of the pneumatic actuator 606. The first control fluid port 126 of the valve controller 602 also facilitates the return of pressurized control fluid from the first control fluid port 608 of the pneumatic actuator 606 to the second relay valve 124, and/or, more generally, to the valve controller 602.

The second control fluid port 620 of FIG. 6 is in fluid communication with the third relay valve 616 and the fourth relay valve 618 of the valve controller 602. The second control fluid port 620 of the valve controller 602 is also in fluid communication with the second control fluid port 610 of the pneumatic actuator 606. As shown in FIG. 6, the second control fluid port 620 is operatively positioned between both the third relay valve 616 and the fourth relay valve 618 of the valve controller 602 on the one hand, and the second control fluid port 610 of the pneumatic actuator 606 on the other hand. Fluid communications to and/or from the second control fluid port 620 can be implemented via one or more fluid passageway(s) formed by one or more conduit(s), channel(s), and/or tube(s). The second control fluid port 620 of the valve controller 602 facilitates the supply of pressurized control fluid from the third relay valve 616, and/or, more generally, from the valve controller 602 to the second control fluid port 610 of the pneumatic actuator 606. The second control fluid port 620 of the valve controller 602 also facilitates the return of pressurized control fluid from the second control fluid port 610 of the pneumatic actuator 606 to the fourth relay valve 618, and/or, more generally, to the valve controller 602.

The control fluid exhaust 128 of FIG. 6 is in fluid communication with the second relay valve 124 and the fourth relay valve 618 of the valve controller 602. As shown in FIG. 6, the control fluid exhaust 128 is operatively positioned between both the second relay valve 124 and the fourth relay valve 618 on the one hand, and the atmosphere located externally from the valve controller 602 on the other hand. Fluid communications to and/or from the control fluid exhaust 128 can be implemented via one or more fluid passageway(s) formed by one or more conduit(s), channel(s), and/or tube(s). The control fluid exhaust 128 facilitates the venting of pressurized control fluid from the second relay valve 124 and the fourth relay valve 618 to the atmosphere, and/or, more generally, from the valve controller 602 to the atmosphere.

The first pressure sensor 132 of FIG. 6 senses and/or measures the pressure of the pressurized control fluid being supplied from the control fluid inlet 114 of the valve controller 602 (e.g., the pressure of the pressurized control fluid between the control fluid inlet 114 and the first relay valve 122, and/or between the control fluid inlet 114 and the third relay valve 616). Supply pressure data obtained from and/or provided by the first pressure sensor 132 may be stored in the memory 138 of FIG. 6. In some examples, the processor 136 accesses and/or obtains the supply pressure data from the memory 138. In other examples, the processor 136 instead accesses, obtains, and/or receives the supply pressure data directly from the first pressure sensor 132. In some examples, the processor 136 accesses, obtains, and/or receives the supply pressure data in connection with calculating one or more pneumatic volume(s) used when pulsing the first relay valve 122 and/or pulsing the third relay valve 616 of the valve controller 602, used to move the flow control member 110 of the control valve 106 in a first direction and/or a second direction opposite the first direction, and/or used to increase the pressure in the first fluid chamber and/or the second fluid chamber of the pneumatic actuator 606, as further described below.

The second pressure sensor 134 of FIG. 6 senses and/or measures the pressure of the pressurized control fluid at the first control fluid port 126 of the valve controller 602 (e.g., the pressure of the pressurized control fluid between the first relay valve 122 and the second relay valve 124). First port pressure data obtained from and/or provided by the second pressure sensor 134 may be stored in the memory 138 of FIG. 6. In some examples, the processor 136 accesses and/or obtains the first port pressure data from the memory 138. In other examples, the processor 136 instead accesses, obtains, and/or receives the first port pressure data directly from the second pressure sensor 134. In some examples, the processor 136 accesses, obtains, and/or receives the first port pressure data in connection with calculating one or more pneumatic volume(s) used when pulsing the second relay valve 124 of the valve controller 602, used to move the flow control member 110 of the control valve 106 in a second direction opposite the first direction, and/or used to decrease the pressure in the first fluid chamber of the pneumatic actuator 606, as further described below.

The third pressure sensor 622 of FIG. 6 senses and/or measures the pressure of the pressurized control fluid at the second control fluid port 620 of the valve controller 602 (e.g., the pressure of the pressurized control fluid between the third relay valve 616 and the fourth relay valve 618). Second port pressure data obtained from and/or provided by the third pressure sensor 622 may be stored in the memory 138 of FIG. 6. In some examples, the processor 136 accesses and/or obtains the second port pressure data from the memory 138. In other examples, the processor 136 instead accesses, obtains, and/or receives the second port pressure data directly from the third pressure sensor 622. In some examples, the processor 136 accesses, obtains, and/or receives the second port pressure data in connection with calculating one or more pneumatic volume(s) used when pulsing the fourth relay valve 618 of the valve controller 602, used to move the flow control member 110 of the control valve 106 in the first direction, and/or used to decrease the pressure in the second fluid chamber of the pneumatic actuator 606, as further described below.

The processor 136 of FIG. 6 can be implemented by any type(s) and/or any number(s) of processor(s), microprocessor(s), controller(s), microcontroller(s), circuit(s) and/or other electrical component(s). The processor 136 controls and/or manages one or more operation(s) of the first I/P converter 118, the second I/P converter 120, the third I/P converter 612, and/or the fourth I/P converter 614 based on the input signal 142 received, accessed, and/or obtained by the control circuitry 130 of the valve controller 602. The input signal 142 identifies a positional setpoint (e.g., a desired position) for the flow control member 110 of the control valve 106, with the positional setpoint being achievable based on one or more operation(s) of the valve controller 602, the pneumatic actuator 606, and/or the control valve 106. In some examples, the input signal 142 may indicate to the processor 136 that the valve controller 602 is to operate the pneumatic actuator 606 in a manner that causes the flow control member 110 of the control valve 106 to move in a first direction. In other examples, the input signal 142 may indicate to the processor 136 that the valve controller 602 is to operate the pneumatic actuator 606 in a manner that causes the flow control member 110 of the control valve 106 to move in a second direction opposite the first direction. In still other examples, the input signal 142 may indicate to the processor 136 that the valve controller 602 is to operate the pneumatic actuator 606 in a manner that causes the flow control member 110 of the control valve 106 to maintain its current position. In still other examples, the input signal 142 may indicate to the processor 136 that the valve controller 602 is to increase the pressure within both the first fluid chamber of the pneumatic actuator 606 and the second fluid chamber of the pneumatic actuator 606. In still other examples, the input signal 142 may indicate to the processor 136 that the valve controller 602 is to decrease the pressure within both the first fluid chamber of the pneumatic actuator 606 and the second fluid chamber of the pneumatic actuator 606.

In response to the input signal 142 indicating that the valve controller 602 is to operate the pneumatic actuator 606 in a manner that causes the flow control member 110 of the control valve 106 to move in a first direction, the processor 136 generates a first pulsed drive signal 144 that commands and/or instructs the first I/P converter 118 of the valve controller 602 to generate and/or output a pulsed pressurized control fluid (e.g., a pulsed pressurized pneumatic medium, such as pulses of pressurized air). The pulsed pressurized control fluid generated and/or output by the first I/P converter 118 is passed and/or delivered to the first relay valve 122 of the valve controller 602, which in turn causes the first relay valve 122 to be pulsed between a closed position and an open position. When the first relay valve 122 is in the open position during the pulsing of the first relay valve 122, pressurized control fluid received at the first relay valve 122 from the control fluid inlet 114 of the valve controller 602 passes and/or travels through the first relay valve 122, toward, into, and/or through the first control fluid port 126 of the valve controller 602. Pressurized control fluid passing from the first relay valve 122 into and/or through the first control fluid port 126 of the valve controller 602 passes and/or travels toward, into, and/or through the first control fluid port 608 of the pneumatic actuator 606, which causes the flow control member 110 of the control valve 106 to move in the first direction. The above-described operations of the first I/P converter 118 and the first relay valve 122 of FIG. 6 can be implemented in a manner consistent with the operations of the first I/P converter 118 and the first relay valve 122 as shown and described in FIG. 3, modified to be specific to the first control fluid port 608 of the pneumatic actuator 606 of FIG. 6 rather than the control fluid port 112 of the pneumatic actuator 108 of FIG. 1.

In further response to the input signal 142 indicating that the valve controller 602 is to operate the pneumatic actuator 606 in a manner that causes the flow control member 110 of the control valve 106 to move in the first direction, the processor 136 additionally generates an example fourth pulsed drive signal 626 that commands and/or instructs the fourth I/P converter 614 of the valve controller 602 to generate and/or output a pulsed pressurized control fluid (e.g., a pulsed pressurized pneumatic medium, such as pulses of pressurized air). The pulsed pressurized control fluid generated and/or output by the fourth I/P converter 614 is passed and/or delivered to the fourth relay valve 618 of the valve controller 602, which in turn causes the fourth relay valve 618 to be pulsed between a closed position and an open position. In some examples, the fourth I/P converter 614 outputs pulsed pressurized control fluid to the fourth relay valve 618 (e.g., based on the fourth pulsed drive signal 626) concurrently and/or simultaneously with the first I/P converter 118 outputting pulsed pressurized control fluid to the first relay valve 122 (e.g., based on the first pulsed drive signal 144). When the fourth relay valve 618 is in the open position during the pulsing of the fourth relay valve 618, pressurized control fluid travels, passes, and/or returns from the second control fluid port 610 of the pneumatic actuator 606, through the second control fluid port 620 of the valve controller 602, then through the fourth relay valve 618 of the valve controller 602, and then toward, into, and/or through the control fluid exhaust 128 of the valve controller 602. Pressurized control fluid passing from the fourth relay valve 618 into and/or through the control fluid exhaust 128 is vented into the atmosphere. The return of the pressurized control fluid from the second control fluid port 610 of the pneumatic actuator 606 to the second control fluid port 620 of the valve controller 602, combined with the subsequent venting of the returned pressurized control fluid via the control fluid exhaust 128 of the valve controller 602, enables the flow control member 110 of the control valve 106 to move in the first direction. The above-described operations of the fourth I/P converter 614 and the fourth relay valve 618 of FIG. 6 can be implemented in a manner consistent with the operations of the second I/P converter 120 and the second relay valve 124 as shown and described in FIG. 5, modified to be specific to the second control fluid port 610 of the pneumatic actuator 606 of FIG. 6 rather than the control fluid port 112 of the pneumatic actuator 108 of FIG. 1

In response to the input signal 142 indicating that the valve controller 602 is to operate the pneumatic actuator 606 in a manner that causes the flow control member 110 of the control valve 106 to move in a second direction opposite the first direction, the processor 136 generates a second pulsed drive signal 146 that commands and/or instructs the second I/P converter 120 of the valve controller 602 to generate and/or output a pulsed pressurized control fluid (e.g., a pulsed pressurized pneumatic medium, such as pulses of pressurized air). The pulsed pressurized control fluid generated and/or output by the second I/P converter 120 is passed and/or delivered to the second relay valve 124 of the valve controller 602, which in turn causes the second relay valve 124 to be pulsed between a closed position and an open position. When the second relay valve 124 is in the open position during the pulsing of the second relay valve 124, pressurized control fluid travels, passes, and/or returns from the first control fluid port 608 of the pneumatic actuator 606, through the first control fluid port 126 of the valve controller 602, then through the second relay valve 124 of the valve controller 602, and then toward, into, and/or through the control fluid exhaust 128 of the valve controller 602. Pressurized control fluid passing from the second relay valve 124 into and/or through the control fluid exhaust 128 is vented into the atmosphere. The return of the pressurized control fluid from the first control fluid port 608 of the pneumatic actuator 606 to the first control fluid port 126 of the valve controller 602, combined with the subsequent venting of the returned pressurized control fluid via the control fluid exhaust 128 of the valve controller 602, enables the flow control member 110 of the control valve 106 to move in the second direction. The above-described operations of the second I/P converter 120 and the second relay valve 124 of FIG. 6 can be implemented in a manner consistent with the operations of the second I/P converter 120 and the second relay valve 124 as shown and described in FIG. 5, modified to be specific to the first control fluid port 608 of the pneumatic actuator 606 of FIG. 6 rather than the control fluid port 112 of the pneumatic actuator 108 of FIG. 1.

In further response to the input signal 142 indicating that the valve controller 602 is to operate the pneumatic actuator 606 in a manner that causes the flow control member 110 of the control valve 106 to move in the second direction, the processor 136 additionally generates an example third pulsed drive signal 624 that commands and/or instructs the third I/P converter 612 of the valve controller 602 to generate and/or output a pulsed pressurized control fluid (e.g., a pulsed pressurized pneumatic medium, such as pulses of pressurized air). The pulsed pressurized control fluid generated and/or output by the third I/P converter 612 is passed and/or delivered to the third relay valve 616 of the valve controller 602, which in turn causes the third relay valve 616 to be pulsed between a closed position and an open position. In some examples, the third I/P converter 612 outputs pulsed pressurized control fluid to the third relay valve 616 (e.g., based on the third pulsed drive signal 624) concurrently and/or simultaneously with the second I/P converter 120 outputting pulsed pressurized control fluid to the second relay valve 124 (e.g., based on the second pulsed drive signal 146). When the third relay valve 616 is in the open position during the pulsing of the third relay valve 616, pressurized control fluid received at the third relay valve 616 from the control fluid inlet 114 of the valve controller 602 passes and/or travels through the third relay valve 616, toward, into, and/or through the second control fluid port 620 of the valve controller 602. Pressurized control fluid passing from the third relay valve 616 into and/or through the second control fluid port 620 of the valve controller 602 passes and/or travels toward, into, and/or through the second control fluid port 610 of the pneumatic actuator 606, which causes the flow control member 110 of the control valve 106 to move in the second direction. The above-described operations of the third I/P converter 612 and the third relay valve 616 of FIG. 6 can be implemented in a manner consistent with the operations of the first I/P converter 118 and the first relay valve 122 as shown and described in FIG. 3, modified to be specific to the second control fluid port 610 of the pneumatic actuator 606 of FIG. 6 rather than the control fluid port 112 of the pneumatic actuator 108 of FIG. 1.

In response to the input signal 142 indicating that the valve controller 602 is to increase the pressure within both the first fluid chamber of the pneumatic actuator 606 and the second fluid chamber of the pneumatic actuator 606, the processor 136 generates a first pulsed drive signal 144 that commands and/or instructs the first I/P converter 118 of the valve controller 602 to generate and/or output a pulsed pressurized control fluid (e.g., a pulsed pressurized pneumatic medium, such as pulses of pressurized air). The pulsed pressurized control fluid generated and/or output by the first I/P converter 118 is passed and/or delivered to the first relay valve 122 of the valve controller 602, which in turn causes the first relay valve 122 to be pulsed between a closed position and an open position. When the first relay valve 122 is in the open position during the pulsing of the first relay valve 122, pressurized control fluid received at the first relay valve 122 from the control fluid inlet 114 of the valve controller 602 passes and/or travels through the first relay valve 122, toward, into, and/or through the first control fluid port 126 of the valve controller 602. Pressurized control fluid passing from the first relay valve 122 into and/or through the first control fluid port 126 of the valve controller 602 passes and/or travels toward, into, and/or through the first control fluid port 608 of the pneumatic actuator 606, which causes the pressure within the first fluid chamber of the pneumatic actuator 606 to increase. The above-described operations of the first I/P converter 118 and the first relay valve 122 of FIG. 6 can be implemented in a manner consistent with the operations of the first I/P converter 118 and the first relay valve 122 as shown and described in FIG. 3, modified to be specific to the first control fluid port 608 of the pneumatic actuator 606 of FIG. 6 rather than the control fluid port 112 of the pneumatic actuator 108 of FIG. 1.

In further response to the input signal 142 indicating that the valve controller 602 is to increase the pressure within both the first fluid chamber of the pneumatic actuator 606 and the second fluid chamber of the pneumatic actuator 606, the processor 136 additionally generates a third pulsed drive signal 624 that commands and/or instructs the third I/P converter 612 of the valve controller 602 to generate and/or output a pulsed pressurized control fluid (e.g., a pulsed pressurized pneumatic medium, such as pulses of pressurized air). The pulsed pressurized control fluid generated and/or output by the third I/P converter 612 is passed and/or delivered to the third relay valve 616 of the valve controller 602, which in turn causes the third relay valve 616 to be pulsed between a closed position and an open position. In some examples, the third I/P converter 612 outputs pulsed pressurized control fluid to the third relay valve 616 (e.g., based on the third pulsed drive signal 624) concurrently and/or simultaneously with the first I/P converter 118 outputting pulsed pressurized control fluid to the first relay valve 122 (e.g., based on the first pulsed drive signal 144). When the third relay valve 616 is in the open position during the pulsing of the third relay valve 616, pressurized control fluid received at the third relay valve 616 from the control fluid inlet 114 of the valve controller 602 passes and/or travels through the third relay valve 616, toward, into, and/or through the second control fluid port 620 of the valve controller 602. Pressurized control fluid passing from the third relay valve 616 into and/or through the second control fluid port 620 of the valve controller 602 passes and/or travels toward, into, and/or through the second control fluid port 610 of the pneumatic actuator 606, which causes the pressure within the second fluid chamber of the pneumatic actuator 606 to increase. The above-described operations of the third I/P converter 612 and the third relay valve 616 of FIG. 6 can be implemented in a manner consistent with the operations of the first I/P converter 118 and the first relay valve 122 as shown and described in FIG. 3, modified to be specific to the second control fluid port 610 of the pneumatic actuator 606 of FIG. 6 rather than the control fluid port 112 of the pneumatic actuator 108 of FIG. 1.

In response to the input signal 142 indicating that the valve controller 602 is to decrease the pressure within both the first fluid chamber of the pneumatic actuator 606 and the second fluid chamber of the pneumatic actuator 606, the processor 136 generates a second pulsed drive signal 146 that commands and/or instructs the second I/P converter 120 of the valve controller 602 to generate and/or output a pulsed pressurized control fluid (e.g., a pulsed pressurized pneumatic medium, such as pulses of pressurized air). The pulsed pressurized control fluid generated and/or output by the second I/P converter 120 is passed and/or delivered to the second relay valve 124 of the valve controller 602, which in turn causes the second relay valve 124 to be pulsed between a closed position and an open position. When the second relay valve 124 is in the open position during the pulsing of the second relay valve 124, pressurized control fluid travels, passes, and/or returns from the first control fluid port 608 of the pneumatic actuator 606, through the first control fluid port 126 of the valve controller 602, then through the second relay valve 124 of the valve controller 602, and then toward, into, and/or through the control fluid exhaust 128 of the valve controller 602. Pressurized control fluid passing from the second relay valve 124 into and/or through the control fluid exhaust 128 is vented into the atmosphere. The return of the pressurized control fluid from the first control fluid port 608 of the pneumatic actuator 606 to the first control fluid port 126 of the valve controller 602, combined with the subsequent venting of the returned pressurized control fluid via the control fluid exhaust 128 of the valve controller 602, causes the pressure within the first fluid chamber of the pneumatic actuator 606 to decrease. The above-described operations of the second I/P converter 120 and the second relay valve 124 of FIG. 6 can be implemented in a manner consistent with the operations of the second I/P converter 120 and the second relay valve 124 as shown and described in FIG. 5, modified to be specific to the first control fluid port 608 of the pneumatic actuator 606 of FIG. 6 rather than the control fluid port 112 of the pneumatic actuator 108 of FIG. 1.

In further response to the input signal 142 indicating that the valve controller 602 is to decrease the pressure within both the first fluid chamber of the pneumatic actuator 606 and the second fluid chamber of the pneumatic actuator 606, the processor 136 additionally generates a fourth pulsed drive signal 626 that commands and/or instructs the fourth I/P converter 614 of the valve controller 602 to generate and/or output a pulsed pressurized control fluid (e.g., a pulsed pressurized pneumatic medium, such as pulses of pressurized air). The pulsed pressurized control fluid generated and/or output by the fourth I/P converter 614 is passed and/or delivered to the fourth relay valve 618 of the valve controller 602, which in turn causes the fourth relay valve 618 to be pulsed between a closed position and an open position. In some examples, the fourth I/P converter 614 outputs pulsed pressurized control fluid to the fourth relay valve 618 (e.g., based on the fourth pulsed drive signal 626) concurrently and/or simultaneously with the second I/P converter 120 outputting pulsed pressurized control fluid to the second relay valve 124 (e.g., based on the second pulsed drive signal 146). When the fourth relay valve 618 is in the open position during the pulsing of the fourth relay valve 618, pressurized control fluid travels, passes, and/or returns from the second control fluid port 610 of the pneumatic actuator 606, through the second control fluid port 620 of the valve controller 602, then through the fourth relay valve 618 of the valve controller 602, and then toward, into, and/or through the control fluid exhaust 128 of the valve controller 602. Pressurized control fluid passing from the fourth relay valve 618 into and/or through the control fluid exhaust 128 is vented into the atmosphere. The return of the pressurized control fluid from the second control fluid port 610 of the pneumatic actuator 606 to the second control fluid port 620 of the valve controller 602, combined with the subsequent venting of the returned pressurized control fluid via the control fluid exhaust 128 of the valve controller 602, causes the pressure within the second fluid chamber of the pneumatic actuator 606 to decrease. The above-described operations of the fourth I/P converter 614 and the fourth relay valve 618 of FIG. 6 can be implemented in a manner consistent with the operations of the second I/P converter 120 and the second relay valve 124 as shown and described in FIG. 5, modified to be specific to the second control fluid port 620 of the pneumatic actuator 606 of FIG. 6 rather than the control fluid port 112 of the pneumatic actuator 108 of FIG. 1.

The processor 136 of the valve controller 602 calculates pneumatic volume usage associated with, based on, and/or corresponding to the pulsing of the first relay valve 122 (e.g., "first port pneumatic supply volume usage"). The first port pneumatic supply volume usage calculated by the processor 136 represents and/or corresponds to a pneumatic volume supplied during movement of the flow control member 110 of the control valve 106 in the first direction, and/or supplied during an increase of the pressure within the first fluid chamber of the pneumatic actuator 606. In some examples, the processor 136 calculates the first port pneumatic supply volume usage on a pulse-by-pulse basis for a given movement of the flow control member 110 of the control valve 106 in the first direction, and/or for a given increase of the pressure within the first fluid chamber of the pneumatic actuator 606. Pulse-by-pulse first port pneumatic supply volume usage can be calculated by the processor 136 of FIG. 6 using Equations 1-4 described above. In some examples, the processor 136 calculates the first port pneumatic supply volume usage for a given movement of the flow control member 110 of the control valve 106 in the first direction, and/or for a given increase of the pressure within the first fluid chamber of the pneumatic actuator 606, by summing together the first port pneumatic supply volume usages calculated by the processor 136 for individual ones of the pulses occurring during the given movement and/or during the given pressure increase. In some examples, the processor 136 calculates the cumulative first port pneumatic supply volume usage for a series of given movements (e.g., individual movements occurring and/or repeated over a span of time) of the flow control member 110 of the control valve 106 in the first direction, and/or for a series of given pressure increases (e.g., individual pressure increases occurring and/or repeated over a span of time) of the first fluid chamber of the pneumatic actuator 606, by summing together the first port pneumatic supply volume usages calculated by the processor 136 for individual ones of the given movements and/or individual ones of the given pressure increases.

The processor 136 of the valve controller 602 additionally or alternatively calculates pneumatic volume usage associated with, based on, and/or corresponding to the pulsing of the second relay valve 124 (e.g., "first port pneumatic exhaust volume usage"). The first port pneumatic exhaust volume usage calculated by the processor 136 represents and/or corresponds to a pneumatic volume exhausted during movement of the flow control member 110 of the control valve 106 in the second direction, and/or exhausted during a decrease of the pressure within the first fluid chamber of the pneumatic actuator 606. In some examples, the processor 136 calculates the first port pneumatic exhaust volume usage on a pulse-by-pulse basis for a given movement of the flow control member 110 of the control valve 106 in the second direction, and/or for a given decrease of the pressure within the first fluid chamber of the pneumatic actuator 606. Pulse-by-pulse first port pneumatic exhaust volume usage can be calculated by the processor 136 of FIG. 6 using Equations 1-4 described above, modified such that the pressure differential ($P_2-P_1$) for a given pulse is based on first port pressure data sensed and/or measured by the second pressure sensor 134 of FIG. 6 instead of being based on supply pressure data sensed and/or measured by the first pressure sensor 132 of FIG. 6. In some examples, the processor 136 calculates the first port pneumatic exhaust volume usage for a given movement of the flow control member 110 of the control valve 106 in the second direction, and/or for a given decrease of the pressure within the first fluid chamber of the pneumatic actuator 606, by summing together the first port pneumatic exhaust volume usages calculated by the processor 136 for individual ones of the pulses occurring during the given movement and/or during the given pressure decrease. In some examples, the processor 136 calculates the cumulative first port pneumatic exhaust volume usage for a series of given movements (e.g., individual movements occurring and/or repeated over a span of time) of the flow control member 110 of the control valve 106 in the second direction, and/or for a series of given pressure decreases (e.g., individual pressure decreases occurring and/or repeated over a span of time) of the first fluid chamber of the pneumatic actuator 606, by summing together the first port pneumatic exhaust volume usages calculated by the processor 136 for individual ones of the given movements and/or individual ones of the given pressure decreases.

The processor 136 of the valve controller 602 additionally or alternatively calculates pneumatic volume usage associated with, based on, and/or corresponding to the pulsing of the third relay valve 616 (e.g., "second port pneumatic supply volume usage"). The second port pneumatic supply volume usage calculated by the processor 136 represents and/or corresponds to a pneumatic volume supplied during movement of the flow control member 110 of the control valve 106 in the second direction, and/or supplied during an increase of the pressure within the second fluid chamber of the pneumatic actuator 606. In some examples, the processor 136 calculates the second port pneumatic supply volume usage on a pulse-by-pulse basis for a given movement of the flow control member 110 of the control valve 106 in the second direction, and/or for a given increase of the pressure within the second fluid chamber of the pneumatic actuator 606. Pulse-by-pulse second port pneumatic supply volume usage can be calculated by the processor 136 of FIG. 6 using Equations 1-4 described above. In some examples, the processor 136 calculates the second port pneumatic supply volume usage for a given movement of the flow control member 110 of the control valve 106 in the second direction, and/or for a given increase of the pressure within the second fluid chamber of the pneumatic actuator 606, by summing together the second port pneumatic supply volume usages calculated by the processor 136 for individual ones of the pulses occurring during the given movement and/or during the given pressure increase. In some examples, the processor 136 calculates the cumulative second port pneumatic supply volume usage for a series of given movements (e.g., individual movements occurring and/or repeated over a span of time) of the flow control member 110 of the control valve 106 in the second direction, and/or for a series of given pressure increases (e.g., individual pressure increases occurring and/or repeated over a span of time) of the second fluid chamber of the pneumatic actuator 606, by summing together the second port pneumatic supply volume usages calculated by the processor 136 for individual ones of the given movements and/or individual ones of the given pressure increases.

The processor 136 of the valve controller 602 additionally or alternatively calculates pneumatic volume usage associated with, based on, and/or corresponding to the pulsing of the fourth relay valve 618 (e.g., "second port pneumatic exhaust volume usage"). The second port pneumatic exhaust volume usage calculated by the processor 136 represents and/or corresponds to a pneumatic volume exhausted during movement of the flow control member 110 of the control valve 106 in the first direction, and/or exhausted during a decrease of the pressure within the second fluid chamber of the pneumatic actuator 606. In some examples, the processor 136 calculates the second port pneumatic exhaust volume usage on a pulse-by-pulse basis for a given movement of the flow control member 110 of the control valve 106 in the first direction, and/or for a given decrease of the pressure within the second fluid chamber of the pneumatic actuator 606. Pulse-by-pulse second port pneumatic exhaust volume usage can be calculated by the processor 136 of FIG. 6 using Equations 1-4 described above, modified such that the pressure differential $(P_2-P_1)$ for a given pulse is based on second port pressure data sensed and/or measured by the third pressure sensor 622 of FIG. 6 instead of being based on supply pressure data sensed and/or measured by the first pressure sensor 132 of FIG. 6. In some examples, the processor 136 calculates the second port pneumatic exhaust volume usage for a given movement of the flow control member 110 of the control valve 106 in the first direction, and/or for a given decrease of the pressure within the second fluid chamber of the pneumatic actuator 606, by summing together the second port pneumatic exhaust volume usages calculated by the processor 136 for individual ones of the pulses occurring during the given movement and/or during the given pressure decrease. In some examples, the processor 136 calculates the cumulative second port pneumatic exhaust volume usage for a series of given movements (e.g., individual movements occurring and/or repeated over a span of time) of the flow control member 110 of the control valve 106 in the first direction, and/or for a series of given pressure decreases (e.g., individual pressure decreases occurring and/or repeated over a span of time) of the second fluid chamber of the pneumatic actuator 606, by summing together the second port pneumatic exhaust volume usages calculated by the processor 136 for individual ones of the given movements and/or individual ones of the pressure decreases.

The memory 138 of FIG. 6 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 138 of FIG. 6 may be stored in any file and/or data structure format, organization scheme, and/or arrangement. The memory 138 of FIG. 6 is accessible to the processor 136 and/or, more generally, to the control circuitry 130 of the valve controller 602 of FIG. 6.

In some examples, the memory 138 of FIG. 6 stores supply pressure data sensed and/or measured by the first pressure sensor 132 of FIG. 6. In some examples, the memory 138 of FIG. 6 stores first port pressure data sensed and/or measured by the second pressure sensor 134 of FIG. 6. In some examples, the memory 138 of FIG. 6 stores second port pressure data sensed and/or measured by the third pressure sensor 622 of FIG. 6. In some examples, the memory 138 of FIG. 6 stores one or more input signal(s) (e.g., the input signal 142 of FIG. 6) received at the processor 136, and/or, more generally, at the control circuitry 130 of the valve controller 602. In some examples, the memory 138 of FIG. 6 stores one or more pulsed drive signal(s) (e.g., the first pulsed drive signal 144, the second pulsed drive signal 146, the third pulsed drive signal 624, and/or the fourth pulsed drive signal 626 of FIG. 6) generated by the processor 136, and/or, more generally, by the control circuitry 130 of the valve controller 602. In some examples, the memory 138 of FIG. 6 stores pulse volume data corresponding to one or more predetermined volume(s) of one or more pulse(s) of pressurized control fluid to be output from the first I/P converter 118, the second I/P converter 120, the third I/P converter 612, and/or the fourth I/P converter 614 of the valve controller 602.

In some examples, the memory 138 of FIG. 6 stores one or more algorithm(s) and/or equation(s) to be used by the processor 136, and/or, more generally, by the control circuitry 130 of the valve controller 602 to calculate pneumatic volume usage and/or consumption associated with pulsing the first relay valve 122 of the valve controller 602, associated with moving the control valve 106 in a first direction, and/or associated with increasing the pressure in the first fluid chamber of the pneumatic actuator 606. In some examples, the memory 138 of FIG. 6 stores one or more algorithm(s) and/or equation(s) to be used by the processor 136, and/or, more generally, by the control circuitry 130 of the valve controller 602 to calculate pneumatic volume usage and/or consumption associated with pulsing the second relay valve 124 of the valve controller 602, associated with moving the control valve 106 in a second direction opposite the first direction, and/or associated with decreasing the pressure in the first fluid chamber of the pneumatic actuator 606. In some examples, the memory 138 of FIG. 6 stores one or more algorithm(s) and/or equation(s) to be used by the processor 136, and/or, more generally, by the control circuitry 130 of the valve controller 602 to calculate pneumatic volume usage and/or consumption associated with pulsing the third relay valve 616 of the valve controller 602, associated with moving the control valve 106 in the second direction, and/or associated with increasing the pressure in the second fluid chamber of the pneumatic actuator 606. In some examples, the memory 138 of FIG. 6 stores one or more algorithm(s) and/or equation(s) to be used by the processor 136, and/or, more generally, by the control circuitry 130 of the valve controller 602 to calculate pneumatic volume usage and/or consumption associated with pulsing the fourth relay valve 618 of the valve controller 602, associated with moving the control valve 106 in the first direction, and/or associated with decreasing the pressure in the second fluid chamber of the pneumatic actuator 606. In some examples, the memory 138 of FIG. 6 stores one or more algorithm(s) and/or equation(s) to be used by the processor 136, and/or, more generally, by the control circuitry 130 of the valve controller 602 to calculate total and/or aggregate pneumatic volume usage and/or consumption over time.

In some examples, the memory 138 of FIG. 6 stores pneumatic volume usage and/or consumption data calculated by the processor 136, and/or, more generally, by the control circuitry 130 of the valve controller 602 in association with pulsing the first relay valve 122 of the valve controller 602, in association with moving the control valve 106 in a first direction, and/or in association with increasing the pressure in the first fluid chamber of the pneumatic actuator 606. In some examples, the memory 138 of FIG. 6 stores pneumatic volume usage and/or consumption data calculated by the processor 136, and/or, more generally, by the control circuitry 130 of the valve controller 602 in association with pulsing the second relay valve 124 of the valve controller 602, in association with moving the control valve 106 in a second direction opposite the first direction, and/or in association with decreasing the pressure in the first fluid chamber of the pneumatic actuator 606. In some examples, the memory 138 of FIG. 6 stores pneumatic volume usage and/or consumption data calculated by the processor 136, and/or, more generally, by the control circuitry 130 of the valve controller 602 in association with pulsing the third relay valve 616 of the valve controller 602, in association with moving the control valve 106 in the second direction, and/or in association with increasing the pressure in the second fluid chamber of the pneumatic actuator 606. In some examples, the memory 138 of FIG. 6 stores pneumatic volume usage and/or consumption data calculated by the processor 136, and/or, more generally, by the control circuitry 130 of the valve controller 602 in association with pulsing the fourth relay valve 618 of the valve controller 602, in association with moving the control valve 106 in the first direction, and/or in association with decreasing the pressure in the second fluid chamber of the pneumatic actuator 606. In some examples, the memory 138 of FIG. 2 stores total and/or aggregate pneumatic volume usage and/or consumption data calculated over time by the processor 136, and/or, more generally, by the control circuitry 130 of the valve controller 602.

While an example manner of implementing the example valve controller 602 is illustrated in FIG. 6, one or more of the elements, processes and/or devices illustrated in FIG. 6 may be combined, divided, re-arranged, omitted, eliminated and/or implemented in any other way. Further, the example pressure regulator 116, the example first I/P converter 118, the example second I/P converter 120, the example third I/P converter 612, the example fourth I/P converter 614, the example first relay valve 122, the example second relay valve 124, the example third relay valve 616, the example fourth relay valve 618, the example first pressure sensor 132, the example second pressure sensor 134, the example third pressure sensor 622, the example processor 136, the example memory 138, and/or, more generally, the example valve controller 602 of FIG. 6 may be implemented by hardware, software, firmware and/or any combination of hardware, software and/or firmware. Thus, for example, any of the example pressure regulator 116, the example first I/P converter 118, the example second I/P converter 120, the example third I/P converter 612, the example fourth I/P converter 614, the example first relay valve 122, the example second relay valve 124, the example third relay valve 616, the example fourth relay valve 618, the example first pressure sensor 132, the example second pressure sensor 134, the example third pressure sensor 622, the example processor 136, the example memory 138, and/or, more generally, the example valve controller 602 of FIG. 6 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pressure regulator 116, the example first I/P converter 118, the example second I/P converter 120, the example third I/P converter 612, the example fourth I/P converter 614, the example first relay valve 122, the example second relay valve 124, the example third relay valve 616, the example fourth relay valve 618, the example first pressure sensor 132, the example second pressure sensor 134, the example third pressure sensor 622, the example processor 136, and/or the example memory 138 of the valve controller 602 of FIG. 6 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example valve controller 602 of FIG. 6 may include one or more element(s), process(es) and/or device(s) in addition to, or instead of, those illustrated in FIG. 6, and/or may include more than one of any or all of the illustrated elements, processes and devices.

Figure 7:
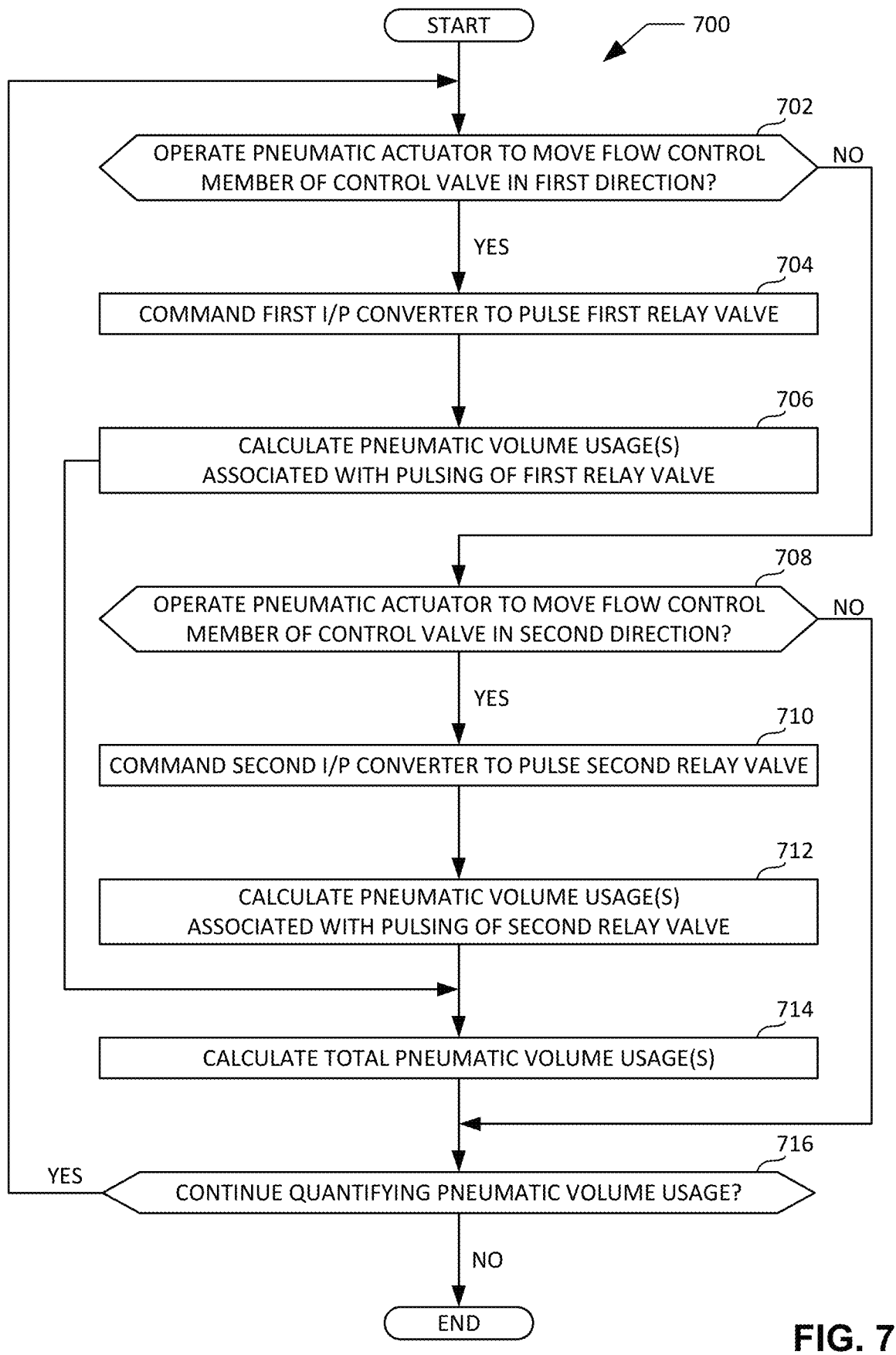
FIG. 7 is a flowchart representative of an example method that may be executed at the example valve controller of FIG. 1 to quantify pneumatic volume usage.
Figure 8A:
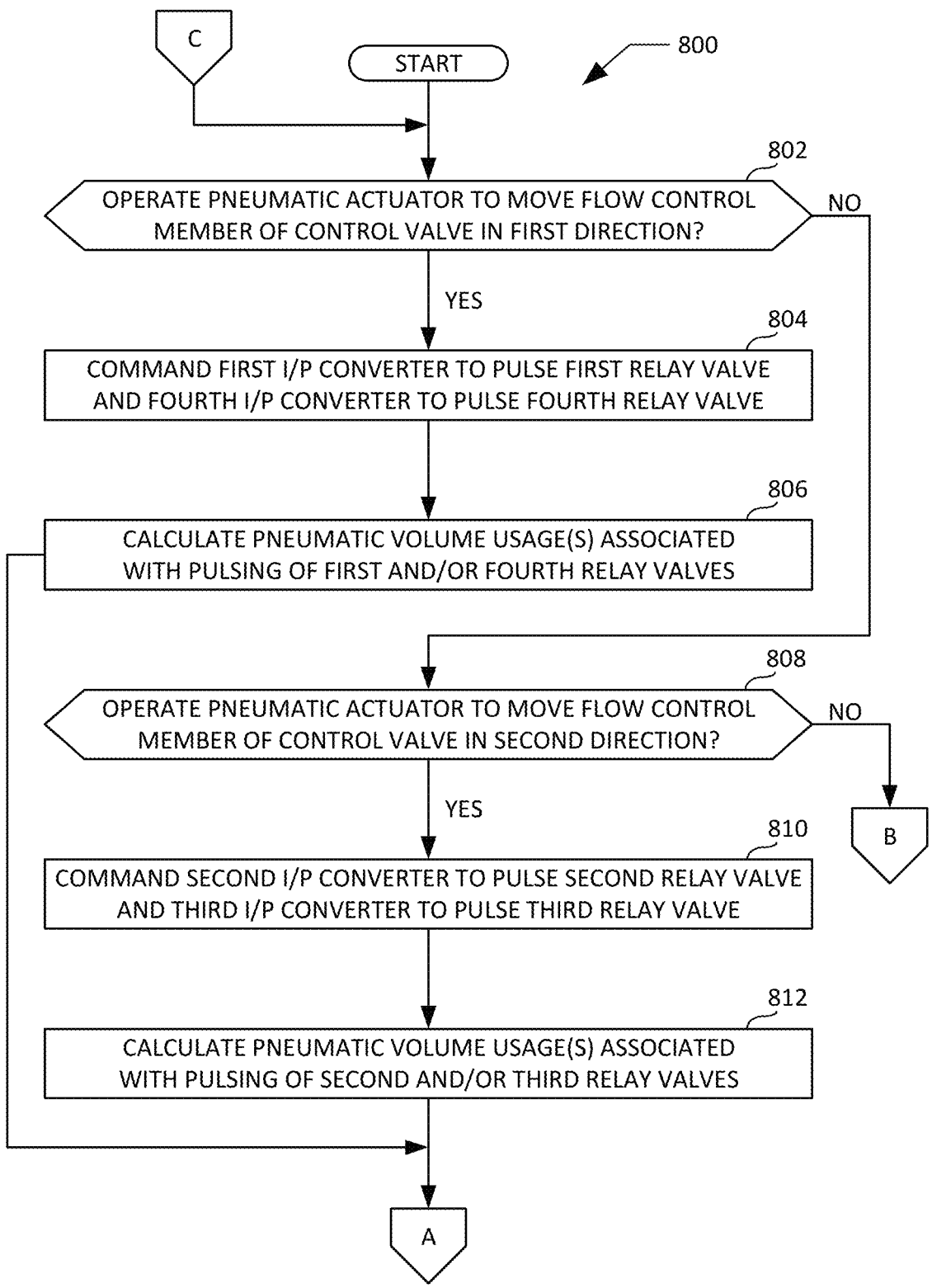
FIGS. 8A and 8B are a flowchart representative of an example method that may be executed at the example valve controller of FIG. 6 to quantify pneumatic volume usage.
Figure 8B:
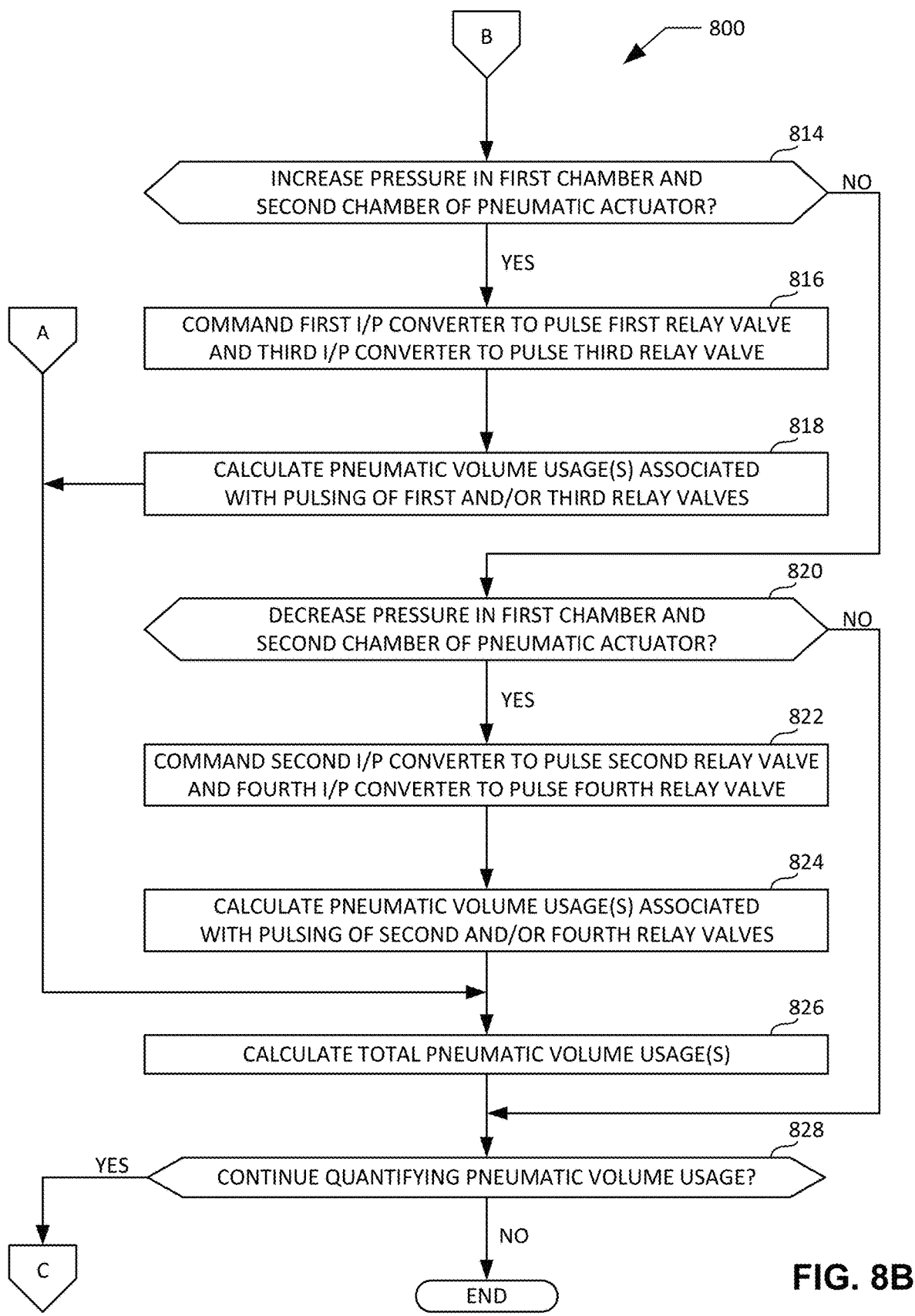

A flowchart representative of an example method for quantifying pneumatic volume usage via the example valve controller 102 of FIG. 1 is shown in FIG. 7. A flowchart representative of an example method for quantifying pneumatic volume usage via the example valve controller 602 of FIG. 6 is shown in FIGS. 8A-8B. In these example, the methods may be implemented using machine-readable instructions that comprise one or more executable program(s) or portion(s) of executable program(s) for execution by a computer processor such as the example processor 136 of FIGS. 1 and 6 described above and shown in the example processor platform 900 discussed below in connection with FIG. 9. The program(s) may be embodied in software stored on a non-transitory computer-readable storage medium such as a CD-ROM, a floppy disk, a hard drive, a DVD, a Blu-ray disk, or a memory associated with the processor 136, but the entire program(s) and/or parts thereof could alternatively be executed by a device other than the processor 136 and/or embodied in firmware or dedicated hardware. Further, although the example program(s) is/are described with reference to the flowcharts illustrated in FIGS. 7 and 8A-8B, many other methods of quantifying pneumatic volume usage via the example valve controller 102 of FIG. 1 and/or via the example valve controller 602 of FIG. 6 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

Machine-readable instructions for executing the methods described herein may be stored in one or more of a compressed format, an encrypted format, a fragmented format, a packaged format, etc. The machine-readable instructions may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example methods of FIGS. 7 and 8A-8B may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 7 is a flowchart representative of an example method 700 that may be executed at the example valve controller 102 of FIG. 1 to quantify pneumatic volume usage. The method 700 of FIG. 7 begins at block 702 when the processor 136 of the valve controller 102 of FIG. 1 determines whether the valve controller 102 is to operate the pneumatic actuator 108 of FIG. 1 to move the flow control member 110 of the control valve 106 of FIG. 1 in a first direction. For example, the processor 136 and/or, more generally, the control circuitry 130 of the valve controller 102 of FIG. 1 may receive an input signal (e.g., the input signal 142 of FIG. 1) indicating to the processor 136 that the valve controller 102 is to operate the pneumatic actuator 108 in a manner that causes the flow control member 110 of the control valve 106 to move in the first direction. If the processor 136 determines at block 702 that the valve controller 102 is to operate the pneumatic actuator 108 to move the flow control member 110 of the control valve 106 in the first direction, the method 700 of FIG. 7 proceeds to block 704. If the processor 136 instead determines at block 702 that the valve controller 102 is not to operate the pneumatic actuator 108 to move the flow control member 110 of the control valve 106 in the first direction, the method 700 of FIG. 7 proceeds to block 708.

At block 704, the processor 136 commands the first I/P converter 118 of the valve controller 102 to pulse the first relay valve 122 of the valve controller 102. For example, the processor 136 may generate a pulsed drive signal (e.g., the first pulsed drive signal 144 of FIG. 1) that commands and/or instructs the first I/P converter 118 of the valve controller 102 to output a pulsed pressurized control fluid (e.g., a pulsed pressurized pneumatic medium, such as pulses of pressurized air) to the first relay valve 122 of the valve controller 102, with the pulsed pressurized control fluid causing the first relay valve 122 to be pulsed between a closed position and an open position. Following block 704, the method 700 of FIG. 7 proceeds to block 706.

At block 706, the processor 136 calculates one or more pneumatic volume usage(s) associated with the pulsing of the first relay valve 122. For example, the processor 136 can calculate pulse-by-pulse pneumatic supply volume usage associated with the pulsing of the first relay valve 122 using Equations 1-4 described above. The processor 136 can additionally calculate the pneumatic supply volume usage associated with the pulsing of the first relay valve 122 by summing together the pneumatic supply volume usages calculated by the processor 136 for individual ones of the pulses occurring during the pulsing of the first relay valve 122. Following block 706, the method 700 of FIG. 7 proceeds to block 714.

At block 708, the processor 136 determines whether the valve controller 102 is to operate the pneumatic actuator 108 to move the flow control member 110 of the control valve 106 in a second direction opposite the first direction. For example, the processor 136 and/or, more generally, the control circuitry 130 of the valve controller 102 of FIG. 1 may receive an input signal (e.g., the input signal 142 of FIG. 1) indicating to the processor 136 that the valve controller 102 is to operate the pneumatic actuator 108 in a manner that causes the flow control member 110 of the control valve 106 to move in the second direction. If the processor 136 determines at block 708 that the valve controller 102 is to operate the pneumatic actuator 108 to move the flow control member 110 of the control valve 106 in the second direction, the method 700 of FIG. 7 proceeds to block 710. If the processor 136 instead determines at block 708 that the valve controller 102 is not to operate the pneumatic actuator 108 to move the flow control member 110 of the control valve 106 in the second direction, the method 700 of FIG. 7 proceeds to block 716.

At block 710, the processor 136 commands the second I/P converter 120 of the valve controller 102 to pulse the second relay valve 124 of the valve controller 102. For example, the processor 136 may generate a pulsed drive signal (e.g., the second pulsed drive signal 146 of FIG. 1) that commands and/or instructs the second I/P converter 120 of the valve controller 102 to output a pulsed pressurized control fluid (e.g., a pulsed pressurized pneumatic medium, such as pulses of pressurized air) to the second relay valve 124 of the valve controller 102, with the pulsed pressurized control fluid causing the second relay valve 124 to be pulsed between a closed position and an open position. Following block 710, the method 700 of FIG. 7 proceeds to block 712.

At block 712, the processor 136 calculates one or more pneumatic volume usage(s) associated with the pulsing of the second relay valve 124. For example, the processor 136 can calculate pulse-by-pulse pneumatic exhaust volume usage associated with the pulsing of the second relay valve 124 using Equations 1-4 described above, modified such that the pressure differential ($P_2-P_1$) for a given pulse is based on port pressure data sensed and/or measured by the second pressure sensor 134 of FIG. 1 instead of being based on supply pressure data sensed and/or measured by the first pressure sensor 132 of FIG. 1. The processor 136 can additionally calculate the pneumatic exhaust volume usage associated with the pulsing of the second relay valve 124 by summing together the pneumatic exhaust volume usages calculated by the processor 136 for individual ones of the pulses occurring during the pulsing of the second relay valve 124. Following block 712, the method 700 of FIG. 7 proceeds to block 714.

At block 714, the processor 136 calculates one or more total pneumatic volume usage(s). For example, the processor 136 can calculate the cumulative pneumatic supply volume usage associated with separate instances of pulsing the first relay valve 122 (e.g., based on the repeated execution of blocks 702 through 706) by summing together each of the pneumatic supply volume usages calculated by the processor 136 over time at block 706. The processor 136 can additionally calculate the cumulative pneumatic exhaust volume usage associated with separate instances of pulsing the second relay valve 124 (e.g., based on the repeated execution of blocks 708 through 712) by summing together each of the pneumatic exhaust volume usages calculated by the processor 136 over time at block 712. The processor 136 can additionally calculate the total pneumatic volume usage associated with the pulsing of the first relay valve 122 and the pulsing of the second relay valve 124 by summing together the pneumatic supply volume usage calculated at block 706 and the pneumatic exhaust volume usage calculated at block 712. The processor 136 can additionally calculate a cumulative total pneumatic volume usage by summing successive calculations of the total pneumatic volume usage occurring over time. Following block 714, the method 700 of FIG. 7 proceeds to block 716.

At block 716, the processor 136 determines whether the valve controller 102 is to continue quantifying pneumatic volume usage. For example, the processor 136 and/or, more generally, the control circuitry 130 of the valve controller 102 of FIG. 1 may receive a control signal indicating to the processor 136 that the valve controller 102 is to discontinue quantifying pneumatic usage volume. If the processor 136 determines at block 716 that the valve controller 102 is to continue quantifying pneumatic volume usage, the method 700 of FIG. 7 returns to block 702. If the processor 136 instead determines at block 716 that the valve controller 102 is not to continue (e.g., is to discontinue) quantifying pneumatic volume usage, the method 700 of FIG. 7 ends.

FIGS. 8A and 8B are a flowchart representative of an example method 800 that may be executed at the example valve controller 602 of FIG. 6 to quantify pneumatic volume usage. The method 800 of FIGS. 8A-8B begins at block 802 when the processor 136 of the valve controller 602 of FIG. 6 determines whether the valve controller 602 is to operate the pneumatic actuator 606 of FIG. 6 to move the flow control member 110 of the control valve 106 of FIG. 6 in a first direction. For example, the processor 136 and/or, more generally, the control circuitry 130 of the valve controller 602 of FIG. 6 may receive an input signal (e.g., the input signal 142 of FIG. 6) indicating to the processor 136 that the valve controller 602 is to operate the pneumatic actuator 606 in a manner that causes the flow control member 110 of the control valve 106 to move in the first direction. If the processor 136 determines at block 802 that the valve controller 602 is to operate the pneumatic actuator 606 to move the flow control member 110 of the control valve 106 in the first direction, the method 800 of FIGS. 8A-8B proceeds to block 804. If the processor 136 instead determines at block 802 that the valve controller 602 is not to operate the pneumatic actuator 606 to move the flow control member 110 of the control valve 106 in the first direction, the method 800 of FIGS. 8A-8B proceeds to block 808.

At block 804, the processor 136 commands the first I/P converter 118 of the valve controller 602 to pulse the first relay valve 122 of the valve controller 602, and also commands the fourth I/P converter 614 of the valve controller 602 to pulse the fourth relay valve 618 of the valve controller 602. For example, the processor 136 may generate a pulsed drive signal (e.g., the first pulsed drive signal 144 of FIG. 6) that commands and/or instructs the first I/P converter 118 of the valve controller 602 to output a pulsed pressurized control fluid (e.g., a pulsed pressurized pneumatic medium, such as pulses of pressurized air) to the first relay valve 122 of the valve controller 602, with the pulsed pressurized control fluid causing the first relay valve 122 to be pulsed between a closed position and an open position. The processor 136 may also generate a pulsed drive signal (e.g., the fourth pulsed drive signal 626 of FIG. 6) that commands and/or instructs the fourth I/P converter 614 of the valve controller 602 to output a pulsed pressurized control fluid (e.g., a pulsed pressurized pneumatic medium, such as pulses of pressurized air) to the fourth relay valve 618 of the valve controller 602, with the pulsed pressurized control fluid causing the fourth relay valve 618 to be pulsed (e.g., concurrently and/or simultaneously with the pulsing of the first relay valve 122) between a closed position and an open position. Following block 804, the method 800 of FIGS. 8A-8B proceeds to block 806.

At block 806, the processor 136 calculates one or more pneumatic volume usage(s) associated with the pulsing of the first relay valve 122 and/or the pulsing of the fourth relay valve 618. For example, the processor 136 can calculate pulse-by-pulse first port pneumatic supply volume usage associated with the pulsing of the first relay valve 122 using Equations 1-4 described above. The processor 136 can additionally calculate the first port pneumatic supply volume usage associated with the pulsing of the first relay valve 122 by summing together the first port pneumatic supply volume usages calculated by the processor 136 for individual ones of the pulses occurring during the pulsing of the first relay valve 122. The processor 136 can additionally calculate pulse-by-pulse second port pneumatic exhaust volume usage associated with the pulsing of the fourth relay valve 618 using Equations 1-4 described above, modified such that the pressure differential ($P_2-P_1$) for a given pulse is based on second port pressure data sensed and/or measured by the third pressure sensor 622 of FIG. 6 instead of being based on supply pressure data sensed and/or measured by the first pressure sensor 132 of FIG. 6. The processor 136 can additionally calculate the second port pneumatic exhaust volume usage associated with the pulsing of the fourth relay valve 618 by summing together the second port pneumatic exhaust volume usages calculated by the processor 136 for individual ones of the pulses occurring during the pulsing of the fourth relay valve 618. Following block 806, the method 800 of FIGS. 8A-8B proceeds to block 826.

At block 808, the processor 136 determines whether the valve controller 602 is to operate the pneumatic actuator 606 to move the flow control member 110 of the control valve 106 in a second direction opposite the first direction. For example, the processor 136 and/or, more generally, the control circuitry 130 of the valve controller 602 of FIG. 6 may receive an input signal (e.g., the input signal 142 of FIG. 6) indicating to the processor 136 that the valve controller 602 is to operate the pneumatic actuator 606 in a manner that causes the flow control member 110 of the control valve 106 to move in the second direction. If the processor 136 determines at block 808 that the valve controller 602 is to operate the pneumatic actuator 606 to move the flow control member 110 of the control valve 106 in the second direction, the method 800 of FIGS. 8A-8B proceeds to block 810. If the processor 136 instead determines at block 808 that the valve controller 602 is not to operate the pneumatic actuator 606 to move the flow control member 110 of the control valve 106 in the second direction, the method 800 of FIGS. 8A-8B proceeds to block 814.

At block 810, the processor 136 commands the second I/P converter 120 of the valve controller 602 to pulse the second relay valve 124 of the valve controller 602, and also commands the third I/P converter 612 of the valve controller 602 to pulse the third relay valve 616 of the valve controller 602. For example, the processor 136 may generate a pulsed drive signal (e.g., the second pulsed drive signal 146 of FIG. 6) that commands and/or instructs the second I/P converter 120 of the valve controller 602 to output a pulsed pressurized control fluid (e.g., a pulsed pressurized pneumatic medium, such as pulses of pressurized air) to the second relay valve 124 of the valve controller 602, with the pulsed pressurized control fluid causing the second relay valve 124 to be pulsed between a closed position and an open position. The processor 136 may also generate a pulsed drive signal (e.g., the third pulsed drive signal 624 of FIG. 6) that commands and/or instructs the third I/P converter 612 of the valve controller 602 to output a pulsed pressurized control fluid (e.g., a pulsed pressurized pneumatic medium, such as pulses of pressurized air) to the third relay valve 616 of the valve controller 602, with the pulsed pressurized control fluid causing the third relay valve 616 to be pulsed (e.g., concurrently and/or simultaneously with the pulsing of the second relay valve 124) between a closed position and an open position. Following block 810, the method 800 of FIGS. 8A-8B proceeds to block 812.

At block 812, the processor 136 calculates one or more pneumatic volume usage(s) associated with the pulsing of the second relay valve 124 and/or the pulsing of the third relay valve 616. For example, the processor 136 can calculate pulse-by-pulse second port pneumatic supply volume usage associated with the pulsing of the third relay valve 616 using Equations 1-4 described above. The processor 136 can additionally calculate the second port pneumatic supply volume usage associated with the pulsing of the third relay valve 616 by summing together the second port pneumatic supply volume usages calculated by the processor 136 for individual ones of the pulses occurring during the pulsing of the third relay valve 616. The processor 136 can additionally calculate pulse-by-pulse first port pneumatic exhaust volume usage associated with the pulsing of the second relay valve 124 using Equations 1-4 described above, modified such that the pressure differential ($P_2-P_1$) for a given pulse is based on first port pressure data sensed and/or measured by the second pressure sensor 134 of FIG. 6 instead of being based on supply pressure data sensed and/or measured by the first pressure sensor 132 of FIG. 6. The processor 136 can additionally calculate the first port pneumatic exhaust volume usage associated with the pulsing of the second relay valve 124 by summing together the first port pneumatic exhaust volume usages calculated by the processor 136 for individual ones of the pulses occurring during the pulsing of the second relay valve 124. Following block 812, the method 800 of FIGS. 8A-8B proceeds to block 826.

At block 814, the processor 136 determines whether the valve controller 602 is to increase the pressure in both the first chamber and the second chamber of the pneumatic actuator 606 of FIG. 6. For example, the processor 136 and/or, more generally, the control circuitry 130 of the valve controller 602 of FIG. 6 may receive an input signal (e.g., the input signal 142 of FIG. 6) indicating to the processor 136 that the valve controller 602 is to increase the pressure in both the first chamber and the second chamber of the pneumatic actuator 606. If the processor 136 determines at block 814 that the valve controller 602 is to increase the pressure in both the first chamber and the second chamber of the pneumatic actuator 606, the method 800 of FIGS. 8A-8B proceeds to block 816. If the processor 136 instead determines at block 814 that the valve controller 602 is not to increase the pressure in both the first chamber and the second chamber of the pneumatic actuator 606, the method 800 of FIGS. 8A-8B proceeds to block 820.

At block 816, the processor 136 commands the first I/P converter 118 of the valve controller 602 to pulse the first relay valve 122 of the valve controller 602, and also commands the third I/P converter 612 of the valve controller 602 to pulse the third relay valve 618 of the valve controller 602. For example, the processor 136 may generate a pulsed drive signal (e.g., the first pulsed drive signal 144 of FIG. 6) that commands and/or instructs the first I/P converter 118 of the valve controller 602 to output a pulsed pressurized control fluid (e.g., a pulsed pressurized pneumatic medium, such as pulses of pressurized air) to the first relay valve 122 of the valve controller 602, with the pulsed pressurized control fluid causing the first relay valve 122 to be pulsed between a closed position and an open position. The processor 136 may also generate a pulsed drive signal (e.g., the third pulsed drive signal 624 of FIG. 6) that commands and/or instructs the third I/P converter 612 of the valve controller 602 to output a pulsed pressurized control fluid (e.g., a pulsed pressurized pneumatic medium, such as pulses of pressurized air) to the third relay valve 616 of the valve controller 602, with the pulsed pressurized control fluid causing the third relay valve 616 to be pulsed (e.g., concurrently and/or simultaneously with the pulsing of the first relay valve 122) between a closed position and an open position. Following block 816, the method 800 of FIGS. 8A-8B proceeds to block 818.

At block 818, the processor 136 calculates one or more pneumatic volume usage(s) associated with the pulsing of the first relay valve 122 and/or the pulsing of the third relay valve 616. For example, the processor 136 can calculate pulse-by-pulse first port pneumatic supply volume usage associated with the pulsing of the first relay valve 122 using Equations 1-4 described above. The processor 136 can additionally calculate the first port pneumatic supply volume usage associated with the pulsing of the first relay valve 122 by summing together the first port pneumatic supply volume usages calculated by the processor 136 for individual ones of the pulses occurring during the pulsing of the first relay valve 122. The processor 136 can additionally calculate pulse-by-pulse second port pneumatic supply volume usage associated with the pulsing of the third relay valve 616 using Equations 1-4 described above. The processor 136 can additionally calculate the second port pneumatic supply volume usage associated with the pulsing of the third relay valve 616 by summing together the second port pneumatic supply volume usages calculated by the processor 136 for individual ones of the pulses occurring during the pulsing of the third relay valve 616. Following block 818, the method 800 of FIGS. 8A-8B proceeds to block 826.

At block 820, the processor 136 determines whether the valve controller 602 is to decrease the pressure in both the first chamber and the second chamber of the pneumatic actuator 606 of FIG. 6. For example, the processor 136 and/or, more generally, the control circuitry 130 of the valve controller 602 of FIG. 6 may receive an input signal (e.g., the input signal 142 of FIG. 6) indicating to the processor 136 that the valve controller 602 is to decrease the pressure in both the first chamber and the second chamber of the pneumatic actuator 606. If the processor 136 determines at block 820 that the valve controller 602 is to decrease the pressure in both the first chamber and the second chamber of the pneumatic actuator 606, the method 800 of FIGS. 8A-8B proceeds to block 822. If the processor 136 instead determines at block 820 that the valve controller 602 is not to decrease the pressure in both the first chamber and the second chamber of the pneumatic actuator 606, the method 800 of FIGS. 8A-8B proceeds to block 828.

At block 822, the processor 136 commands the second I/P converter 120 of the valve controller 602 to pulse the second relay valve 124 of the valve controller 602, and also commands the fourth I/P converter 614 of the valve controller 602 to pulse the fourth relay valve 618 of the valve controller 602. For example, the processor 136 may generate a pulsed drive signal (e.g., the second pulsed drive signal 146 of FIG. 6) that commands and/or instructs the second I/P converter 120 of the valve controller 602 to output a pulsed pressurized control fluid (e.g., a pulsed pressurized pneumatic medium, such as pulses of pressurized air) to the second relay valve 124 of the valve controller 602, with the pulsed pressurized control fluid causing the second relay valve 124 to be pulsed between a closed position and an open position. The processor 136 may also generate a pulsed drive signal (e.g., the fourth pulsed drive signal 626 of FIG. 6) that commands and/or instructs the fourth I/P converter 614 of the valve controller 602 to output a pulsed pressurized control fluid (e.g., a pulsed pressurized pneumatic medium, such as pulses of pressurized air) to the fourth relay valve 618 of the valve controller 602, with the pulsed pressurized control fluid causing the fourth relay valve 618 to be pulsed (e.g., concurrently and/or simultaneously with the pulsing of the second relay valve 124) between a closed position and an open position. Following block 822, the method 800 of FIGS. 8A-8B proceeds to block 824.

At block 824, the processor 136 calculates one or more pneumatic volume usage(s) associated with the pulsing of the second relay valve 124 and/or the pulsing of the fourth relay valve 618. For example, the processor 136 can calculate pulse-by-pulse first port pneumatic exhaust volume usage associated with the pulsing of the second relay valve 124 using Equations 1-4 described above, modified such that the pressure differential ($P_2-P_1$) for a given pulse is based on first port pressure data sensed and/or measured by the second pressure sensor 134 of FIG. 6 instead of being based on supply pressure data sensed and/or measured by the first pressure sensor 132 of FIG. 6. The processor 136 can additionally calculate the first port pneumatic exhaust volume usage associated with the pulsing of the second relay valve 124 by summing together the first port pneumatic exhaust volume usages calculated by the processor 136 for individual ones of the pulses occurring during the pulsing of the second relay valve 124. The processor 136 can additionally calculate pulse-by-pulse second port pneumatic exhaust volume usage associated with the pulsing of the fourth relay valve 618 using Equations 1-4 described above, modified such that the pressure differential ($P_2-P_1$) for a given pulse is based on second port pressure data sensed and/or measured by the third pressure sensor 622 of FIG. 6 instead of being based on supply pressure data sensed and/or measured by the first pressure sensor 132 of FIG. 6. The processor 136 can additionally calculate the second port pneumatic exhaust volume usage associated with the pulsing of the fourth relay valve 618 by summing together the second port pneumatic exhaust volume usages calculated by the processor 136 for individual ones of the pulses occurring during the pulsing of the fourth relay valve 618. Following block 824, the method 800 of FIGS. 8A-8B proceeds to block 826.

At block 826, the processor 136 calculates one or more total pneumatic volume usage(s). For example, the processor 136 can calculate the cumulative first port pneumatic supply volume usage associated with separate instances of pulsing the first relay valve 122 (e.g., based on the repeated execution of blocks 802 through 806 and/or the repeated execution of blocks 814 through 818) by summing together each of the first port pneumatic supply volume usages calculated by the processor 136 over time at block 806 and/or at block 818. The processor 136 can additionally calculate the cumulative first port pneumatic exhaust volume usage associated with separate instances of pulsing the second relay valve 124 (e.g., based on the repeated execution of blocks 808 through 812 and/or the repeated execution of blocks 820 through 824) by summing together each of the first port pneumatic exhaust volume usages calculated by the processor 136 over time at block 812 and/or at block 824. The processor 136 can additionally calculate the cumulative second port pneumatic supply volume usage associated with separate instances of pulsing the third relay valve 616 (e.g., based on the repeated execution of blocks 808 through 812 and/or the repeated execution of blocks 814 through 818) by summing together each of the second port pneumatic supply volume usages calculated by the processor 136 over time at block 812 and/or at block 818. The processor 136 can additionally calculate the cumulative second port pneumatic exhaust volume usage associated with separate instances of pulsing the fourth relay valve 618 (e.g., based on the repeated execution of blocks 802 through 806 and/or the repeated execution of blocks 820 through 824) by summing together each of the second port pneumatic exhaust volume usages calculated by the processor 136 over time at block 806 and/or at block 824. The processor 136 can additionally calculate the total pneumatic volume usage associated with the pulsing of the first relay valve 122, the pulsing of the second relay valve 124, the pulsing of the third relay valve 616, and the pulsing of the fourth relay valve 618 by summing together the first port pneumatic supply volume usage calculated at block 806 and/or at block 818, the first port pneumatic exhaust volume usage calculated at block 812 and/or at block 824, the second port pneumatic supply volume usage calculated at block 812 and/or at block 818, and the second port pneumatic exhaust volume usage calculated at block 806 and/or at block 824. The processor 136 can additionally calculate a cumulative total pneumatic volume usage by summing successive calculations of the total pneumatic volume usage occurring over time. Following block 826, the method 800 of FIGS. 8A-8B proceeds to block 828.

At block 828, the processor 136 determines whether the valve controller 602 is to continue quantifying pneumatic volume usage. For example, the processor 136 and/or, more generally, the control circuitry 130 of the valve controller 602 of FIG. 6 may receive a control signal indicating to the processor 136 that the valve controller 602 is to discontinue quantifying pneumatic usage volume. If the processor 136 determines at block 828 that the valve controller 602 is to continue quantifying pneumatic volume usage, the method 800 of FIGS. 8A-8B returns to block 802. If the processor 136 instead determines at block 828 that the valve controller 602 is not to continue (e.g., is to discontinue) quantifying pneumatic volume usage, the method 800 of FIGS. 8A-8B ends.

Figure 9:
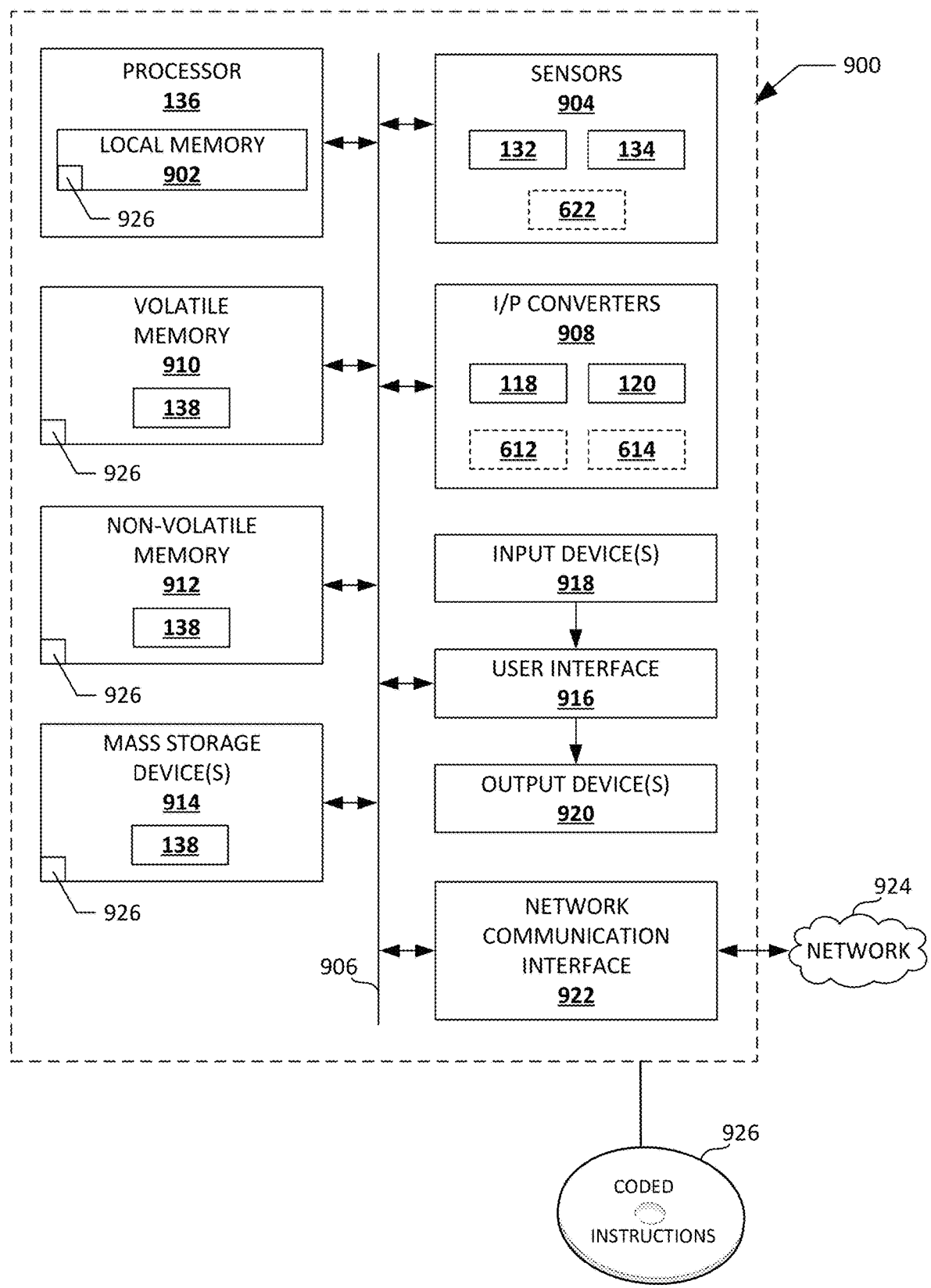
FIG. 9 is an example processor platform capable of executing instructions to implement the example method of FIG. 7 and the example valve controller of FIG. 1, and/or to implement the example method of FIGS. 8A-8B and the example valve controller of FIG. 6.

FIG. 9 is an example processor platform 900 capable of executing instructions to implement the example method 700 of FIG. 7 and the example valve controller 102 of FIG. 1, and/or to implement the example method 800 of FIGS. 8A-8B and the example valve controller 602 of FIG. 6. The processor platform 900 of the illustrated example includes the example processor 136 of FIGS. 1 and 6. The processor 136 of the illustrated example is hardware. For example, the processor 136 can be implemented by one or more integrated circuits, logic circuits, microprocessors, or controllers from any desired family or manufacturer. The processor 136 of the illustrated example includes a local memory 902 (e.g., a cache).

The processor 136 of the illustrated example is in communication with one or more example sensors 904 via a bus 906. The sensors 904 include the example first pressure sensor 132 and the example second pressure sensor 134 of FIGS. 1 and 6, and can also optionally include the example third pressure sensor 622 of FIG. 6 (e.g., in instances where the processor platform 900 is to execute instructions to implement the example method 800 of FIGS. 8A-8B via the example valve controller 602 of FIG. 6).

The processor 136 of the illustrated example is also in communication with one or more example I/P converters 908 via the bus 906. The I/P converters 908 include the example first I/P converter 118 and the second I/P converter 120 of FIGS. 1 and 6, and can also optionally include the example third I/P converter 612 and the example fourth I/P converter 614 of FIG. 6 (e.g., in instances where the processor platform 900 is to execute instructions to implement the example method 800 of FIGS. 8A-8B via the example valve controller 602 of FIG. 6).

The processor 136 of the illustrated example is also in communication with a main memory including a volatile memory 910 and a non-volatile memory 912 via the bus 906. The volatile memory 910 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 912 may be implemented by flash memory and/or any other desired type of memory device. Access to the volatile memory 910 and the non-volatile memory 912 is controlled by a memory controller.

The processor 136 of the illustrated example is also in communication with one or more mass storage devices 914 for storing software and/or data. Examples of such mass storage devices 914 include floppy disk drives, hard drive disks, compact disk drives, Blu-ray disk drives, RAID systems, and digital versatile disk (DVD) drives. The example memory 138 of FIGS. 1 and 6 can be implemented by and/or within the volatile memory 910, the non-volatile memory 912, and/or the mass storage device 914 of the processor platform 900 of FIG. 9.

The processor platform 900 of the illustrated example also includes a user interface circuit 916. The user interface circuit 916 may be implemented by any type of interface standard, such as an Ethernet interface, a universal serial bus (USB), and/or a PCI express interface. In the illustrated example, one or more example input device(s) 918 are connected to the user interface circuit 916. The input device(s) 918 permit(s) a user to enter data and commands into the processor 136. The input device(s) 918 can be implemented by, for example, one or more buttons, one or more switches, a keypad, an audio sensor, and/or a liquid crystal display having a touchscreen. One or more example output device(s) 920 are also connected to the user interface circuit 916 of the illustrated example. The output device(s) 920 can be implemented, for example, by one or more light emitting diode(s) for presenting visual information, one or more speaker(s) for presenting audible information, and/or a display device (e.g., a liquid crystal display) for presenting textual and/or graphical information. The user interface circuit 916 of the illustrated example may, thus, include a graphics driver such as a graphics driver chip and/or processor.

The processor platform 900 of the illustrated example also includes a network communication interface circuit 922 to facilitate the exchange of data and/or signals with external machines via a network 924. In some examples, the network 924 may be facilitated via 4-20 mA wiring and/or via one or more communication protocol(s) including, for example, Foundation Fieldbus, Highway Addressable Remote Transducer (HART), Transmission Control Protocol/Internet Protocol (TCP/IP), Profinet, Modbus and/or Ethernet.

Coded instructions 926 for implementing the example method 700 of FIG. 7 and/or the example method 800 of FIGS. 8A-8B may be stored in the local memory 902, in the volatile memory 910, in the non-volatile memory 912, in the mass storage device 914, and/or on a removable tangible computer readable storage medium such as a CD or DVD.

From the foregoing, it will be appreciated that example valve controllers disclosed herein include a pneumatic transducer implemented as a two-stage relay, with first and second relay valves of the two-stage relay being operatively coupled to and/or controlled by corresponding ones of first and second I/P converters of the valve controller. The two-stage relay advantageously reduces (e.g., eliminates) the persistent bleed that is traditionally associated with steady state operation of pneumatic actuators and/or control valves via the conventional valve controllers described above. Example valve controllers disclosed herein accordingly provide economic and environmental benefits relative to such conventional valve controllers.

Example valve controllers disclosed herein also provide improved techniques for quantifying pneumatic volume usage and/or consumption, particularly with regard to quantifying the volume of pneumatic medium used and/or consumed in association with the valve controller operating a pneumatic actuator to move a control valve (e.g., usage and/or consumption during non-steady state operations). Pneumatic volume usage and/or consumption data calculated by the example valve controllers disclosed herein can be monitored over time to detect unexpected and/or undesirable increases in the volume of pneumatic medium being used and/or consumed by the valve controller. In some examples, detection of such unexpected and/or undesirable increases in the volume of pneumatic medium being used and/or consumed by the valve controller can indicate deterioration of one or more component(s) of the pneumatic actuator and/or the control valve, including any tubing and/or fittings associated therewith. Such information can advantageously enable maintenance personnel to identify and/or resolve operational issues more quickly, thereby increasing the reliability of field operations that make use of the valve controller, the pneumatic actuator, and/or the control valve.

In some examples, an apparatus is disclosed. In some disclosed examples, the apparatus comprises a valve controller operatively couplable to a pneumatic actuator, the pneumatic actuator being operatively coupled to a control valve. In some disclosed examples, the valve controller includes one or more processors to, in response to a first input signal indicating that the valve controller is to operate the pneumatic actuator to move a flow control member of the control valve in a first direction, command a first I/P converter of the valve controller to pulse a first relay valve of the valve controller between a first closed position and a first open position. In some disclosed examples, the pulsing of the first relay valve is to cause the pneumatic actuator to move the flow control member in the first direction. In some disclosed examples, the one or more processors are further to calculate a first pneumatic volume usage associated with the moving of the flow control member in the first direction. In some disclosed examples, the first pneumatic volume usage is based on the pulsing of the first relay valve.

In some disclosed examples, the one or more processors are further to, in response to a second input signal indicating that the valve controller is to operate the pneumatic actuator to move the flow control member in a second direction opposite the first direction, command a second I/P converter of the valve controller to pulse a second relay valve of the valve controller between a second closed position and a second open position. In some disclosed examples, the pulsing of the second relay valve is to cause the pneumatic actuator to move the flow control member in the second direction. In some disclosed examples, the one or more processors are further to calculate a second pneumatic volume usage associated with the moving of the flow control member in the second direction. In some disclosed examples, the second pneumatic volume usage is based on the pulsing of the second relay valve.

In some disclosed examples, the pneumatic actuator is a single-acting pneumatic actuator.

In some disclosed examples, the pneumatic actuator is a double-acting pneumatic actuator. In some disclosed examples, the one or more processors are further to, in response to the second input signal, command a third I/P converter of the valve controller to pulse a third relay valve of the valve controller between a third closed position and a third open position. In some disclosed examples, the pulsing of the third relay valve is to cause the pneumatic actuator to move the flow control member in the second direction. In some disclosed examples, the one or more processors are further to calculate a third pneumatic volume usage associated with the moving of the flow control member in the second direction. In some disclosed examples, the third pneumatic volume usage is based on the pulsing of the third relay valve.

In some disclosed examples, the one or more processors are further to, in response to the first input signal, command a fourth I/P converter of the valve controller to pulse a fourth relay valve of the valve controller between a fourth closed position and a fourth open position. In some disclosed examples, the pulsing of the fourth relay valve is to cause the pneumatic actuator to move the flow control member in the first direction. In some disclosed examples, the one or more processors are further to calculate a fourth pneumatic volume usage associated with the moving of the flow control member in the first direction. In some disclosed examples, the fourth pneumatic volume usage is based on the pulsing of the fourth relay valve.

In some disclosed examples, the one or more processors are further to, in response to a third input signal indicating that the valve controller is to increase a first pressure of a first fluid chamber of the pneumatic actuator and a second pressure of a second fluid chamber of the pneumatic actuator, command the first I/P converter to pulse the first relay valve between the first closed position and the first open position. In some disclosed examples, the pulsing of the first relay valve is to increase the first pressure of the first fluid chamber. In some disclosed examples, the one or more processors are further to, in response to the third input signal, command the third I/P converter to pulse the third relay valve between the third closed position and the third open position. In some disclosed examples, the pulsing of the third relay valve is to increase the second pressure of the second fluid chamber. In some disclosed examples, the one or more processors are further to calculate a fifth pneumatic volume usage associated with the increasing of the first pressure of the first fluid chamber and the increasing of the second pressure of the second fluid chamber. In some disclosed examples, the fifth pneumatic volume usage is based on the pulsing of the first relay valve and the pulsing of the third relay valve.

In some disclosed examples, the one or more processors are further to, in response to a fourth input signal indicating that the valve controller is to decrease the first pressure of the first fluid chamber and the second pressure of the second fluid chamber, command the second I/P converter to pulse the second relay valve between the second closed position and the second open position. In some disclosed examples, the pulsing of the second relay valve is to decrease the first pressure of the first fluid chamber. In some disclosed examples, the one or more processors are further to, in response to the fourth input signal, command the fourth I/P converter to pulse the fourth relay valve between the fourth closed position and the fourth open position. In some disclosed examples, the pulsing of the fourth relay valve is to decrease the second pressure of the second fluid chamber. In some disclosed examples, the one or more processors are further to calculate a sixth pneumatic volume usage associated with the decreasing of the first pressure of the first fluid chamber and the decreasing of the second pressure of the second fluid chamber. In some disclosed examples, the sixth pneumatic volume usage is based on the pulsing of the second relay valve and the pulsing of the fourth relay valve.

In some examples, a method is disclosed. In some disclosed examples, the method comprises receiving a first input signal at a valve controller operatively coupled to a pneumatic actuator, the pneumatic actuator being operatively coupled to a control valve, the first input signal indicating that the valve controller is to operate the pneumatic actuator to move a flow control member of the control valve in a first direction. In some disclosed examples, the method further comprises, in response to receiving the first input signal, commanding, via one or more processors of the valve controller, a first I/P converter of the valve controller to pulse a first relay valve of the valve controller between a first closed position and a first open position. In some disclosed examples, the pulsing of the first relay valve causes the pneumatic actuator to move the flow control member in the first direction. In some disclosed examples, the method further comprises calculating, via the one or more processors, a first pneumatic volume usage associated with the moving of the flow control member in the first direction. In some disclosed examples, the first pneumatic volume usage is based on the pulsing of the first relay valve.

In some disclosed examples, the method further comprises receiving a second input signal at the valve controller, the second input signal indicating that the valve controller is to operate the pneumatic actuator to move the flow control member in a second direction opposite the first direction. In some disclosed examples, the method further comprises, in response to receiving the second input signal, commanding, via the one or more processors, a second I/P converter of the valve controller to pulse a second relay valve of the valve controller between a second closed position and a second open position. In some disclosed examples, the pulsing of the second relay valve causes the pneumatic actuator to move the flow control member in the second direction. In some disclosed examples, the method further comprises calculating, via the one or more processors, a second pneumatic volume usage associated with the moving of the flow control member in the second direction. In some disclosed examples, the second pneumatic volume usage is based on the pulsing of the second relay valve.

In some disclosed examples of the method, the pneumatic actuator is a single-acting pneumatic actuator.

In some disclosed examples of the method, the pneumatic actuator is a double-acting pneumatic actuator. In some disclosed examples, the method further comprises, in response to receiving the second input signal, commanding, via the one or more processors, a third I/P converter of the valve controller to pulse a third relay valve of the valve controller between a third closed position and a third open position. In some disclosed examples, the pulsing of the third relay valve causes the pneumatic actuator to move the flow control member in the second direction. In some disclosed examples, the method further comprises calculating, via the one or more processors, a third pneumatic volume usage associated with the moving of the flow control member in the second direction. In some disclosed examples, the third pneumatic volume usage is based on the pulsing of the third relay valve.

In some disclosed examples, the method further comprises, in response to receiving the first input signal, commanding, via the one or more processors, a fourth I/P converter of the valve controller to pulse a fourth relay valve of the valve controller between a fourth closed position and a fourth open position. In some disclosed examples, the pulsing of the fourth relay valve causes the pneumatic actuator to move the flow control member in the first direction. In some disclosed examples, the method further comprises calculating, via the one or more processors, a fourth pneumatic volume usage associated with the moving of the flow control member in the first direction. In some disclosed examples, the fourth pneumatic volume usage is based on the pulsing of the fourth relay valve.

In some disclosed examples, the method further comprises receiving a third input signal at the valve controller. In some disclosed examples, the third input signal indicates that the valve controller is to increase a first pressure of a first fluid chamber of the pneumatic actuator and a second pressure of a second fluid chamber of the pneumatic actuator. In some disclosed examples, the method further comprises, in response to receiving the third input signal, commanding, via the one or more processors, the first I/P converter to pulse the first relay valve between the first closed position and the first open position. In some disclosed examples, the pulsing of the first relay valve increases the first pressure of the first fluid chamber. In some disclosed examples, the method further comprises, in response to receiving the third input signal, commanding, via the one or more processors, the third I/P converter to pulse the third relay valve between the third closed position and the third open position. In some disclosed examples, the pulsing of the third relay valve increases the second pressure of the second fluid chamber. In some disclosed examples, the method further comprises calculating, via the one or more processors, a fifth pneumatic volume usage associated with the increasing of the first pressure of the first fluid chamber and the increasing of the second pressure of the second fluid chamber. In some disclosed examples, the fifth pneumatic volume usage is based on the pulsing of the first relay valve and the pulsing of the third relay valve.

In some disclosed examples, the method further comprises receiving a fourth input signal at the valve controller. In some disclosed examples, the fourth input signal indicates that the valve controller is to decrease the first pressure of the first fluid chamber and the second pressure of the second fluid chamber. In some disclosed examples, the method further comprises, in response to receiving the fourth input signal, commanding, via the one or more processors, the second I/P converter to pulse the second relay valve between the second closed position and the second open position. In some disclosed examples, the pulsing of the second relay valve decreases the first pressure of the first fluid chamber. In some disclosed examples, the method further comprises, in response to receiving the fourth input signal, commanding, via the one or more processors, the fourth I/P converter to pulse the fourth relay valve between the fourth closed position and the fourth open position. In some disclosed examples, the pulsing of the fourth relay valve decreases the second pressure of the second fluid chamber. In some disclosed examples, the method further comprises calculating, via the one or more processors, a sixth pneumatic volume usage associated with the decreasing of the first pressure of the first fluid chamber and the decreasing of the second pressure of the second fluid chamber. In some disclosed examples, the sixth pneumatic volume usage is based on the pulsing of the second relay valve and the pulsing of the fourth relay valve.

In some examples, a non-transitory computer-readable storage medium is disclosed. In some disclosed examples, the non-transitory computer-readable storage medium comprises instructions that, when executed cause one or more processors of a valve controller to obtain a first input signal, the first input signal indicating that the valve controller is to operate a pneumatic actuator operatively coupled to the valve controller to move a flow control member of a control valve in a first direction, the control valve being operatively coupled to the pneumatic actuator. In some disclosed examples, the instructions, when executed, further cause the one or more processors to, in response to the first input signal, command a first I/P converter of the valve controller to pulse a first relay valve of the valve controller between a first closed position and a first open position. In some disclosed examples, the pulsing of the first relay valve causes the pneumatic actuator to move the flow control member in the first direction. In some disclosed examples, the instructions, when executed, further cause the one or more processors to calculate a first pneumatic volume usage associated with the moving of the flow control member in the first direction. In some disclosed examples, the first pneumatic volume usage is based on the pulsing of the first relay valve.

In some disclosed examples, the instructions, when executed, further cause the one or more processors to obtain a second input signal, the second input signal indicating that the valve controller is to operate the pneumatic actuator to move the flow control member in a second direction opposite the first direction. In some disclosed examples, the instructions, when executed, further cause the one or more processors to, in response to the second input signal, command a second I/P converter of the valve controller to pulse a second relay valve of the valve controller between a second closed position and a second open position. In some disclosed examples, the pulsing of the second relay valve causes the pneumatic actuator to move the flow control member in the second direction. In some disclosed examples, the instructions, when executed, further cause the one or more processors to calculate a second pneumatic volume usage associated with the moving of the flow control member in the second direction. In some disclosed examples, the second pneumatic volume usage is based on the pulsing of the second relay valve.

In some disclosed examples, the instructions, when executed, further cause the one or more processors to, in response to the second input signal, command a third I/P converter of the valve controller to pulse a third relay valve of the valve controller between a third closed position and a third open position. In some disclosed examples, the pulsing of the third relay valve causes the pneumatic actuator to move the flow control member in the second direction. In some disclosed examples, the instructions, when executed, further cause the one or more processors to calculate a third pneumatic volume usage associated with the moving of the flow control member in the second direction. In some disclosed examples, the third pneumatic volume usage is based on the pulsing of the third relay valve.

In some disclosed examples, the instructions, when executed, further cause the one or more processors to, in response to the first input signal, command a fourth I/P converter of the valve controller to pulse a fourth relay valve of the valve controller between a fourth closed position and a fourth open position. In some disclosed examples, the pulsing of the fourth relay valve causes the pneumatic actuator to move the flow control member in the first direction. In some disclosed examples, the instructions, when executed, further cause the one or more processors to calculate a fourth pneumatic volume usage associated with the moving of the flow control member in the first direction. In some disclosed examples, the fourth pneumatic volume usage is based on the pulsing of the fourth relay valve.

In some disclosed examples, the instructions, when executed, further cause the one or more processors to obtain a third input signal. In some disclosed examples, the third input signal indicates that the valve controller is to increase a first pressure of a first fluid chamber of the pneumatic actuator and a second pressure of a second fluid chamber of the pneumatic actuator. In some disclosed examples, the instructions, when executed, further cause the one or more processors to, in response to the third input signal, command the first I/P converter to pulse the first relay valve between the first closed position and the first open position. In some disclosed examples, the pulsing of the first relay valve increases the first pressure of the first fluid chamber. In some disclosed examples, the instructions, when executed, further cause the one or more processors to, in response to the third input signal, command the third I/P converter to pulse the third relay valve between the third closed position and the third open position. In some disclosed examples, the pulsing of the third relay valve increases the second pressure of the second fluid chamber. In some disclosed examples, the instructions, when executed, further cause the one or more processors to calculate a fifth pneumatic volume usage associated with the increasing of the first pressure of the first fluid chamber and the increasing of the second pressure of the second fluid chamber. In some disclosed examples, the fifth pneumatic volume usage is based on the pulsing of the first relay valve and the pulsing of the third relay valve.

In some disclosed examples, the instructions, when executed, further cause the one or more processors to obtain a fourth input signal. In some disclosed examples, the fourth input signal indicates that the valve controller is to decrease the first pressure of the first fluid chamber and the second pressure of the second fluid chamber. In some disclosed examples, the instructions, when executed, further cause the one or more processors to, in response to the fourth input signal, command the second I/P converter to pulse the second relay valve between the second closed position and the second open position. In some disclosed examples, the pulsing of the second relay valve decreases the first pressure of the first fluid chamber. In some disclosed examples, the instructions, when executed, further cause the one or more processors to, in response to the fourth input signal, command the fourth I/P converter to pulse the fourth relay valve between the fourth closed position and the fourth open position. In some disclosed examples, the pulsing of the fourth relay valve decreases the second pressure of the second fluid chamber. In some disclosed examples, the instructions, when executed, further cause the one or more processors to calculate a sixth pneumatic volume usage associated with the decreasing of the first pressure of the first fluid chamber and the decreasing of the second pressure of the second fluid chamber. In some disclosed examples, the sixth pneumatic volume usage is based on the pulsing of the second relay valve and the pulsing of the fourth relay valve.

Although certain example methods, apparatus, articles of manufacture and systems have been disclosed herein, the scope of coverage of this patent is not limited thereto. On the contrary, this patent covers all methods, apparatus, articles of manufacture, and systems fairly falling within the scope of the claims of this patent.

What is claimed is:

1. An apparatus, comprising:
a valve controller operatively couplable to a pneumatic actuator, the pneumatic actuator being operatively coupled to a control valve, the valve controller including one or more processors to:
in response to a first input signal indicating that the valve controller is to operate the pneumatic actuator to move a flow control member of the control valve in a first direction, command a first current-to-pressure (I/P) converter of the valve controller to pulse a first relay valve of the valve controller between a first closed position and a first open position with a control signal having (i) at least one pulse of a first duration at a first time interval and (ii) at least one pulse of a second duration at a second time interval, the second duration different from the first duration, the second time interval non-overlapping with the first time interval, the pulsing of the first relay valve for the first duration to cause the pneumatic actuator to move the flow control member in the first direction, the pulsing of the first relay valve for the second duration to cause the pneumatic actuator to move the flow control member in the first direction; and
calculate a first pneumatic volume usage associated with the moving of the flow control member in the first direction, wherein the first pneumatic volume usage is calculated based on predetermined volumes of pneumatic pulses associated with the pulsing of the first relay valve during the first and second durations, and further based on (i) timing of the first and second durations, and (ii) supply pressure data corresponding to the first and second durations, the supply pressure data measured by a first pressure sensor of the valve controller operatively positioned between a control fluid inlet of the valve controller and the first relay valve.

2. The apparatus of claim 1, wherein the one or more processors are further to:
in response to a second input signal indicating that the valve controller is to operate the pneumatic actuator to move the flow control member in a second direction opposite the first direction, command a second I/P converter of the valve controller to pulse a second relay valve of the valve controller between a second closed position and a second open position, the pulsing of the second relay valve to cause the pneumatic actuator to move the flow control member in the second direction; and
calculate a second pneumatic volume usage associated with the moving of the flow control member in the second direction, wherein the second pneumatic volume usage is calculated based on predetermined volumes of pneumatic pulses associated with the pulsing of the second relay valve and further based on port pressure data measured by a second pressure sensor of the valve controller operatively positioned between the first relay valve and the second relay valve.

3. The apparatus of claim 2, wherein the pneumatic actuator is a single-acting pneumatic actuator.

4. The apparatus of claim 2, wherein the pneumatic actuator is a double-acting pneumatic actuator, and wherein the one or more processors are further to:
in response to the second input signal, command a third I/P converter of the valve controller to pulse a third relay valve of the valve controller between a third closed position and a third open position, the pulsing of the third relay valve to cause the pneumatic actuator to move the flow control member in the second direction; and
calculate a third pneumatic volume usage associated with the moving of the flow control member in the second direction, wherein the third pneumatic volume usage is calculated based on predetermined volumes of pneumatic pulses associated with the pulsing of the third relay valve and further based on supply pressure data measured by the first pressure sensor of the valve controller, wherein the first pressure sensor is operatively positioned between the control fluid inlet of the valve controller and the third relay valve.

5. The apparatus of claim 4, wherein the one or more processors are further to:
in response to the first input signal, command a fourth I/P converter of the valve controller to pulse a fourth relay valve of the valve controller between a fourth closed position and a fourth open position, the pulsing of the fourth relay valve to cause the pneumatic actuator to move the flow control member in the first direction; and
calculate a fourth pneumatic volume usage associated with the moving of the flow control member in the first direction, wherein the fourth pneumatic volume usage is calculated based on predetermined volumes of pneumatic pulses associated with the pulsing of the fourth relay valve and further based on port pressure data measured by a third pressure sensor of the valve controller operatively positioned between the third relay valve and the fourth relay valve.

6. The apparatus of claim 5, wherein the one or more processors are further to:
in response to a third input signal indicating that the valve controller is to increase a first pressure of a first fluid chamber of the pneumatic actuator and a second pressure of a second fluid chamber of the pneumatic actuator, command the first I/P converter to pulse the first relay valve between the first closed position and the first open position, the pulsing of the first relay valve to increase the first pressure of the first fluid chamber;
in response to the third input signal, command the third I/P converter to pulse the third relay valve between the third closed position and the third open position, the pulsing of the third relay valve to increase the second pressure of the second fluid chamber; and
calculate a fifth pneumatic volume usage associated with the increasing of the first pressure of the first fluid chamber and the increasing of the second pressure of the second fluid chamber, wherein the fifth pneumatic volume usage is calculated based on predetermined volumes of pneumatic pulses associated with the pulsing of the first relay valve and the pulsing of the third relay valve.

7. The apparatus of claim 6, wherein the one or more processors are further to:
in response to a fourth input signal indicating that the valve controller is to decrease the first pressure of the first fluid chamber and the second pressure of the second fluid chamber, command the second I/P converter to pulse the second relay valve between the second closed position and the second open position, the pulsing of the second relay valve to decrease the first pressure of the first fluid chamber;

in response to the fourth input signal, command the fourth I/P converter to pulse the fourth relay valve between the fourth closed position and the fourth open position, the pulsing of the fourth relay valve to decrease the second pressure of the second fluid chamber; and calculate a sixth pneumatic volume usage associated with the decreasing of the first pressure of the first fluid chamber and the decreasing of the second pressure of the second fluid chamber, wherein the sixth pneumatic volume usage is calculated based on predetermined volumes of pneumatic pulses associated with the pulsing of the second relay valve and the pulsing of the fourth relay valve.

8. A method, comprising:

receiving a first input signal at a valve controller operatively coupled to a pneumatic actuator, the pneumatic actuator being operatively coupled to a control valve, the first input signal indicating that the valve controller is to operate the pneumatic actuator to move a flow control member of the control valve in a first direction;

in response to receiving the first input signal, commanding, via one or more processors of the valve controller, a first current-to-pressure (I/P) converter of the valve controller to pulse, with a control signal, a first relay valve of the valve controller between a first closed position and a first open position, the control signal having (i) at least one pulse of a first duration during a first time interval and (ii) at least one pulse of a second duration different from the first duration during a second time interval, the second time interval non-overlapping with the first time interval, the pulsing of the first relay valve causing the pneumatic actuator to move the flow control member in the first direction, the pulsing of the first relay valve for the second duration to causing the pneumatic actuator to move the flow control member in the first direction; and calculating, via the one or more processors, a first pneumatic volume usage associated with the moving of the flow control member in the first direction, wherein the first pneumatic volume usage is calculated based on predetermined volumes of pneumatic pulses associated with the pulsing of the first relay valve during the first and second durations, and further based on (i) timing of the first and second time durations, and (ii) supply pressure data corresponding to the first and second durations, the supply pressure data measured by a first pressure sensor of the valve controller operatively positioned between a control fluid inlet of the valve controller and the first relay valve.

9. The method of claim 8, further comprising:

receiving a second input signal at the valve controller, the second input signal indicating that the valve controller is to operate the pneumatic actuator to move the flow control member in a second direction opposite the first direction;

in response to receiving the second input signal, commanding, via the one or more processors, a second I/P converter of the valve controller to pulse a second relay valve of the valve controller between a second closed position and a second open position, the pulsing of the second relay valve causing the pneumatic actuator to move the flow control member in the second direction; and calculating, via the one or more processors, a second pneumatic volume usage associated with the moving of the flow control member in the second direction, wherein the second pneumatic volume usage is calculated based on predetermined volumes of pneumatic pulses associated with the pulsing of the second relay valve and further based on port pressure data measured by a second pressure sensor of the valve controller operatively positioned between the first relay valve and the second relay valve.

10. The method of claim 9, wherein the pneumatic actuator is a single-acting pneumatic actuator.

11. The method of claim 9, wherein the pneumatic actuator is a double-acting pneumatic actuator, the method further comprising:

in response to receiving the second input signal, commanding, via the one or more processors, a third I/P converter of the valve controller to pulse a third relay valve of the valve controller between a third closed position and a third open position, the pulsing of the third relay valve causing the pneumatic actuator to move the flow control member in the second direction; and calculating, via the one or more processors, a third pneumatic volume usage associated with the moving of the flow control member in the second direction, wherein the third pneumatic volume usage is calculated based on predetermined volumes of pneumatic pulses associated with the pulsing of the third relay valve and further based on supply pressure data measured by the first pressure sensor of the valve controller, wherein the first pressure sensor is operatively positioned between the control fluid inlet of the valve controller and the third relay valve.

12. The method of claim 11, further comprising:

in response to receiving the first input signal, commanding, via the one or more processors, a fourth I/P converter of the valve controller to pulse a fourth relay valve of the valve controller between a fourth closed position and a fourth open position, the pulsing of the fourth relay valve causing the pneumatic actuator to move the flow control member in the first direction; and calculating, via the one or more processors, a fourth pneumatic volume usage associated with the moving of the flow control member in the first direction, wherein the fourth pneumatic volume usage is calculated based on predetermined volumes of pneumatic pulses associated with the pulsing of the fourth relay valve and further based on port pressure data measured by a third pressure sensor of the valve controller operatively positioned between the third relay valve and the fourth relay valve.

13. The method of claim 12, further comprising:

receiving a third input signal at the valve controller, the third input signal indicating that the valve controller is to increase a first pressure of a first fluid chamber of the pneumatic actuator and a second pressure of a second fluid chamber of the pneumatic actuator;

in response to receiving the third input signal, commanding, via the one or more processors, the first I/P converter to pulse the first relay valve between the first closed position and the first open position, the pulsing of the first relay valve increasing the first pressure of the first fluid chamber;

in response to receiving the third input signal, commanding, via the one or more processors, the third I/P converter to pulse the third relay valve between the third closed position and the third open position, the pulsing of the third relay valve increasing the second pressure of the second fluid chamber; and calculating, via the one or more processors, a fifth pneumatic volume usage associated with the increasing of the first pressure of the first fluid chamber and the increasing of the second pressure of the second fluid chamber, wherein the fifth pneumatic volume usage is calculated based on predetermined volumes of pneumatic pulses associated with the pulsing of the first relay valve and the pulsing of the third relay valve.

14. The method of claim 13, further comprising:
receiving a fourth input signal at the valve controller, the fourth input signal indicating that the valve controller is to decrease the first pressure of the first fluid chamber and the second pressure of the second fluid chamber;

in response to receiving the fourth input signal, commanding, via the one or more processors, the second I/P converter to pulse the second relay valve between the second closed position and the second open position, the pulsing of the second relay valve decreasing the first pressure of the first fluid chamber;

in response to receiving the fourth input signal, commanding, via the one or more processors, the fourth I/P converter to pulse the fourth relay valve between the fourth closed position and the fourth open position, the pulsing of the fourth relay valve decreasing the second pressure of the second fluid chamber; and calculating, via the one or more processors, a sixth pneumatic volume usage associated with the decreasing of the first pressure of the first fluid chamber and the decreasing of the second pressure of the second fluid chamber, wherein the sixth pneumatic volume usage is calculated based on predetermined volumes of pneumatic pulses associated with the pulsing of the second relay valve and the pulsing of the fourth relay valve.

15. A non-transitory computer-readable storage medium comprising instructions that, when executed cause one or more processors of a valve controller to at least:
obtain a first input signal, the first input signal indicating that the valve controller is to operate a pneumatic actuator operatively coupled to the valve controller to move a flow control member of a control valve in a first direction, the control valve being operatively coupled to the pneumatic actuator;

in response to the first input signal, command a first current-to-pressure (I/P) converter of the valve controller to pulse a first relay valve of the valve controller between a first closed position and a first open position with a control signal having (i) at least one pulse of a first duration at a first time interval and (ii) at least one pulse of a second duration different from the first duration at a second time interval, the second time interval non-overlapping with the first time interval, the pulsing of the first relay valve for the first duration causing the pneumatic actuator to move the flow control member in the first direction, the pulsing of the first relay valve for the second duration to cause the pneumatic actuator to move the flow control member in the first direction; and calculate a first pneumatic volume usage associated with the moving of the flow control member in the first direction, wherein the first pneumatic volume usage is calculated based on predetermined volumes of pneumatic pulses associated with the pulsing of the first relay valve during the first and second durations, and further based on (i) timing of the first and second time durations, and (ii) supply pressure data corresponding to the first and second durations, the supply pressure data measured by a first pressure sensor of the valve controller operatively positioned between a control fluid inlet of the valve controller and the first relay valve.

16. The non-transitory computer-readable storage medium of claim 15, wherein the instructions, when executed, further cause the one or more processors to:
obtain a second input signal, the second input signal indicating that the valve controller is to operate the pneumatic actuator to move the flow control member in a second direction opposite the first direction;

in response to the second input signal, command a second I/P converter of the valve controller to pulse a second relay valve of the valve controller between a second closed position and a second open position, the pulsing of the second relay valve causing the pneumatic actuator to move the flow control member in the second direction; and calculate a second pneumatic volume usage associated with the moving of the flow control member in the second direction, wherein the second pneumatic volume usage is calculated based on predetermined volumes of pneumatic pulses associated with the pulsing of the second relay valve and further based on port pressure data measured by a second pressure sensor of the valve controller operatively positioned between the first relay valve and the second relay valve.

17. The non-transitory computer-readable storage medium of claim 16, wherein the instructions, when executed, further cause the one or more processors to:
in response to the second input signal, command a third I/P converter of the valve controller to pulse a third relay valve of the valve controller between a third closed position and a third open position, the pulsing of the third relay valve causing the pneumatic actuator to move the flow control member in the second direction; and calculate a third pneumatic volume usage associated with the moving of the flow control member in the second direction, wherein the third pneumatic volume usage is calculated based on predetermined volumes of pneumatic pulses associated with the pulsing of the third relay valve and further based on supply pressure data measured by the first pressure sensor of the valve controller, wherein the first pressure sensor is operatively positioned between the control fluid inlet of the valve controller and the third relay valve.

18. The non-transitory computer-readable storage medium of claim 17, wherein the instructions, when executed, further cause the one or more processors to:
in response to the first input signal, command a fourth I/P converter of the valve controller to pulse a fourth relay valve of the valve controller between a fourth closed position and a fourth open position, the pulsing of the fourth relay valve causing the pneumatic actuator to move the flow control member in the first direction; and calculate a fourth pneumatic volume usage associated with the moving of the flow control member in the first direction, wherein the fourth pneumatic volume usage is calculated based on predetermined volumes of pneumatic pulses associated with the pulsing of the fourth relay valve and further based on port pressure data measured by a third pressure sensor of the valve controller operatively positioned between the third relay valve and the fourth relay valve.

19. The non-transitory computer-readable storage medium of claim 18, wherein the instructions, when executed, further cause the one or more processors to:
- obtain a third input signal, the third input signal indicating that the valve controller is to increase a first pressure of a first fluid chamber of the pneumatic actuator and a second pressure of a second fluid chamber of the pneumatic actuator;
- in response to the third input signal, command the first I/P converter to pulse the first relay valve between the first closed position and the first open position, the pulsing of the first relay valve increasing the first pressure of the first fluid chamber;
- in response to the third input signal, command the third I/P converter to pulse the third relay valve between the third closed position and the third open position, the pulsing of the third relay valve increasing the second pressure of the second fluid chamber; and
- calculate a fifth pneumatic volume usage associated with the increasing of the first pressure of the first fluid chamber and the increasing of the second pressure of the second fluid chamber, wherein the fifth pneumatic volume usage is calculated based on predetermined volumes of pneumatic pulses associated with the pulsing of the first relay valve and the pulsing of the third relay valve.

20. The non-transitory computer-readable storage medium of claim 19, wherein the instructions, when executed, further cause the one or more processors to:
- obtain a fourth input signal, the fourth input signal indicating that the valve controller is to decrease the first pressure of the first fluid chamber and the second pressure of the second fluid chamber;
- in response to the fourth input signal, command the second I/P converter to pulse the second relay valve between the second closed position and the second open position, the pulsing of the second relay valve decreasing the first pressure of the first fluid chamber;
- in response to the fourth input signal, command the fourth I/P converter to pulse the fourth relay valve between the fourth closed position and the fourth open position, the pulsing of the fourth relay valve decreasing the second pressure of the second fluid chamber; and
- calculate a sixth pneumatic volume usage associated with the decreasing of the first pressure of the first fluid chamber and the decreasing of the second pressure of the second fluid chamber, wherein the sixth pneumatic volume usage is calculated based on predetermined volumes of pneumatic pulses associated with the pulsing of the second relay valve and the pulsing of the fourth relay valve.

21. The apparatus of claim 1, wherein a control fluid port of the valve controller is operatively positioned between both the first relay valve and the second relay valve on the one hand, and a control fluid port of the pneumatic actuator on the other hand.

22. The apparatus of claim 21, wherein the second relay valve is operatively positioned between both the first relay valve and the control fluid port on the one hand, and a control fluid exhaust of the valve controller on the other hand.

23. The apparatus of claim 1, wherein the first pneumatic volume usage is calculated on a pulse-by-pulse basis for respective ones of the pneumatic pulses associated with the pulsing of the first relay valve, and wherein the one or more processors are further to calculate a total first pneumatic volume usage by summing together each calculated first pneumatic volume usage.

24. The apparatus of claim 1, wherein the at least one pulse of the first duration occurs before the at least one pulse of the second duration, the first duration longer than the second duration.

25. The apparatus of claim 24, wherein the one or more processors are further to command the first I/P converter of the valve controller to pulse the first relay valve of the valve controller with at least one pulse of a third duration subsequent to the at least one pulse of the second duration, the third duration shorter than the second duration.

26. The apparatus of claim 2, wherein the one or more processors are further to determine a condition of the valve based on the first and second pneumatic volume usage.

\* \* \* \* \*